(12) United States Patent
Marti Abril et al.

(10) Patent No.: US 10,894,893 B2
(45) Date of Patent: Jan. 19, 2021

(54) CURABLE COATING MATERIAL FOR NON-IMPACT PRINTING

(71) Applicant: TIGER COATINGS GMBH & CO. KG, Wels (AT)

(72) Inventors: Francisco Marti Abril, Leonding (AT); Gerhard Matthias Buchinger, Steinhaus bei Wels (AT); Sabrina Weigl, Engerwitzdorf (AT)

(73) Assignee: TIGER COATINGS GMBH & CO. KG, Wels (AT)

( * ) Notice: Subject to any disclaimer, the term of this patent is extended or adjusted under 35 U.S.C. 154(b) by 0 days.

(21) Appl. No.: 16/493,725

(22) PCT Filed: Mar. 13, 2018

(86) PCT No.: PCT/EP2018/056155
§ 371 (c)(1),
(2) Date: Sep. 12, 2019

(87) PCT Pub. No.: WO2018/167009
PCT Pub. Date: Sep. 20, 2018

(65) Prior Publication Data
US 2020/0131377 A1    Apr. 30, 2020

(30) Foreign Application Priority Data

Mar. 13, 2017 (EP) .................................. 17160701
Mar. 20, 2017 (EP) .................................. 17161938
Aug. 11, 2017 (EP) .................................. 17186032

(51) Int. Cl.
*G03G 9/00* (2006.01)
*C09D 11/107* (2014.01)
(Continued)

(52) U.S. Cl.
CPC ............. *C09D 11/107* (2013.01); *B05C 9/14* (2013.01); *B05D 1/06* (2013.01); *B05D 3/0254* (2013.01);
(Continued)

(58) Field of Classification Search
CPC ............................ C09D 11/107; G03G 9/0821
(Continued)

(56) References Cited

U.S. PATENT DOCUMENTS 5,087,495 A    2/1992   Nelson
5,160,792 A    11/1992  Barbee et al.
(Continued)

FOREIGN PATENT DOCUMENTS

CN    101959695 B    7/2013
CN    204659075 U    9/2015
(Continued)

OTHER PUBLICATIONS

International Search Report issued in parallel International Application No. PCT/EP2016/071649, dated Jan. 11, 2017, 4 pages.
(Continued)

*Primary Examiner* — Mark A Chapman
(74) *Attorney, Agent, or Firm* — Lewis Roca Rothgerber Christie LLP

(57) ABSTRACT

Coating material (237) for generating a coating layer by non-impact printing wherein the coating layer represents an image and wherein a resolution of the image is at least 100 DPI, the coating material comprising a curable resin; wherein the coating material (237) exhibits a minimum viscosity when being heated from room temperature with a heating rate of 5 Kelvin per minute up to a temperature where curing of the coating material occurs, wherein the minimum viscosity is in a range between 3 Pascal seconds to 20000 Pascal seconds, in particular in a range between 50 Pascal seconds and 10000 Pascal seconds and further in particular in a range between 250 Pascal seconds and 7000 Pascal seconds; and wherein a pill flow length is below 350 mm at a potential curing temperature which may be used to cure the coating material.

17 Claims, 5 Drawing Sheets

(51) Int. Cl.

| | |
|---|---|
| B41J 2/005 | (2006.01) |
| C09D 11/102 | (2014.01) |
| C09D 11/104 | (2014.01) |
| C09D 11/106 | (2014.01) |
| G03G 9/08 | (2006.01) |
| G03G 9/087 | (2006.01) |
| G03G 9/097 | (2006.01) |
| G03G 15/16 | (2006.01) |
| C09D 7/61 | (2018.01) |
| B05D 1/06 | (2006.01) |
| C09D 5/03 | (2006.01) |
| C09D 163/00 | (2006.01) |
| C09D 167/03 | (2006.01) |
| G03G 15/01 | (2006.01) |
| G03G 15/00 | (2006.01) |
| C09D 163/10 | (2006.01) |
| G03G 9/09 | (2006.01) |
| G03G 15/08 | (2006.01) |
| C09D 7/65 | (2018.01) |
| C09D 7/40 | (2018.01) |
| B05C 9/14 | (2006.01) |
| B05D 3/02 | (2006.01) |
| B41M 7/00 | (2006.01) |
| C09D 11/037 | (2014.01) |
| C08K 3/36 | (2006.01) |
| C08K 3/22 | (2006.01) |

(52) U.S. Cl.
CPC .......... *B41J 2/0057* (2013.01); *B41M 7/0018* (2013.01); *C09D 5/031* (2013.01); *C09D 5/033* (2013.01); *C09D 5/034* (2013.01); *C09D 5/035* (2013.01); *C09D 7/61* (2018.01); *C09D 7/65* (2018.01); *C09D 7/69* (2018.01); *C09D 11/037* (2013.01); *C09D 11/102* (2013.01); *C09D 11/104* (2013.01); *C09D 11/106* (2013.01); *C09D 163/00* (2013.01); *C09D 163/10* (2013.01); *C09D 167/03* (2013.01); *G03G 9/0819* (2013.01); *G03G 9/0821* (2013.01); *G03G 9/0827* (2013.01); *G03G 9/08726* (2013.01); *G03G 9/08728* (2013.01); *G03G 9/08753* (2013.01); *G03G 9/08755* (2013.01); *G03G 9/08764* (2013.01); *G03G 9/08795* (2013.01); *G03G 9/08797* (2013.01); *G03G 9/0906* (2013.01); *G03G 9/09708* (2013.01); *G03G 9/09725* (2013.01); *G03G 9/09783* (2013.01); *G03G 15/0121* (2013.01); *G03G 15/0865* (2013.01); *G03G 15/161* (2013.01); *G03G 15/162* (2013.01); *G03G 15/6582* (2013.01); *G03G 15/6585* (2013.01); *C08K 3/36* (2013.01); *C08K 2003/2237* (2013.01); *G03G 2215/00801* (2013.01)

(58) Field of Classification Search
USPC .......................................... 430/109.1, 111.4
See application file for complete search history.

(56) References Cited

U.S. PATENT DOCUMENTS

| | | | |
|---|---|---|---|
| 5,741,602 A | 4/1998 | Hoppe et al. | |
| 5,955,152 A | 9/1999 | Yasuda et al. | |
| 6,342,273 B1 | 1/2002 | Handels et al. | |
| 6,433,804 B1 | 8/2002 | Maess et al. | |
| 6,486,903 B1 | 11/2002 | Wagner et al. | |
| 6,723,767 B2 | 4/2004 | Lin et al. | |
| 6,887,640 B2 | 5/2005 | Zhang et al. | |
| 7,153,624 B2 | 12/2006 | Schultheis | |
| 8,455,166 B2 | 6/2013 | Op De Beeck et al. | |
| 8,541,154 B2 | 9/2013 | Iftime et al. | |
| 9,323,169 B2 | 4/2016 | Tyagi et al. | |
| 9,383,669 B2 | 7/2016 | Takahashi et al. | |
| 2004/0017839 A1 | 1/2004 | Kotzin et al. | |
| 2004/0063813 A1 | 4/2004 | Wu et al. | |
| 2004/0081573 A1 | 4/2004 | Newell | |
| 2005/0202164 A1 | 9/2005 | Stelter et al. | |
| 2006/0062908 A1 | 3/2006 | Ohkoshi et al. | |
| 2007/0085983 A1 | 4/2007 | Ko et al. | |
| 2008/0032222 A1 | 2/2008 | Stelter et al. | |
| 2008/0069606 A1 | 3/2008 | Yamashita et al. | |
| 2008/0176160 A1 | 7/2008 | Deprez et al. | |
| 2008/0241415 A1 | 10/2008 | Stelter et al. | |
| 2010/0015421 A1 | 1/2010 | Tyagi et al. | |
| 2010/0331456 A1 | 12/2010 | Wilczek et al. | |
| 2011/0217652 A1 | 9/2011 | Kittle | |
| 2012/0220684 A1 | 8/2012 | Bryson et al. | |
| 2012/0277360 A1 | 11/2012 | Scheffer et al. | |
| 2013/0229692 A1 | 9/2013 | Brewington | |
| 2013/0280500 A1 | 10/2013 | Kiy | |
| 2013/0295351 A1 | 11/2013 | Tyagi et al. | |
| 2016/0216623 A1 | 7/2016 | Sakai et al. | |
| 2016/0250853 A1 | 9/2016 | Pervan et al. | |
| 2016/0318258 A1 | 11/2016 | Valade | |

FOREIGN PATENT DOCUMENTS

| | | | |
|---|---|---|---|
| EP | 0176132 A1 | 4/1986 | |
| EP | 0 493 076 A2 | 7/1992 | |
| EP | 0 493 076 A3 | 7/1992 | |
| EP | 0895552 B1 | 5/2001 | |
| EP | 1594929 | 8/2004 | |
| EP | 1994451 | 9/2007 | |
| EP | 1978064 A1 | 8/2008 | |
| EP | 2296046 A1 | 3/2011 | |
| EP | 2337639 B1 | 3/2013 | |
| EP | 2896661 A1 | 7/2015 | |
| EP | 2 946 934 A1 | 11/2015 | |
| EP | 3144352 A1 | 3/2017 | |
| GB | 2487025 A | 7/2012 | |
| JP | 9-151337 | 6/1997 | |
| JP | H10-78675 A | 3/1998 | |
| JP | 2000508007 A | 6/2000 | |
| JP | 2000273390 A | 10/2000 | |
| JP | 2000284527 A | 10/2000 | |
| JP | 2000317383 A | 11/2000 | |
| JP | 2002504010 A | 2/2002 | |
| JP | 2009013395 A | 1/2009 | |
| WO | 96/15199 | 5/1996 | |
| WO | 0912367 A1 | 12/2001 | |
| WO | 2004056497 A1 | 7/2004 | |
| WO | 2004067647 A2 | 8/2004 | |
| WO | 2007103075 A2 | 9/2007 | |
| WO | 2008057844 A1 | 5/2008 | |
| WO | 2008128977 A1 | 10/2008 | |
| WO | 2009028733 A1 | 3/2009 | |
| WO | 2013166139 A1 | 11/2013 | |
| WO | 2015077687 A1 | 5/2015 | |
| WO | 2015107181 A1 | 7/2015 | |
| WO | 2016028584 A1 | 2/2016 | |
| WO | 2017046132 A1 | 3/2017 | |
| WO | 2017046296 A1 | 3/2017 | |

OTHER PUBLICATIONS

European Search Report issued in parallel European Application No. EP 17 18 5981, dated Jan. 31, 2018, 7 pages.

European Search Report issued in parallel European Application No. EP 17 18 6011, dated Feb. 5, 2018, 8 pages.

European Search Report issued in parallel European Application No. EP 17 18 5999, dated Jan. 31, 2018, 8 pages.

European Search Report issued in parallel European Application No. EP 17 18 6025, dated Jan. 31, 2018, 7 pages.

European Search Report issued in parallel European Application No. EP 17 18 6032, dated Jan. 31, 2018, 6 pages.

(56) References Cited

OTHER PUBLICATIONS

International Search Report and Written Opinion issued in parallel International Application No. PCT/EP2018/056135, dated Apr. 24, 2018, 15 pages.
International Search Report and Written Opinion issued in parallel International Application No. PCT/EP2018/056139, dated Apr. 24, 2018, 13 pages.
International Search Report and Written Opinion issued in parallel International Application No. PCT/EP2018/056171, dated Apr. 24, 2018, 14 pages.
International Search Report and Written Opinion issued in parallel International Application No. PCT/EP2018/056151, dated Apr. 24, 2018, 14 pages.
International Search Report and Written Opinion issued in parallel International Application No. PCT/EP2018/056155, dated Apr. 24, 2018, 13 pages.
Debenedetti, Pablo G. et al., "review article Supercooled liquids and the glass transition", Access: Nature 410, 259-267, http://www.nature.com/nature/journal/v410/n6825/full/410259a0.html, Jan. 3, 2017, 1 page.
"Cool solutions", European Coatings Journal, Mar. 2010, Vincentz Network, 11 pages.
Mischler, C. et al., Abstract: "Polymer films in the normal-liquid and supercooled state: a review of recent Monte Carlo simulation results" Advances in Colloid and Interface Science, vol. 94, Issues 1-3, Nov. 15, 2001, 2 pages.
Stillinger, Frank H., "Supercooled liquids, glass transitions, and the Kauzmann paradox", J. Chem. Phys., vol. 88, No. 12, Jun. 15, 1988, American Institute of Physics, 8 pages.
Farmer, T, "Chapter 2: Theory of Supercooled Liquids and Glasses", Structural Studies of Liquids and Glasses Using Aerodynamic Levitation, Springer Theses, DOI: 10.1007/978-3-319-06575-5_2, Springer International Publishing Switzerland 2015, 19 pages.
Database WPI, Weeki 200912, Thomson Scientific, London GB, AN 2009-E08290, XP002754724, 2 pages.
Koleske, Dr. Joseph V. et al., "2011 Additives Handbook," Paint & Coatings Industry, Jun. 2011, www.pcimag.com, pp. 1-64.
Einstein, A., Annalen Der Physik., Band 19, 1906, Ann. Phys. (Leipzig) 14, Supplement, 229-247 (2005), www.ann-phys.org, 19 pages.
Gillham, John K., "Formation and Properties of Thermosetting and High Tg Polymeric Materials", Polymer Engineering and Science, Mid-Nov. 1986, vol. 26, No. 20, 5 pages.
Cheng, Stephen Z.D., "Phase Transitions in Polymers, The Role of Metastable States", Elsevier Science, Jan. 2008, 309 pages.
Elliott, S.R., "Physics of amorphous materials", Department of Physical Chemistry, University of Cambridge, ISBN 0-582-44636-8, 1984, 400 pages.
Leistritz, "Masterbatch-Herstellung", Extruder und Extrusionsanlagen für höchste Qualität im Masterbatch, www.leistritz.com, Sep. 17, 2013, 9 pages.
Leistritz, "Masterbatch-Herstellung", Extruder und Extrusionsanlagen für höchste Qualität im Masterbatch, www.leistritz.com, Sep. 9, 2013, 9 pages.
"Specifications for a quality label for liquid and powder organic coatings on aluminium for architectural applications", 14th edition, approved on Nov. 6, 2014 and effective from Jan. 1, 2015, downloaded from www.qualicoat.net, 79 pages.
"Sysmex FPIA 3000. Flow particle image analysis of size and shape", 2010, downloaded from www.malvernpanalytical.com, 12 pages.
Kloppers, "Electromagnetic brush powder coating: From the lab to commercial production", Electromagnetic Brush Technology, Technical Article, Dec. 7, 2016, downloaded from www.emb-technology.com, 5 pages.
"Applicating powder coating on different substrates", EMB Technology—We'll change the future of the powder coating industry, https://web.archive.org/web/20161016042408/http://emb-technology, Oct. 16, 2016, 2 pages.
CCD Developments , EMB Technology—We'll change the future of the powder coating industry, https://web.archive.org/web/20161016042208/http://emb-technology, Oct. 16, 2016, 2 pages.
"EBM machine", EMB Technology—We'll change the future of the powder coating industry, https://web.archive.org/web/20161016042751/http://emb-technology, Oct. 16, 2016, 4 pages.
"About EBM Technology", EMB Technology—We'll change the future of the powder coating industry https://web.archive.org/web/20161016042928/http://emb-technology, Oct. 16, 2016, 2 pages.
"Links to interesting websites", EMB Technology—We'll change the future of the powder coating industry, https://web.archive.org/web/20161016042314/http://emb-technology, Oct. 16, 2016, 2 pages.
"The process", EMB Technology—We'll change the future of the powder coating industry, https://web.archive.org/web/20161016042104/http://emb-technology, Oct. 16, 2016, 3 pages.
Banerjee et al., "Laser Printing of Polymeric Materials", Rapid Prototyping & Manufacturing Group Faculty of Computing Sciences & Engineering, DeMontfort University, Leicester, UK, Sep. 14, 2006, pp. 366-374.
"Polyester resin addresses epoxy free coatings", published Aug. 30, 2010, downloaded from www.european-coatings.com, 1 page.
Takashi, et al,"Crystal Structure of Solvated Zinc Complexes Based on Salicylic Acid Derivatives", Abstract, NIP & Digital Fabrication Conference, 2004 International Conference on Digital Printing Technologies, downloaded from www.ingentaconnect.com, 1 page.
Tyagi, Dinesh, "Polyester-Based Chemically Prepared Toner for High-Speed Digital Production Printing", NIP & Digital Fabrication Conference, 2007 International Conference on Digital Printing Technologies, Published Jan. 1, 2007, downloaded from http://www.ingentaconnect.com/content/ist/nipdf/2007/00002007/00000001/art00064, 1 page.
Voorhes, Adam, "Inside laser printer toner: wax, static, lots of plastic", Lee Simmons Science Mar. 23, 2015, downloaded from https://www.wired.com/2015/03/whatsinsideprintertoner/, 4 pages.
"QUV Schnellbewitterungsgeräte", 2013, Q-LAB, downloaded from www.q-lab.com, 12 pages.
Biller, Kevin, "Technology Interchange: Polyester Powder Coatings: TGIC vs. HAA", Jul. 8, 2016, downloaded from www.powdercoatedtough.com, 6 pages.
Pabst, et al, "Characterization of particles and particle systems", ICT Prague 2007, 123 pages.
Otani, Shinji et al., "Charging Mechanism of Polymers with CCA (II)", IS&Ts NIP 15: 1999 International Conference on Digital Printing Technologies, 4 pages.
Prime, Dr. R. Bruce, "Thermoset Characterization Part 1-9", Apr. 14, 2014-Jun. 9, 2014, downloaded from www.polymerinnovationblog.com.
"Hubei DingLong Chemical Co., Ltd, Charge Control Agent, DL-N24", May 2005, 8 pages.
Debenedetti, Pablo G. et al., "Theory of Supercooled Liquids and Glasses: Energy Landscape and Statistical Geometry Perspectives", Advances in chemical engineering, vol. 28, 2001, 59 pages.
Hoffmann, Rainer "Modeling and Simulation of an Electrostatic Image Transfer", accepted on Jul. 15, 2004, 122 pages.
Hermann, "Was Beschichter über Pigmente in Pulverlacken wissen müssen", Vincentz Network, No. 1, Jan. 14, 2005, 1 page.
Horiba Instruments, Inc., "A Guidebook to particle size analysis", 2016, www.horiba.com, 32 pages.
Notice of Reason for Refusal issued in corresponding Japanese Application No. 2019-571773, dated Nov. 4, 2020, 7 pages.

CURABLE COATING MATERIAL FOR NON-IMPACT PRINTING

CROSS-REFERENCE TO RELATED APPLICATION(S)

This application is a National Phase Patent Application of International Patent Application Number PCT/EP2018/056155, filed on Mar. 13, 2018, which claims priority of European Patent Application Nos. 17160701.3, filed Mar. 13, 2017; 17161938.0, filed Mar. 20, 2017; and 17186032.3, filed Aug. 11, 2017, the entire contents of all of which are incorporated herein by reference.

FIELD OF INVENTION

The present invention relates to the field of coatings.

BACKGROUND

EP 2 140 307 B1 relates to a process for applying a powder coating onto a substrate. A transfer sheet is provided with a printed powder coating, wherein the printed powder coating is a thermosetting powder coating composition which comprises a resin and a curing agent for the resin. The transfer sheet is then applied onto the substrate with the powder coating in contact with the substrate. Thereafter the adherence of the powder coating to the substrate is increased by heating the powder coating to a temperature above its melt temperature but substantially below its curing temperature, followed by removal of the transfer sheet from the powder coating and curing the powder coating on the substrate. A characteristic feature of the process is that the transfer sheet is removed from the powder coating before the powder coating is cured. The deposition part of the process, comprising the steps of applying the transfer sheet onto the substrate with the powder coating in contact with the substrate and removing the transfer sheet from the powder coating, may be repeated as many times as desired, followed by then subjecting the entire decorated substrate to a curing step.

US 2008/0241415 A1 and US 2005/0202164 A1 relate to a powder coating apparatus and a method of powder coating using an electromagnetic brush.

U.S. Pat. No. 6,342,273 B1 relates to a process for coating a substrate with a powder paint composition.

EP 2 296 046 A1 relates to curable toner compositions and processes.

EP 0 895 552 relates to a process for coating a board- or paper-like substrate with a powder paint composition.

US 2010/0331456 A1 relates to a powder coating composition with new pigment.

US 2008/0069606 A1 relates to an image forming method and image forming apparatus.

SUMMARY

In view of the above-described situation, there still exists a need for an improved technique that enables to provide a curable coating, in particular a curable powder coating with improved characteristics.

This need may be met by the subject matter according to the independent claims. Advantageous embodiments of the herein disclosed subject matter are described by the respective dependent claims.

It is noted that generally herein the term "in particular" denotes optional features.

According to an aspect of the herein disclosed subject matter there is provided a coating material.

According to an aspect of the herein disclosed subject matter, there is provided a method, in particular a method of processing a coating material, a method of providing a transfer element, etc.

According to a further aspect of the herein disclosed subject matter there is provided a processing device.

According to a further aspect of the herein disclosed subject matter, a reservoir is provided.

According to a further aspect of the herein disclosed subject matter, a developer is provided. Unless stated differently, herein a reference to a developer is a reference to a respective material (i.e. a developer material generally comprising at least one carrier and at least one coating material/toner).

According to a further aspect of the herein disclosed subject matter, a transfer element is provided.

According to a further aspect of the herein disclosed subject matter, a substrate is provided.

According to a further aspect of the herein disclosed subject matter, there is provided a coating layer application device.

According to a further aspect of the herein disclosed subject matter, there is provided a computer program product, in particular a computer program product comprising a program element.

According to a further aspect of the herein disclosed subject matter, a printing device, in particular a non-impact printing device or an offset printing device is provided. Non-impact printing (NIP) includes in particular ink-jet printing, electrophotography, ionography, magnetography, thermoprint.

According to a further aspect of the herein disclosed subject matter, a printed image is provided.

It is noted that in some embodiments features have been denoted with reference signs wherein in other embodiments, the reference signs are provided for at least some features. Presence or absence of reference signs shall in any way not be construed as limiting the disclosure of the herein disclosed subject matter and shall in no way be construed as limiting in particular the claims.

It is further noted that any percentage provided herein shall be considered a weight percentage and shall be considered as being based on the overall (entire) coating material (i.e. on weight of the overall coating material) where applicable and where not explicitly indicated otherwise. In this regard, terms like "with respect to", "based on", "with regard to" are considered synonymous herein. Weight percent is in some cases abbreviated by "w-%" (weight percent (or weight %)=w-%). Further abbreviations used herein are: micrometer=µm; millimeter=mm; lines per millimeter=l/mm; nanometer=nm; dots per inch=DPI; non-impact printing=NIP; hour=h; minute=min; second=s; Kelvin=K, degrees Celcius=° C.; ultraviolet radiation=UV or UV radiation.

It is further noted that herein a reference to a glass transition temperature Tg shall be considered as reference to the glass transition temperature of the uncured coating material if not otherwise stated. According to an embodiment, the glass transition temperature (Tg) of the polymers is determined by differential scanning calorimetrie (DSC) measurements with a heating and cooling rate of 20 K/min. According to a further embodiment, the glass transition temperature is determined based on ISO 11357-2. According to a further embodiment, the polymers are first heated from 25° C. to 80° C., the temperature hold for 1 minute, cooled to 20° C. and the temperature hold for 1 minute again (20 K/min). In a second step the polymers were heated to 130° C. which was used for determination of the Tg (20 K/min). The Tg is determined by evaluating the point of onset of the endothermal step.

In the context of the present technology, the term "about" in combination with a numerical value means in particular within a range of plus and minus 10% with respect to the given value. For instance, "about 6 µm" means preferably within a range of 5.4 µm to 6.6 µm.

Further, it is noted that herein any overlapping ranges specified for the same quantity in some embodiments (e.g. for Tg: range 1=between 40° C. and 60° C. and range 2=between 50° C. and 70° C.) shall define inter alia also any partial range or combined range derivable from the specified boundaries (i.e. in the given example "between 40° C. and 60° C.", "between 40° C. and 50° C.", "between 40° C. and 70° C.", "between 50° C. and 60° C.", "between 50° C. and 70° C.", "between 60° C. and 70° C.", etc.). This applies for overlapping closed ranges (as given in the examples), overlapping open ranges (e.g. at least 50° C., at least 60° C., thus including also a range between 50° C. and 60° C.) as well as for one or more open range overlapping with one or more closed range.

In the context of the present technology, the term "hydroxyl number" or hydroxyl value is the value which is preferably defined as the number of milligrams (mg) of potassium hydroxide required to neutralize the acetic acid taken up on acetylation of one gram of a chemical substance that contains free hydroxyl groups. The hydroxyl value is a measure of the content of free hydroxyl groups in a chemical substance, usually expressed in units of the mass of potassium hydroxide (KOH) in milligrams equivalent to the hydroxyl content of one gram of the chemical substance. The analytical method used to determine hydroxyl value preferably involves acetylation of the free hydroxyl groups of the substance with acetic anhydride in pyridine solvent. After completion of the reaction, water is added, and the remaining unreacted acetic anhydride is converted to acetic acid and measured by titration with potassium hydroxide.

In the context of the present technology, the term "acid number" or acid value is preferably defined as the mass of potassium hydroxide (KOH) in milligrams that is required to neutralize one gram of chemical substance. The acid number is a measure of the amount of carboxylic acid groups in a chemical compound, such as a fatty acid, or in a mixture of compounds. In a typical procedure, a known amount of sample dissolved in organic solvent (preferably isopropanol), is titrated with a solution of potassium hydroxide (KOH) with known concentration and with phenolphthalein as a color indicator.

In the context of the present technology, a portion of the substrate surface, which the powder coating is placed on, can be construed as defining a plane spanned by an x-direction and a y-direction. The z-direction is then the direction perpendicular to this plane, i.e. the direction perpendicular to the plane defined by the substrate surface portion.

Analogously, the surface of one of multiple layers of powder coating which are placed on the substrate surface can be construed as defining a plane spanned in an x-direction and a y-direction.

In the context of the present technology, the term "lateral" preferably refers to the x-direction and y-direction or, stated differently, the position within the plane defined by the corresponding portion on the substrate surface. The term "height" preferably refers to the z-direction, or stated differently the position perpendicular to the plane defined by the substrate surface.

In the context of the present technology, the term "derivative" means preferably any compound that can be imagined to arise from another compound, if one atom or group of atoms is replaced with another atom or group of atoms. Stated differently, the term "derivative" means preferably a structural analog. Alternatively or additionally, the term "derivative" is used in the context of the present technology for compounds that can be derived at least theoretically and/or can actually be derived by a chemical reaction from the compound that is referred to and/or can be theoretically or by an actual chemical reaction be derived from a common precursor of the compound which is referred to.

Powder coating is applied mostly as a dry powder on a variety of substrate surfaces. In contrast to conventional liquid paint, powder coating does not require a solvent while the powder may be a thermoplastic or a thermoset polymer. The coating is typically applied with a spray gun electrostatically and/or an airflow and is then cured under heat resulting in a hard finish that is tougher than conventional paint. Powder coating may be used in a wide variety of technological fields and applications such as household appliances, automobile or bicycle parts. Powder coatings provide advantages as no solvents are required and, hence, negligible amounts of Volatile Organic Compounds (VOC) are released into the atmosphere, if any at all. Further, by powder coatings thicker coatings than conventional coatings can be obtained. Powder coated items generally have only very few appearance differences between horizontally coated surfaces and vertically coated surfaces.

However, so far powder coating is used for providing a coating of relatively extended surfaces without selectively providing a specific coating pattern or image on the coated surface. The herein described technology is based on the idea of combining the advantages of a powder coating process with a non-impact printing process carried out by a non-impact printing device. The herein described technology allows for realizing the advantages of powder coating also for high resolution contour patterns and printed images on a variety of substrates.

The following chapters provide embodiments for one or more of the above identified aspects of the herein disclosed subject matter wherein at least some of the chapters focus on particular views on the herein disclosed subject matter. Nevertheless, the embodiments under all views describe embodiments of the herein disclosed subject matter, in particular of common aspects and in particular of the above defined aspects. It should be understood that any embodiments disclosed with regard to a particular chapter or aspect may of course also combined with embodiments of other chapters and/or aspects.

Further, it is noted that advantageous embodiments are defined by combining a general aspect disclosed herein with one or more embodiments described herein, for example with one or more embodiments of a single chapter.

Chapter 1

In the case of common toner systems as known from the state of the art, the toner particles usually show only a relatively poor adherence to the substrate surface, in particular in the case of surfaces which are due to their intended use under mechanical stress and exposed to abrasive environmental influences. Further problems can be seen in the relatively low stability of the material against solvents or other chemical substances as well as environmental influences. It follows from the above stated, that the applicability of materials so far known from the state of the art is restricted.

It is therefore an object of the present application to provide systems which provide suitable resistance and stability against abrasive effects due to harsh weather conditions and/or mechanical stress, stability against chemical substances such as chemical solvents, stability against electromagnetic radiation, in particular ultraviolet radiation, and at the same time allow for a high resolution, sufficient hardness and excellent adherence to a variety of substrate surfaces.

In this context it should be noted that common coating powder compositions as used for powder coating in industrial applications are not suitable for non-impact printing. Therefore, the claimed subject-matter advantageously combines both, the concept of non-impact printing as well as the concept of coating powders profiting from the advantages of both technical fields while the same time avoiding their respective disadvantages.

In an embodiment, the formation of micro-scale droplets is avoided. Among the disadvantages, which result from the formation of micro scale droplets, are the deterioration of the printed image due to forces which result from the presence of said micro-scale droplets.

According to an embodiment a coating material, in particular for digital printing, is provided, the coating material comprising: a resin comprising at least one resin component, in particular at least one type of resin, the resin comprising in particular an amorphous resin portion; a curing agent comprising in particular at least one crosslinking agent and/or at least one initiator (e.g. at least one thermal initiator and/or at least one photoinitiator) and/or at least one catalyst; and wherein the cured coating material comprises the curing agent in an amount such that the cured coating material is able to reach a rating of at least 2-3 in the Methylethylketone test after 10 s according to the DIN EN 12720 and/or the cured coating material resists at least 50 IPA (Isopropyl alcohol) double rubs. According to an embodiment, the initiator is a thermal initiator or an UV initiator.

According to an embodiment, one acetone or IPA double rub is meant one back and forward movement over the surface of a coating having a thickness of approximately 60 µm using a cotton cloth drenched in acetone or IPA, which cotton cloth covers a hammer head having a weight of 980 gram and a contact surface area with the coating of 2 cm2. Every 20 rubs the cloth is drenched in acetone or IPA. The measurement is continued until the coating is removed (and the obtained DR (double rub) number is noted down) or until 100 DR are reached.

According to an embodiment, the resin (or the coating material) comprises one or more of the following:
(i) a polyester resin component containing with respect to the overall amount of incorporated acid monomersgroups, at least 5 w-% isophthalic acid, in particular at least 10 w-% isophthalic acid, further in particular at least 25 w-% isophthalic acid, further in particular at least 30 w-% isophthalic acid, further in particular at least 50 w-% isophthalic acid, further in particular at least 80 w-% isophthalic acid, further in particular at least 85 w-% isophthalic acid;
(ii) a polyester resin component containing 1 to 100 wt-% of cycloaliphatic glycol compounds with respect to the total weight of the (incorporated) glycol compounds of the polyester resin component, in particular 2,2,4,4-tetraalkylcyclobutane-1,3-diol and/or 2,2,4,4-tetramethyl-1,3-cyclobutanediol;
(iii) an acrylic resin;
(iv) a fluorine containing polymer, in particular a hydroxyl functional fluorine polymer;
(v) a polyurethane resin.

Polyester resin (components) comprising (incorporated) isophthalic acid may be in particular advantageous for providing wheatering resistance. The cycloaliphatic glycol compound may be configured according to embodiments disclosed herein. As will be understood by those skilled in the art and generally herein, a resin or polymer or an oligomer specified as comprising or containing or consisting of monomers or monomer groups means that the resin or polymer or oligomer has incorporated the monomers or monomer groups.

According to a further embodiment, an Erichsen depth of at least 1 mm, in particular at least 2 mm, in particular at least 3 mm according to the EN ISO 1520 is reached after curing the coating and if the coating has formed a layer thickness below 10 µm. According to an embodiment the cured coating material resists at least 5 acetone double rubs, in particular at least 10 acetone double rubs, in particular at least 20 acetone double rubs. According to a further embodiment the coating material is curable at least partly only by heat and/or by radiation.

According to an embodiment, the coating material has an absolute value of chargeability of at least 5 µC/g, in particular of at least 10 µC/g and further in particular of at least 20 µC/g. According to a further embodiment the coating material exhibits an activation time of 1 to 15 min, in particular 2 to 10 min tested in a standard Epping q/m equipment. According to an embodiment, the test is performed with a soft blow.

According to an embodiment, the at least one crosslinking material is chosen from epoxy/glycidyl-group-containing materials, including epoxy-resins and Triglycidylisocyanurate, hydroxyalkylamide (e.g. so called primids) hardeners, isocyanate hardeners and/or double bond containing compounds with a thermal radical initiator system. According to an embodiment, the coating material is a pure epoxy system (with regard to its resin/crosslinking material). According to a further embodiment, the epoxy material is used as a hardener for polyester. According to another embodiment, the resin is made out of at least one polyester resin component and at least one epoxy resin component. In this case epoxy resin is a kind of hardener (crosslinking material) for polyester resin. According to an embodiment, epoxy resin is in a lower concentration than polyester resin. However, in literature there is a discussion that there is no more clear boundary as to when a resin is called a crosslinking material (also referred to as crosslinker) or a resin. Generally, according to an embodiment, a curing agent can also be a resin and also the same resin can be a crosslinking material if the chemistry allows crosslinking, like for example in epoxy systems.

According to an embodiment, resins comprising different resin components (e.g. epoxy/polyester) are called hybrid systems.

According to an embodiment, the coating material comprises a charge control agent (CCA) in an amount, with respect to the entire coating material, of at least 0.5 w-%, in particular higher than 1 w-%, and in particular higher than 1.5 w-%.

According to an embodiment, the CCA includes a zinc compound, in particular a Zinc Salicylic compound, and in particular in a concentration of higher than 90 w-% based on the overall amount of CCA.

According to an embodiment, the cross linking agent is contained in an amount between 0.3 and 1.7, in particular between 0.7 and 1.3 and in particular between 0.9 to 1.1 of the molar ratio sufficient to cure the resin.

According to an embodiment, the resin comprises a polyester with an OH-value and/or COOH-value of at least 10 mg/g KOH determined via titration and has an average molecular weight Mn between 500 and 10.000 g/mol determined via gel permeation chromatography (GPC) and polystyrene standards. According to a further embodiment, the polyester contains, with respect to the overall amount of incorporated acid monomers-groups, at least 5 w-% isophtalic acid, in particular at least 25 w-% in particular at least 50 w-%, further in particular at least 85 w-% (of isophtalic acid). According to an embodiment, the coating material is a curable system which has a stability of at least one year Florida according to GSB and/or Qualicoat standards for architectural coatings.

According to a further embodiment, the coating material comprises with respect to the entire amount of coating material less than 1 w-% of leveling/flow additive, in particular organic levelling/flow additive, even more preferably less than 0.5 w-%, in particular less than 0.4 w-% and most preferably less than 0.1 w-%. As known in the art, flow and levelling additives are chemical compounds that increase a coating's mobility after application, thus enabling the process of levelling (see e.g. 2010 Additives Handbook, Dr. Darlene Brezinski, Dr. Joseph V. Koleske, and Robert Springate, Jun. 4, 2010).

The leveling/flow additives mentioned above and below, which mainly influence the surface tension of the coating material and hence improve the (viscous) flow behaviour of the coating layer (and hence may also be referred to as film flow or film leveling additives) have to be distinguished from inorganic leveling or flow additive (herein also referred to as powder leveling/flow additive) which is added to the surface of the individual particles of the coating material, typically done by a dry blending and/or a bonding process, to alter the flow and/or charging properties of the individual powder particles.

According to a further embodiment, the coating material comprises, with respect to the entire amount of coating material, less than 10 w-%, preferably less than 5 w-% and most preferably less than 1 w-% inorganic material. In this regard, it is noted that if an inorganic material is used as a pigment, the amount may be higher. For example, according to an embodiment titanium dioxide may be included in an amount as specified if used as inorganic material, in particular as inorganic powder leveling additive or as powder flow additive. However, if titanium dioxide is used as a pigment, the amount may be higher, in particular depending on the desired appearance.

According to an embodiment, the coating material contains at least one acrylic resin with epoxy equivalent weight of 100-2000 g/Eq, in particular 200-1000 g/Eq, in particular 400-600 g/Eq.

According to a further embodiment, the resin of the coating material contains at least one polyester resin with an OH-value of at least 10 mg/g KOH, in particular at least 80 mg/g KOH and further in particular at least 250 mg/g KOH. According to a further embodiment, the curing agent comprises an isocyanate hardener with a NCO-content of at least 5 w-% to 30 w-% with respect to the overall amount of isocyanate hardener, in particular of at least 8-20 w-% and further in particular of at least 12 w-%-15 w-% (with respect to the overall amount of isocyanate hardener). According to a further embodiment, the isocyanate hardener is blocked.

According to an embodiment, the coating material comprises an inorganic surface additive. According to a further embodiment, the inorganic surface additive comprises in particular one or more of inorganic oxides of silicon and/or titanium, in particular with a particle size between 1 nm and 100 nm, further in particular between 5 nm and 70 nm.

According to an embodiment, the coating material comprises two or more different inorganic oxides with a ratio of the average particle diameter between 2 to 10, preferably 5 to 7. According to an embodiment, providing different inorganic oxides (e.g. of the same material, e.g. titanium (di)oxide or silicon (di)oxide) which have a particle size distribution in the specified range may improve charging capabilities of the coating material. This may be of advantage in an electrostatic printing process (e.g. electrophotographic printing process) (one example of a NIP process).

As commonly known an electrostatic printer is a type of printer in which the image is first written as a pattern of electrostatic charge, and is then made visible by bringing the pattern into contact with particles of pigment that carry a charge of opposite polarity. The pigment is only attracted to the charge pattern and is subsequently fused or bonded to a target surface.

As further commonly known an electrophotographic printer is a type of printer in which the required image is written by a beam of light onto a photoconductor (e.g. a photoconductive drum or band) that has a uniform electric charge over its surface. The action of the beam of light produces a charge pattern on the photoconductor, which is then developed by applying particles of pigment that are attracted to the image but are repelled by the background. The image is then transferred to the target surface by pressing the target surface against the photoconductor and applying an electric field. The particles of pigment (also referred to as toner) is fixed to the target surface, e.g. by heat and/or pressure or by passing through a solvent vapor bath.

An electrophotographic printer can yield good print quality. It forms its image as a fine matrix of dots and is therefore capable of producing graphics and a wide variety of typestyles. The most common example of an electrophotographic printer is the laser printer.

According to an embodiment, the coating material comprises a compound which includes chemical bonds which reversibly can be opened at an opening temperature between 50 and 200° C., preferably 75 and 150° C. and reversibly can be closed again below the opening temperature. This may allow the coating material to provide self-healing effects.

According to an embodiment, the coating material exhibits a minimum viscosity, when being heated from room temperature with a heating rate of 5 Kelvin per minute up to 180° C., 200° C. or 220° C. and/or to a temperature where curing of the coating material occurs, wherein the minimum viscosity is in a range between 3 Pascal seconds to 20000 Pascal seconds, in particular in a range between 50 Pascal seconds and 10000 Pascal seconds and further in particular in a range between 250 Pascal seconds and 7000 Pascal seconds. According to an embodiment, the minimum of the viscosity is a local minimum of the viscosity with respect to temperature. According to an embodiment, the coating material is heated with a heating rate of 5 Kelvin per minute to an upper temperature which is sufficiently high such that the viscosity over temperature (in other words the temperature dependent viscosity) shows a local minimum. According to an embodiment, the viscosity is determined with a conventional rheometer as it is known in the art.

According to an embodiment, the coating material exhibits a pill flow length below 350 mm at a potential curing temperature which may be used to cure the coating material, and wherein the pill flow length is determined by the following method:
  (i) pressing an amount of 0.75 gram of the coating material into a cylindrical pill with a diameter of 13 mm at a force of 20 kilo Newton, 20 kN, for at least 5 seconds;
  (ii) putting the pill of coating material on a metal sheet at room temperature;
  (iii) putting the metal sheet with the pill into a furnace preheated to the potential curing temperature and tempering the pill on the metal sheet in a horizontal position for half a minute if the resin includes an acrylic resin component and for one minute if the resin does not include an acrylic resin component;
  (iv) tilting the metal sheet to a flowing down angle of 65° and maintaining the metal sheet in this position for 10 minutes at the potential curing temperature;
  (v) removing the metal sheet from the furnace, cooling down the metal sheet and the coating material in the horizontal position, measuring a maximum length of the pill on the metal sheet and taking this maximum length as the pill flow length.

According to an embodiment, the coating material is a thermosetting coating material. According to a further embodiment, the thermosetting coating material comprises a curable polyester resin (also referred to as polyester resin component), containing 1 to 100 wt-% of cycloaliphatic glycol compound with respect to the total weight of the (incorporated) glycol compounds of the curable polyester resin. Such a curable polyester resin can be used as component of the thermosetting coating material (e.g. a thermosetting powder composition). The cycloaliphatic glycol components can comprise in particular 2,2,4,4-tetraalkylcyclobutane-1,3-diol (TACD), wherein each alkyl substituent can comprise up to 10 carbon atoms and wherein the alkyl substituents can be linear, branched or a mixture thereof and wherein the diols can be either cis- or trans-diols. The curable polyester can comprise any possible mixture of isomers of TACD.

According to an embodiment the cycloaliphatic compound comprises or consists of 2,2,4,4-tetramethyl-1,3-cyclobutanediol (TMCD).

According to another embodiment the coating material comprises a mixture containing 1 to 99 wt-% of TMCD isomer(s) and 99 to 1 wt-% of cycloaliphatic 1,4-cyclohexanedimethanol isomer(s) (CHDM) with respect to the total weight of the cycloaliphatic glycol compounds of the curable polyester. According to an embodiment, the mixture consists of the TMCD isomers and the CHDM isomers.

According to another embodiment, the curable polyester resin comprises polyol compounds, other than the cycloaliphatic glycol compounds, containing at least 1 hydroxyl group (e.g. at least 2 hydroxyl groups) and representing at least 1 wt-% with respect to the total weight of all (incorporated) polyol compounds of the curable polyester.

The aforementioned curable (thermosetting) polyester resins are particularly useful for outdoor applications because at least one of the following properties can be achieved after curing: good chemical resistance, good hydrolytic stability, good weathering stability, high heat resistance, high scratch resistance, high impact strength, toughness, high ductility, good photooxidative stability, transparency and flexibility.

According to an aspect of the herein disclosed subject matter, a use of a coating material is provided, in particular a use of a coating material according to one or more embodiments of the herein disclosed subject matter is provided.

According to an embodiment, there is provided a use of a coating material for applying a coating layer to a target surface by means of a NIP device.

In accordance with an embodiment, there is provided a use of a developer for generating from the coating material the coating layer according to embodiments disclosed herein.

According to an embodiment, the coating material is used for applying a layer of the coating material to a target surface, in particular by means of a NIP device, in particular to a target surface of a transfer element or a target surface of a substrate.

In a special embodiment the coating material can be applied (printed) to a transfer element and then the printed coating material layer can be transfered to a final substrate. Any technology known for such transfers are within the scope of the herein disclosed subject matter. For example the use of transfer sheets, decals, water transfer printing or water slide printing can be used. A decal may be a plastic, cloth, paper or ceramic substrate that has printed on it a pattern or image that can be moved to another surface upon contact.

According to a further embodiment, the coating material is used for applying different layers of the coating material to the target surface of the substrate, wherein in particular the substrate is a precoated substrate which comprises a pre-coating, in particular a pre-powder coating.

According to a further embodiment, a use of a coating material according to one or more embodiments is provided for applying a layer of the coating material to a target surface, in particular by means of a NIP device, in particular to a target surface of a transfer element or a target surface of a substrate; in particular for applying different layers of the coating material to the target surface of the substrate, wherein in particular the substrate is a precoated substrate which comprises a pre-coating, in particular a pre-powder coating.

According to an embodiment, the coating material comprises the same resin, in particular the same type of resin or the same resin system, and the same hardening system, in particular the same curing agent, like the pre-coating (e.g. an undercoat or basecoat) on the substrate. Herein, the type of resin refers to the chemical system of a resin or a resin component. An example of a type of resin is for example a polyurethane type. According to a further embodiment, the coating material comprises the same resin system as the pre-coating on the substrate. The same resin system may be the polyurethane system.

According to an embodiment, at least one coating material (each of which is configured according to one or more embodiments of the herein disclosed subject matter) is used for printing at least one layer, in particular at least two layers (of the same coating material or of different coating materials) on top of each other, in particular in two distinct printing processes, e.g. by two different printing units or in two different runs of the same printing unit. According to an embodiment, each layer comprises functional groups that can react with functional groups of the previous layer, e.g. when heated. According to an embodiment, the functional groups are one or more of COOH, OH, NCO and Epoxy.

According to an aspect of the herein disclosed subject matter, a method is provided.

According to an embodiment, the method comprises applying a coating layer (e.g. at least one coating layer) generated from (e.g. being formed from) a coating material (e.g. at least one coating material) according to one or more embodiments of the herein disclosed subject matter to a target surface, in particular by means of a NIP device.

According to an embodiment, the target surface is a surface of a transfer element which is used to transfer the coating layer to a substrate.

According to a further embodiment, the target surface is a surface of a substrate.

According to an embodiment, the method comprises applying a top coat to the coating layer, in particular if the coating layer is located on the substrate.

According to an embodiment, the topcoat is a clear top coat. According to a further embodiment, the topcoat is provided as a printed layer or as a coated layer. In particular, the topcoat may be provided as a (further) coating layer according to embodiments of the herein disclosed subject matter or by conventional processes such as powder coating. In particular the coating layer comprises at least one of UV-absorber or anti-yellowing agent. According to an embodiment, the top coat is a continuous layer, e.g. a layer which covers the entire surface. In another embodiment the top coat is a structured top coat which covers a defined area (e.g. in the shape of a character).

According to an embodiment, the method comprises curing the top-coat separately from the coating layer, wherein in particular the coating layer comprises free functional groups for the connection of the coating layer and the topcoat.

According to a further embodiment, the method comprises curing together the top-coat and the coating layer, wherein in particular the coating material is a powdery coating material and the top coat is applied as a powdery top coat layer before the curing together of the coating layer and the top coat layer.

It is noted that any embodiment which refers to a powdery coating material shall be considered as also disclosing a respective embodiment which refers instead to a coating material which is provided in the form of a plurality of particles. In this sense, a powder shall be understood as also disclosing, according to an embodiment, a plurality of particles.

According to an embodiment, the substrate is a precoated substrate which comprises a pre-coating, in particular a pre-powder coating. According to a further embodiment, the coating material comprises the same resin type (e.g. polyesters, acrylics, fluorinepolymers, polyurethanes, epoxies) and the same hardening system as the pre-coating on the substrate. According to an embodiment, the coating material comprises the same resin and/or the same curing agent as the pre-coating on the substrate.

According to an embodiment, a layer thickness of the topcoat is at least 10 µm, in particular at least 20 µm and further in particular at least 40 µm.

According to an embodiment, the substrate is a glass substrate or a ceramic substrate. In such a case, according to an embodiment the method further comprises a pretreatment of the substrate with an adhesion promoter and/or addition promoter, wherein the adhesion promoter is in particular pyrolytically deposited silicon dioxide, in particular pyrosil.

According to an embodiment, a reservoir, in particular a cartridge, for a NIP device, is provided, the reservoir comprising a coating material according to one or more embodiments of the herein disclosed subject matter. According to an embodiment, a nonimpact printing device according to embodiments of the herein disclosed subject matter requires (in particular due to the thickness of a coating layer or a coating layer package as described herein) a relatively large amount of coating material. According to an embodiment, the reservoir is respectively adapted, e.g. regarding volume, geometry and/or structure adapted to the volume, etc.

According to an embodiment, a developer is provided, in particular a developer for a two-component (2K) system comprising the coating material according to one or more embodiments and a carrier, in particular a carrier for electrophotographic printing as described herein or as known in the art.

According to another embodiment the carrier comprises non-magnetic carrier particles (soft carrier particles). According to another embodiment the carrier comprises magnetic carrier particles (hard carrier particles).

According to an embodiment, the reservoir (e.g. the cartridge) is a reservoir for a two-component (2K) system comprising the coating material according to one or more embodiments and a carrier, in particular a carrier for electrophotographic printing as described herein or as known in the art. In other words, the reservoir may comprise the developer. In this sense, herein any reference to a reservoir content may be considered as a reference to a developer.

According to an embodiment, the reservoir content (which includes in particular the coating material and the carrier) comprises at least 4 w-% of the coating material based on the overall weight of the reservoir content, in particular at least 6 wt-%, further in particular at least 8 w-%, further in particular at least 10 w-%, further in particular at least 16 w-%, and further in particular at least 20 w-% of the coating material based on the overall weight of the reservoir content. According to a further embodiment, the reservoir content comprises the coating material in a range between 4 w-% and 30 w-% based on the overall weight of the reservoir content. According to an embodiment, the reservoir content comprises 10% or less of the coating material based on the overall weight of the reservoir content. According to a further embodiment, the reservoir content consists of coating material and carrier. In this case, an amount of 8 w-% of the coating material corresponds to an amount of 92 w-% of the carrier. Hence, contrary to conventional toner systems, a cartridge according to embodiments of the herein disclosed subject matter may comprise a relatively large amount of coating material (i.e. of the material that is printed). According to an embodiment, the carrier in the reservoir may be reused (e.g. if the reservoir is a built-in reservoir) or may be exchangeable (e.g. with an exchangeable cartridge into which the carrier is confined).

According to an embodiment, a NIP device is provided, the NIP device comprising a coating material according to one or more embodiments of the herein disclosed subject matter.

According to an embodiment, a transfer element is provided, the transfer element comprising a coating layer generated from a coating material according to embodiments of the herein disclosed subject matter.

According to an embodiment, a substrate is provided, in particular a pre-coated substrate, the substrate comprising a coating layer generated from a coating material according to embodiments of the herein disclosed subject matter.

According to an embodiment, a coating layer application device is provided, the coating layer application device being configured for receiving a transfer element comprising a coating layer generated from a coating material according to one or more embodiments of the herein disclosed subject matter. According to an embodiment, the coating layer application device is further configured for applying the coating layer to a substrate.

In particular the formation of micro scale droplets can be avoided by one of more of the following:

In an embodiment the coating composition comprises auxiliary components, in particular solids comprising silicon compounds and/or titanium compounds and derivatives thereof. It has been surprisingly found by the inventors that such auxiliary components may act as separating agents which may reduce the undesired adhesion effects of micro-scale droplets, which are responsible for the distortion of the printed image. In a particular embodiment, the particles of the auxiliary components, in particular the silicon and/or titanium compounds have an average nanoscale diameter, more in particular a mean diameter of about 5 nm to about 70 nm (namometer). Further ways for avoiding the formation of micro-scale droplets can be taken from the described examples which may be generalized correspondingly.

With respect to the described auxiliary components in particular in the case of the silicon compounds it was found that such components are particularly effective in conjunction with charge control agents in order to provide a suitably stable and equally distributed charge of the particles, being stable over several hours. Summarizing, it is in particular the combination of the charge control agent with at least one further auxiliary component, in particular silicon compounds and/or derivatives thereof, which allow for a high quality non-impact printing process.

In an embodiment the coating composition comprises a polymer with sufficient amount of free hydroxyl groups or free reactive groups like COOH, OH, epoxy and/or NCO. Such a polymer with a plurality of free functional groups (e.g. free hydroxyl groups) allows for suitable adherence between the various layers built up upon each other. This becomes in particular striking, when the coating according to the application is used for repairing or refreshing surfaces which have been coated by conventional coating methods. The free functional groups (e.g. the free hydroxyl groups) then allow for suitable adherence of the freshly added coating to the coating composition already present.

In an embodiment, the method for providing the coating by non-impact printing comprises the step of pre-curing the coating material. Such a pre-curing step may be performed by applying one or more of the following: heat, pressure, electron beam and electromagnetic radiation, in particular UV radiation.

The step of pre-curing the coating material may be such that it leaves at least some of the functional groups, i.e. reactive groups, free, i.e. unreacted. Since such free reactive groups are then available for a reaction with functional groups on the surface of the lower layer, the pre-cured coating material can strongly and reliably bind to the lower coating layer which allows for the successive build-up of a plurality of different layers, which finally form a coherent and stable structure. A pre-curing step of the coating material is therefore in particular advantageous for successively applying a plurality of layers above each other. In a particular embodiment, the pre-curing step is such that it enables the reaction of functional groups, in particular of the reactive crosslinkable functional groups, with each other, under the premise that at least 1%, in particular at least 5%, more in particular at least 10%, more in particular at least 30% of the reactive functional groups, in particular of the reactive crosslinkable functional groups, are left unreacted.

Due to the described advantageous adherence to a plurality of different types of surfaces and different surface shapes, the described composition as well as the described method for applying such a composition can advantageously be used for the renewal of an already powder coated surface. For instance a coated surface which over the time, for example due to harsh weather conditions or other mechanical stress, has lost at least partially some of its desired properties, for instance color intensity, may be restored by (selectively) applying the coating as described in the present application.

Embodiments of the herein disclosed subject matter preferably use zinc salicylic compounds as the so-called CCA in a concentration of at least 2% (based on overall weight). Experiments show that these CCAs affect the charging properties of the particles of the coating material (also referred to as toner particles) not as expected. No linear correlation of the charging capability with increasing amount of CCA was observed. Still the CCA may be a highly important component of the coating material particles because examples show that it may be crucial to obtain the desired color density (optical impression), while not influencing the color stability (UV exposure). Zinc salicylic compounds can be used to obtain the desired color density for all colors (CMYK, white) necessary for printing a high-resolution color image. So one might call the zinc salicylic compounds a color density agent rather than CCAs in the case of the herein disclosed coating material particles.

The toners according to embodiments of the herein disclosed subject matter are suitable for high resolution and quality printing, which is a major novelty regarding powder coating based toner particles. Furthermore, according to an embodiment coating materials according to the herein disclosed subject matter are produced in a single procedure (single extrusion of the base materials (e.g. resin and further components of coating material) and subsequent milling) and are not made by re-compounding conventional powder coatings with additives and the like. Consequently, no double extrusion and additional steps are necessary to produce the coating material resulting in lower costs, environmental advantages, decreased energy requirements, no undesired pre-reactions due to elevated temperatures or shear forces.

According to an embodiment, the coating materials differ from conventional toners in particular regarding the particle size distribution and the different particle composition and structure.

Conventional, chemically produced toners for printing may comprise a core-shell structure often consisting of two different resins and are often produced by emulsion/aggregation processes. Additives, pigments, the CCA, waxes and the like are often located in the core of these particles. Overall, the core-shell structure results in an inhomogeneous toner particle.

In contrast, according to an embodiment of the herein disclosed subject matter the coating material particles are homogeneous. In particular, according to an embodiment the coating material particles are homogeneous in a sense that the coating material particles are free from an internal structure (of different composition) with dimensions comparable to the particle size (e.g. structures with a dimensions between 0.6 to 1 times the particle size or between 0.8 to 1 times the particle size) is defined as homogeneity regarding the composition per volume unit. According to a further embodiment homogeneity is defined as the average number of particles or repeat units (for resins) of each toner component per volume element of the toner particle. It is noted that the term homogeneous does not necessarily mean homogeneous in the sense of homogeneous mixtures since usually distinguishable phases are present. Another suitable definition of homogeneity may be the average mass per volume element of the toner particle, resulting in a rather uniform density distribution for the coating material particles, whereas in contrast conventional chemically produced core-shell toner particles should show a significant density gradient at the core-shell border.

The particle size distribution of the charge control agent according to embodiments of the herein disclosed subject matter is believed to lead to better homogeneity of the coating material particles and thereby the enhancement of color density.

Embodiments of the herein disclosed subject matter make possible the printing of high-resolution and quality images with curable coating material.

According to an embodiment, a NIP technique uses a soft magnetic brush (i.e. initially non magnetic particles (soft carrier particles).

According to an embodiment in the preparation of the coating material the processing of the constituents of the coating material is conducted so as to prevent pre-reaction of the coating material. This may limit the processing time in an extruder so that the dispersion may not be as high as in a conventional thermoplastic toner (which does not cure). Without being bound to theory it is believed that this may be a reason for the positive effect provided by relatively high concentrations of CCA. However, according to another embodiment, the coating material may be free from CCA, in particular with transparent coating materials.

Chapter 2

According to an embodiment, the coating material is configured for generating a coating layer by NIP, the coating material being provided in the form of a plurality of particles. According to an embodiment, the coating material comprises resin. According to an embodiment, the resin comprises a curable resin component. According to a further embodiment, the resin further comprises an amorphous resin portion. According to a further embodiment, the resin component is at least partially thermally curable, in particular curable by a crosslinking agent able to react with functional groups of the resin component. According to a further embodiment, the coating material comprises a charge control agent.

According to an embodiment, the content of the charge control agent is less than 20% based on the overall weight of coating material. According to a further embodiment, the content of the charge control agent is in a range between 0.1 w-% to 10 w-%, in particular 0.2 w-% to 5 w-%, further in particular 0.5 w-% to 3 w-%, based on the overall weight of the coating material. According to a further embodiment the content of charge control agent is at least 0.1 w-% based on the overall coating material, in particular at least 1 w-% and further in particular at least 2 w-% based on the overall weight of coating material.

According to an embodiment, a glass transition temperature of the uncured coating material is higher than 45° C. and lower than 90° C., and is preferably in a range between 50° C. and 70° C.

According to an embodiment, the charge control agent includes one or more of the following:
 a modified inorganic polymeric compound,
 an organic metal complex (e.g. azo-metal Cr3+),
 a boro-potassium salt, in particular potassium borobisbenzilate
 a zinc salicylic compound, in particular Zinc Salicylate
 an oxy carboxylic acid zinc complex
 a metal chelate compound, in particular of alkylsalicylic acid or hydroxynaphthoic acid,
 a quaternary ammonium salt,
 an oxide of a metal alkyl,
 a salicylic acid metal complexe,
 a calixarene compound,
 an organic boron compound
 an Azine or Azine compounds
 an phenol compound, in particular phenol sulfides.

According to an embodiment, the amount of the amorphous resin portion is larger than 5 w-%, in particular larger than 20 w-% and further in particular larger than 50 w-%, based on the overall weight of the coating material.

According to an embodiment, the coating material comprises a salicylic compound, in particular a zinc salicylic compound.

According to a further embodiment, the resin comprises one or more of the following:
 (i) a polyester resin component comprising in particular terephtalic acid and/or isophtalic acid;
 (ii) a di- or polyisocyanate;
 (iii) an acrylic resin, e.g. methacrylic resin;
 (iv) a fluorine containing polymer preferably a hydroxyl functional fluorine polymer
 (v) a polyester resin component comprising a cycloaliphatic glycol compound;
 (vi) a polyurethane resin.

According to an embodiment (i) to (vi) each may be referred to as a type of resin.

According to an embodiment, the polyester is a polyester which is transferable at least partly to a urethane material during curing.

According to an embodiment, a particle size distribution of the charge control agent exhibits a d10 of between 0.5 and 5 μm, and/or a d90 of between 5 and 50 μm. According to a further embodiment, the particle size distribution of the charge control agent exhibits a d10 of between 0.5 μm and 3 μm and/or a d90 of between 5 and 25 μm. According to a further embodiment, the particle size distribution of the charge control agent exhibits a d10 below 2 μm and/or a d90 below 10 μm. Herein and as is generally known, a specific value for dx (in the above examples x=10 or x=90) indicates that an amount x of the particles is smaller than the specified size.

According to an embodiment, wherein coating material is curable such that a cured coating layer made from the coating material exhibits one or more of the following properties:
 a remaining gloss after 300 hours of UV exposure according to GSB international AL631-PartVII-segment 20.1 Kurzbewitterung UV-B (313) is at least 50%, in particular at least 85%;
 a remaining gloss after 600 hours of UV exposure according to the test procedure of GSB international AL631-PartVII-segment 20.1 Kurzbewitterung UV-B (313) is at least 50%, in particular at least 85%;
 a remaining gloss after 1000 hours of Xenon exposure according to EN ISO 16474-2 determined according to ISO 2813, is at least 50%, in particular at least 85%;
 and in particular wherein the coating material comprises a polyester resin and/or a di- or polyisocyanate compound and/or urethane resin and/or an acrylate resin and/or Fluor-polymer resin.

In particular the polyisocyanate compound may react to polyurethane with OH groups, e.g. of an OH group polyester.

According to an embodiment, the charge control agent is transparent or is at least partially transparent. According to a further embodiment, the charge control agent is black. According to a further embodiment, the charge control agent has a gray color, in particular a light gray color or a white color.

According to an embodiment, the coating material is configured so as to allow a resolution of the NIP of more than 2 l/mm, in particular more than 5 l/mm and further in particular more than 10 l/mm.

According to an embodiment, the coating material is configured for providing a coating layer by the NIP with a thickness of at least 40 μm, in particular of at least 20 μm and further in particular of at least 10 μm. According to a further embodiment, an optically perceptible contrast (resulting e.g. from different coating material (e.g. of different colors)) in the coating layer extends continuously from a top surface of the coating layer to a bottom surface of the coating layer.

According to an embodiment, the coating material is further configured to allow an improvement of an adhesion of a coating layer made from the coating material on a substrate by application of pressure.

According to a further embodiment, the coating material further comprises at least one solid carrier configured for carrying the coating material in the NIP.

According to an embodiment, there is provided a use of a coating material according to embodiments of the herein disclosed subject matter for NIP of a coating layer. According to an embodiment, the coating material is used for direct NIP of the coating layer onto a substrate, in particular a precoated substrate.

According to a further embodiment, the coating material is used for indirect NIP of the coating layer onto a transfer element which is configured for transferring the coating layer to a substrate.

According to an embodiment, the processing device is configured for processing a coating material according to embodiments of the herein disclosed subject matter, the processing device comprising in particular at least one of: a NIP device configured for printing the coating material to thereby generate a coating layer; and/or a pretreatment device configured for treating the coating layer before application of the coating layer to a substrate; a coating layer application device for applying the coating layer, printed onto a transfer element, from the transfer element to the substrate; a curing device for curing the coating layer applied to the substrate; in particular wherein one or more of the NIP device, the pretreatment device, the coating layer application device, and the curing device are located at the same location and/or one or more of the NIP device, the pretreatment device, the coating layer application device, and the curing device are located in different locations.

According to embodiments of the herein disclosed subject matter, the processing device may include any feature disclosed herein with regard to one or more of the following devices: of the NIP device, the pretreatment device, the coating layer application device, and the curing device; in particular without requiring the respective device as such.

According to an embodiment, the method of processing a coating material according to embodiments of the herein disclosed subject matter includes in particular at least one of:
printing the coating material to thereby generate a coating layer;
treating the coating layer before application of the coating layer to a substrate;
applying the coating layer, printed onto a transfer element, from the transfer element to the substrate;
curing the coating layer applied to the substrate.

According to an embodiment, the reservoir, in particular a cartridge, which is in particular provided and/or configured for a NIP device (301, 400), comprises a coating material according to embodiments of the herein disclosed subject matter.

According to an embodiment, the transfer element comprises a coating layer generated from a coating material according to embodiments of the herein disclosed subject matter.

According to an embodiment, the substrate, in particular a pre-coated substrate, comprises a coating layer generated from a coating material according to embodiments of the herein disclosed subject matter. According to a further embodiment, the substrate and/or the pre-coating comprises free functional groups able to react with the applied coating layer. According to an embodiment, the coating layer has a thickness of at least 10 μm, in particular a thickness of at least 20 μm and further in particular a thickness of at least 40 μm. According to a further embodiment, the coating layer represents an image and wherein a resolution of the image is at least 100 DPI, in particular at least 200 DPI and further in particular at least 300 DPI.

According to an embodiment, the coating layer (in particular on the substrate and/or representing (showing) the image) is cured.

In an embodiment, the charge control agent has values of D10 in a range of 0.5 μm to 3 μm, D50 of 2 μm to 8 μm, and D97 of 8 to 12 μm. In a more particular embodiment, the charge control agent has values of D10 of about 2 μm, D50 of about 5 μm and D97 of about 10 μm. In an even more particular embodiment, the charge control agent has values of D10 in a range of 0.5 μm to 3 μm, D50 of 2 μm to 8 μm, and D97 of 8 to 12 μm while the charge control agent is present in an amount of at least 2 w.-%, more preferably in an amount of 2 w.-% to 3 w.-%. In a more particular embodiment, the charge control agent has values of D10 of about 2 μm, D50 of about 5 μm and D97 of about 10 μm while the charge control agent is present in an amount of at least 2 w.-%, more preferably in an amount of 2 w.-% to 3 w.-%.

According to an embodiment, the coating material comprises one or more flame retardants as known in the art. For example, according to an embodiment, the flame retardant is at least (but not limited to) one of a mineral, an organohalogen compound and an organophosphorus compound.

Chapter 3

According to an embodiment, the coating layer application device is configured for applying a coating layer, which is located on a transfer element, to a substrate, the coating layer being formed from a coating material (in particular a coating material according to embodiments of the herein disclosed subject matter, further in particular a thermosetting coating material), the coating layer being in particular curable, the coating layer comprising in particular an amorphous material.

The coating layer application device comprises: a heating device (or, in another embodiment, a (first) energy transfer device) being configured (or used) so as to (i) maintain the temperature of the coating layer within a temperature range (hereinafter also referred to as first temperature range) before removal of the transfer element from the coating layer, wherein within the first temperature range the uncured coating material is in its supercooled liquid state and/or in its glassy state; and/or (ii) partially cure the coating layer during a contact of the coating layer and the substrate and before removal of the transfer element from the coating layer, in particular by increasing the temperature of the coating layer to a temperature at or above a curing temperature of the coating layer.

According to an embodiment, maintaining the temperature of the coating layer within a temperature range can be performed with any suitable means (heating the coating layer directly, heating the coating layer indirectly (e.g. by heating the substrate and/or the transfer element). According to an embodiment, the heating device (or the first energy transfer device) may be located for heating the substrate before a contact of the substrate with the coating layer. According to a further embodiment, the heating device (or the first energy transfer device) may be located for heating the transfer element before a contact of the substrate with the coating layer.

According to an embodiment, the coating layer comprises a crystalline phase or can be at least partially brought into the crystalline phase, wherein the crystalline phase defines a melt temperature and the first temperature range is below the melt temperature. According to a further embodiment, the coating material exhibits one or more of the following features: the coating material is free from crystalline resin; the coating material exhibits no first order phase transition due to melting, in particular at least not within the first temperature range.

According to a further embodiment, the coating layer application device further comprises: a printing device being configured for applying the coating material to the transfer element by printing to thereby form the coating layer.

According to an embodiment, the printing device is a NIP device, e.g. an electrostatic printing device such as a laser printing device or a LED printing device.

According to a further embodiment, the printing device is configured for applying the coating material to the transfer element with a thickness of at least 1 micrometer (1 μm), in particular at least 2 μm, in particular at least 5 μm, in particular at least 10 μm, and further in particular with a thickness of at least 20 μm, for example with a thickness of at least 40 μm.

According to an embodiment, the printing device is configured for applying the coating material as a pattern to the transfer element to thereby form the coating layer as a patterned coating layer exhibiting the pattern.

According to an embodiment, the patterned coating layer exhibiting at least one of the following features: (i) the patterned coating layer exhibits a haptic effect; (ii) the patterned coating layer defines a surface structure, wherein the surface structure is defined by a thickness variation of the patterned coating layer; (iii) the pattern is a first pattern which combines with a second pattern to a combined pattern, in particular wherein the second pattern is formed from the same coating material or from a different coating material; in particular wherein the first pattern and the second pattern are located in a common layer plane; in particular wherein the first pattern comprises at least one void and wherein the second pattern at least partially fills the at least one void.

According to a further embodiment, the pattern (e.g. an image) extends entirely through the coating layer transverse to a layer plane of the coating layer.

According to a further embodiment, the printing device is configured for applying the coating material to the transfer element with a resolution of more than 2 l/mm, in particular with a resolution of more than 5 l/mm, e.g. with a resolution of more than 10 l/mm.

According to an embodiment an energy transfer device (e.g. second energy transfer device) is provided, the energy transfer device being configured (or used) for transferring energy, in particular heat and/or a radiation like UV radiation and/or an electron beam, into the coating layer on the transfer element, in particular before the contact of the coating layer and the substrate (to which the coating is applied). According to an embodiment the energy transfer device is configured for transferring energy, in particular heat and/or a radiation like UV radiation and/or an electron beam, into the coating layer on the transfer element during and/or after the contact of the coating layer and the substrate. According to an embodiment, the energy transfer device is configured for transferring the energy to the coating layer so as to partially cure the coating layer on the transfer element and/or to induce viscous flow in the coating layer on the transfer element). According to an embodiment, the energy transfer device is configured for providing energy in the form of at least one of heat, radiation, pressure, in particular to thereby induce the viscous flow. According to an embodiment, the coating layer application device (or, in another embodiment, the printing device) comprises the energy transfer device.

According to an embodiment, the energy transfer device (e.g. the first energy transfer device and/or the second energy transfer device) comprises a heatable roller. According to a further embodiment, an energy transfer device (e.g. the first energy transfer device and/or the second energy transfer device) comprises a heating device for heating the transfer element and/or for heating the substrate. For example, according to an embodiment, the transfer device is a heatable transfer device that includes a heating device.

According to an embodiment, the partial curing of the coating layer is performed by heating the coating layer (e.g. with an energy transfer device or heating device according to one or more embodiments of the herein disclosed subject matter) with a first heating rate to a temperature above the curing temperature and subsequent cooling (into the supercooled liquid state or into the glassy state, e.g. to room temperature) with a second heating rate (negative heating rate=cooling rate). According to an embodiment the first heating rate and the second heating rate are higher than 10 K/min, in particular higher than 20 K/min, further in particular higher than 50 K/min and further in particular higher than 100 K/min. According to an embodiment the first heating rate and the second heating rate are in a range higher between 10 K/min and 100 K/min.

It should be noted that partial curing means curing to a curing degree which is less than full curing. However, the main aspect is that only partial curing happens. Such partial curing can be defined in that way that after this partial curing still some reaction heat is given or consumed depending on the type of reaction (endotherm or exotherm or combinations thereof). Also a shift of higher than 1-2° C. of the Tg measured with DSC with a heating rate of 20 K/min of the coating (measured before and after (another) curing cycle) is a good indication that only partial curing has happened. Preferably based on the heat formation/consumption of the reaction a partial curing of below 80%, even more preferably below 50% is chosen.

According to an embodiment, a compaction device is provided the compaction device being configured for compacting the coating layer on the transfer element before the contact of the coating layer and the substrate. According to an embodiment, the coating layer application device (or, in another embodiment, the printing device) comprises the compaction device.

According to an embodiment, the transfer element having the coating layer thereon is a separate part and e.g. a transfer element support is configured for receiving the transfer element having the coating layer thereon as a separate part. Further, according to an embodiment the printing device is configured such that the transfer element is removable from the printing device.

According to an embodiment, the method comprises: providing a transfer element having thereon a coating layer which comprises an amorphous material and is curable, preferably at least partly curable by exposure to heat; bringing into contact the coating layer on the transfer element and a substrate in order to apply the coating layer to the substrate.

According to an embodiment, the method comprises maintaining the temperature of the coating layer within a first temperature range before removal of the transfer element from the coating layer. According to an embodiment, within the first temperature range the uncured coating material is in its supercooled liquid state and/or in its glassy state.

According to a further embodiment, the method comprises partially curing the coating layer during the contact of the coating layer and the substrate and before removal of the transfer element, in particular by increasing the temperature of the coating layer to a temperature at or above a curing temperature of the coating layer.

According to a further embodiment, wherein the coating layer comprises a crystalline phase or can be at least partially brought into the crystalline phase, wherein the crystalline phase defines a melt temperature and the first temperature range is below the melt temperature; or wherein the coating material exhibits one or more of the following features: the coating material is free from crystalline resin; the coating material exhibits no first order phase transition due to melting, in particular at least not within the first temperature range.

According to a further embodiment, the method further comprises applying the coating material to the transfer element by printing (in particular by NIP) to thereby form the coating layer.

According to a further embodiment, the coating material is applied to the transfer element with a thickness of at least 1 micrometer (1 μm), in particular at least 2 μm, in particular at least 5 μm, in particular at least 10 μm, and further in particular with a thickness of at least 20 μm, for example with a thickness of at least 40 μm.

According to an embodiment, the coating material is applied as a pattern to the transfer element to thereby form the coating layer as a patterned coating layer exhibiting the pattern. According to an embodiment, the patterned coating layer exhibits at least one of the following features: the patterned coating layer exhibits a haptic effect; the patterned coating layer defines a surface structure, wherein the surface structure is defined by a thickness variation of the patterned coating layer; the pattern is a first pattern which combines with a second pattern to a combined pattern, in particular wherein the second pattern is formed from the same or a different coating material; in particular wherein the first pattern and the second pattern are located in a common layer plane; in particular wherein the first pattern comprises at least one void and wherein the second pattern at least partially fills the at least one void.

According to an embodiment, the pattern (e.g. an image) extends entirely through the coating layer transverse to a layer plane of the coating layer.

According to an embodiment, the coating material is applied to the transfer element with a resolution of more than 2 l/mm, in particular with a resolution of more than 5 l/mm, e.g. with a resolution of more than 10 l/mm.

According to an embodiment, the method comprises transferring energy, in particular heat and/or a radiation like UV radiation and/or an electron beam, into the coating layer on the transfer element before the contact of the coating layer and the substrate; in particular transferring the energy to the coating layer so as to partially cure the coating layer on the transfer element and/or to induce viscous flow in the coating layer on the transfer element, in particular wherein the energy is in the form of at least one of heat, radiation, pressure.

According to an embodiment, the coating layer on the transfer element is compacted before the contact of the coating layer and the substrate (i.e. before contact of the coating layer and the substrate is made). For example, according to an embodiment the method comprises compacting the coating layer on the transfer element before the contact of the coating layer and the substrate.

According to an embodiment, the transfer element, having the coating layer thereon, is received as a separate part. For example, according to an embodiment the method comprises receiving the transfer element, having the coating layer thereon, as a separate part.

According to an embodiment, the computer program product comprises a program element, the program element being adapted for, when executed on a processor device, performing the method according to embodiments of the herein disclosed subject matter.

According to an embodiment, the NIP device comprises: a coating material being curable and comprising an amorphous material; a printing unit being configured for applying the coating material to a transfer element, in particular to a target surface on the transfer element; and in particular an energy transfer device being configured for transferring energy to the coating material on the transfer element.

According to an embodiment, the energy transfer device is configured for transferring the energy to the coating material so as to partially cure the coating material of the coating layer on the transfer element and/or to induce viscous flow in the coating layer on the transfer element, in particular wherein the energy is at least one of heat, radiation, pressure.

According to an embodiment, the energy transfer device is configured for transferring the energy to the coating material before a contact of the coating material and a substrate to which the coating material is to be applied.

According to an embodiment, the transfer element comprises a coating layer, the coating layer being formed from a coating material, the coating layer being curable and comprising an amorphous material. According to a further embodiment, the coating layer is transferable to a substrate and in particular comprises a charge control agent. According to a further embodiment, the transfer element is a standalone transfer element (e.g. a separate part), e.g. a transfer element that is removable from a processing device by which it is processed. In particular, in accordance with an embodiment, the (standalone) transfer element with the coating layer thereon is removable from the processing device. According to a further embodiment, the standalone transfer element is a transportable transfer element. In particular, in accordance with an embodiment, the standalone transfer element with the coating layer thereon is transportable. For example, according to an embodiment, the standalone transfer element is a transfer film, e.g. a microperforated transfer film as described herein. Manufacture of a standalone transfer element comprising a coating layer allows separate manufacture, storage, marketing and shipping of the standalone transfer element which comprises the coating layer. At the customer premises the coating layer on the standalone transfer element may then be transferred onto a substrate, e.g. by a coating layer application device disclosed herein.

According to an embodiment, the coating material (e.g. on the transfer element) comprises a resin, wherein the resin is in particular bisphenol-A free and/or epoxy free and/or is a thermosetting resin.

According to an embodiment, the substrate comprises thereon a cured coating layer, in particular a coating layer configured according to one or more embodiments of the herein disclosed subject matter, which is cured. According to an embodiment, the cured coating layer represents (shows) an image. According to a further embodiment, the substrate has a complex geometrical shape. Embodiments of the herein disclosed subject matter allow the application of the coating layer (e.g. even a coating layer showing an image) even to such substrates.

According to an embodiment, the cured coating layer is an at least partially amorphous thermoset. According to a further embodiment, the cured coating layer comprises a charge control agent. According to a further embodiment, the cured coating layer has a glass transition temperature Tg of at least 50° C., in particular at least 60° C. and/or wherein in particular the glass transition temperature is in a range between 40° C. and 70° C., in particular in a range between 50° C. and 70° C. According to an embodiment, the glass transition temperature is in a range between 40° C. and 500° C., in particular between 70° C. and 500° C.

According to an embodiment, the target surface (or the substrate or the transfer element) is heated to an elevated temperature (above room temperature). In this way the application of the coating material to the target surface (or the substrate or the transfer element) is improved. According to an embodiment, a target heating device is provided for heating the target surface (or the substrate or the transfer element). According to another embodiment, the target surface (or the substrate or the transfer element) is heated before feeding the target surface (or the substrate or the transfer element) to the printing device (which according to an embodiment comprises the target heating device).

Chapter 4

According to an embodiment, the coating material is configured or provided for generating a coating layer, in particular by NIP, in particular with a resolution higher than 100 DPI, in particular wherein the coating layer represents an image and wherein a resolution of the image is at least 100 DPI, the coating material comprising a curable resin.

According to an embodiment, the coating material exhibits a minimum viscosity when being heated from room temperature with a heating rate of 5 Kelvin per minute up to a temperature where curing of the coating material occurs, wherein the minimum viscosity is in a range between 3 Pascal seconds to 20000 Pascal seconds, in particular in a range between 50 Pascal seconds and 10000 Pascal seconds and further in particular in a range between 250 Pascal seconds and 7000 Pascal seconds.

According to a further embodiment, a pill flow length of the coating material is below 350 mm at a potential curing temperature which may be used to cure the coating material, and wherein the pill flow length is determined by the following method:

(i) pressing an amount of 0.75 gram of the coating material into a cylindrical pill with a diameter of 13 mm at a force of 20 kilo Newton for at least 5 seconds;

(ii) putting the pill of coating material on a metal sheet at room temperature;

(iii) putting the metal sheet with the pill into a furnace preheated to the potential curing temperature and tempering the pill on the metal sheet in a horizontal position for half a minute if the resin includes an acrylic resin component and for one minute if the resin does not include an acrylic resin component;

(iv) tilting the metal sheet to a flowing down angle of 65 degrees and maintaining the metal sheet in this position for 10 minutes at the potential curing temperature;

(v) measuring a maximum length of the pill on the metal sheet and taking this maximum length as the pill flow length, in particular after removing the metal sheet from the furnace and cooling down the metal sheet and the coating material in a horizontal position. According to an embodiment, the measuring item (v) thus may be defined as "removing the metal sheet from the furnace, cooling down the metal sheet and the coating material in the horizontal position, measuring the maximum length of the pill on the metal sheet and taking this length as the pill flow length". It should be understood that the flowing down angle is the angle with regard to the horizontal direction (i.e. in the horizontal position, the flowing angle is zero (0) degrees).

According to an embodiment, the coating material exhibits a minimum viscosity and a pill flow length according to embodiments of the herein disclosed subject matter.

According to an embodiment, the viscosity is measured by conventional methods and/or by using conventional apparatuses for measurement of viscosity. For example, according to an embodiment the viscosity is measured with a rheometer, in particular a rotating rheometer/viscometer.

According to an embodiment, the potential curing temperature is a temperature which is used to cure the coating layer.

According to an embodiment, a curable resin comprises a curing window, wherein for a temperature within the curing window the resin can be cured (e.g. fully cured) within a reasonable time, which is also referred to as curing time, e.g. within 5 minutes or within 10 minutes or within 15 minutes or within 30 minutes or within 60 minutes. For example, according to an embodiment, the boundaries of the curing window are defined by temperatures which correspond to two of the curing times mentioned above. The curing window is usually provided by a manufacturer of the resin, e.g. on a data sheet. According to an embodiment, a minimum curing temperature is measured with differential scanning calorimetry (DSC). According to an embodiment, as a potential temperature it is chosen a temperature at which the gel time is reasonable, e.g. where the gel time is 5 minutes or, in another embodiment, 10 minutes or, in still another embodiment, 15 minutes. According to an example the minimum curing temperature is a temperature at which the gel time is between 3 minutes and 7 minutes.

According to an embodiment, the potential curing temperature is a temperature within the curing window. According to an embodiment, for final curing the curing temperature is in a range which is within the lower 70% of the curing window. According to an embodiment, for final curing the curing temperature is in a range which is within the lower 50% of the curing window or, in another embodiment, within the lower 30% of the curing window. It is noted that according to an embodiment the potential curing temperature is different from the curing temperature that is used later for final curing of the coating layer.

According to an embodiment, the potential curing temperature is 180° C. According to a further embodiment the pill flow length is smaller or equal to 300 mm.

According to an embodiment, the resin includes an acrylic resin component in an amount of more than 50 w-% based on the overall resin amount; and the pill flow length is in a range between 180 millimeter and 300 millimeter.

According to a further embodiment, the resin includes an epoxy resin component in an amount of at least 50 w-% based on the overall resin amount; and the pill flow length is in a range between 15 millimeter and 35 millimeter.

According to a further embodiment, the resin includes a polyester resin component in an amount of at least 50 w-% based on the overall resin amount; and the pill flow length is in a range between 20 mm and 180 mm.

According to a further embodiment, the resin includes a mixture of a polyester resin component and an epoxy resin component in an amount of at least 80 w-% based on the overall resin amount; and the pill flow length is in a range between 15 mm and 150 mm, in particular in a range between 15 mm and 100 mm.

According to a further embodiment, the resin comprising an amorphous resin portion, wherein the amorphous resin portion comprising at least one amorphous resin with functional groups that can be cured, in particular via heat.

According to a further embodiment, the coating material comprises a crosslinking material which is capable of reacting with the at least one amorphous resin to thereby cure the coating material; wherein in particular the crosslinking material includes one or more materials chosen from epoxy/glycidyl-group-containing materials, including epoxy-resins, hydroxyalkylamide hardeners, isocyanate hardener and double bond containing compounds with a thermal radical initiator system.

According to a further embodiment, the coating material comprises the amorphous resin portion in an amount of at least 30 w-% based on the overall amount of resin.

According to an embodiment, the coating material comprises a charge control agent (CCA) in an amount of at least 0.1 w-% based on the overall weight of the coating material, in particular at least 1 w-% and more particularly at least 2 w-% (all based on the overall weight of the coating material).

According to an embodiment, the coating material is free of charge control agents.

According to an embodiment, the coating material is a particulate coating material comprising (e.g. a plurality) coating material particles. According to an embodiment, the coating material has an average particle size between 1 µm and 25 µm, in particular between 5 µm and 20 µm. According to a further embodiment the coating material has a d10 value equal to or larger than 5 µm. According to a further embodiment, the coating material has a dl value equal to or larger than 5 µm.

According to a further embodiment the coating material comprises in particular a particle size distribution of
d10 being between 5 µm and 7 µm, and/or
d50 being between 8 µm and 10 µm, and/or
d90 being between 12 µm and 14 µm.

According to a further embodiment, wherein a mean sphericity of the coating material particles is at least 0.7, in particular at least 0.8, further in particular at least 0.9.

According to an embodiment, the coating material comprises effect pigments, in particular with a d90 diameter of more than 150 µm, in particular with a d90 diameter of more than 100 µm, in particular with a d90 diameter of more than 50 µm, in particular with a d90 diameter of more than 20 µm and more particularly with a d90 diameter of more than 10 µm. According to a further embodiment, the d90 diameter is less than 150 µm.

According to an embodiment, more than 50%, in particular more than 75% and further in particular more than 90% of the surface of the effect pigment is covered with a thermosetting material and which is at least partly transparent.

According to an embodiment, the coating material comprises a salicylic compound, in particular a zinc salicylic compound, and/or the resin comprises a polyester resin component comprising terephtalic acid and/or isophtalic acid; and/or an acrylic resin; and/or a fluorine containing polymer, preferably hydroxyl functional fluorine polymer; and/or wherein the coating material comprises with respect to the entire amount of coating material less than 0.5 w-% of flow additive.

According to an embodiment, the image is printed with one or more coating materials according to the herein disclosed subject matter. According to an embodiment, a final image thickness of the image is at least 2 µm, in particular at least 10 µm, more particularly at least 20 µm, more particularly at least 40 µm.

According to an embodiment, a reservoir for a NIP device is provided, the reservoir comprising a coating material according to one or more embodiments of the herein disclosed subject matter. According to an embodiment, a cartridge for a NIP device is provided, the cartridge comprising a coating material according to one or more embodiments of the herein disclosed subject matter. According to an embodiment, the cartridge is a changeable cartridge of the NIP device which provides the coating material to the NIP device.

According to an embodiment, a NIP device is provided, the NIP device comprising a coating material according to at least one embodiment of the herein disclosed subject matter.

According to an embodiment, a transfer element is provided, the transfer element comprising a coating layer, in particular a uncured or partially cured coating layer, generated from a coating material according to at least one embodiment of the herein disclosed subject matter.

According to an embodiment, a substrate is provided, in particular a pre-coated substrate, the substrate comprising a coating layer generated from a coating material according to at least one embodiment of the herein disclosed subject matter.

According to an embodiment, a method is provided, the method comprising: applying a coating layer generated from the coating material according to at least one embodiment of the herein disclosed subject matter to a target surface by means of a NIP device. According to a further embodiment, a method is provided, the method comprising: generating a coating layer from the coating material according to at least one embodiment of the herein disclosed subject matter on a target surface, in particular by means of a NIP device.

According to an embodiment, a coating layer application device is provided, the coating layer application device being configured for receiving a transfer element according to at least one embodiment of the herein disclosed subject matter, the coating layer application device being further configured for applying the coating layer to a substrate.

According to an embodiment, a use of a coating material is provided, in particular a use of a coating material according to at least one embodiment of the herein disclosed subject matter. According to an embodiment, the coating material is used for applying a coating layer to a target surface, in particular by means of a NIP device.

Chapter 5

According to an embodiment, a coating material is provided, the coating material being processable by NIP to form at least a part of a coating layer representing an image; the coating material comprising an amorphous resin portion and being curable; the coating material being configured for being applied with a thickness of at least 15 µm.

It is noted, that generally herein the terms "representing an image" and "exhibiting a pattern" are used synonymously and can be interchanged with each other.

According to an embodiment, the image comprises at least two different colors. According to another embodiment, the image comprises only a single color.

According to an embodiment, the coating layer which represents the image is a coating layer made from a uniform coating material. According to another embodiment, the coating layer may include two or more different coating materials. According to an embodiment, the coating layer includes only a single color. According to further embodiments, the coating layer may include two or more colors.

According to an embodiment, the NIP method is an electrophotographic printing method, which is used for example in conventional laser printers or LED printers. A respective NIP unit may be hence referred to as electrophotographic printing unit. According to an embodiment (and as is the case e.g. for electrophotographic printing) a single coating layer that is provided from the printing unit may have a thickness in the range between 1 µm to 40 µm, in particular 4 µm to 15 µm and further in particular 6 µm to 10 µm. According to an embodiment, the thickness of a single coating layer is in a range between 5 µm to 8 µm. According to an embodiment, the thickness of a single coating layer is in a range between 15 µm to 20 µm.

According to an embodiment, several coating layers may be printed over each other. In particular, according to an embodiment a further coating layer is printed over an existing coating layer without curing or heating (in particular substantial heating) the existing coating layer. However, according to an embodiment, pressure is applied to the further coating layer and the existing coating layer to press both layers onto each other. The pressure applied in this way may be comparatively low in order not to blur the printed dots but may be helpful to provide a stable application of the further coating layer onto the existing coating layer.

In accordance with an embodiment, the coating material is configured for being applied with a thickness of at least 15 µm. In particular, the coating material is configured for being applied with a thickness of at least 15 µm without curing or inducing viscous flow in one or more coating layers. For example, if an individual coating layer has a thickness of 5 µm in accordance with the aforementioned embodiments the coating material is configured for being applied in three coating layers (which may be referred to as layer package in some embodiments) without curing or inducing viscous flow in one or more coating layers. This is surprisingly achieved by a coating material according to one or more embodiments of the herein disclosed subject matter.

According to an embodiment, the coating material is configured for being applied with a thickness of at least 20 µm, in particular with a thickness of at least 30 µm, further in particular with a thickness of at least 40 µm.

According to an embodiment, the coating material is provided in the form of a plurality of particles wherein a ratio of an average particle diameter to a thickness of the coating layer is smaller than 1:2, in particular smaller than 1:3, further in particular smaller than 1:4. Such ratios may provide for a high quality print in combination with chemical and wheathering stability due to a very compact cured layer.

According to a further embodiment, wherein the coating material has a maximum concentration of 10 w-% of bisphenol A and/or epoxy resin with respect to the entire coating material, in particular a maximum concentration of 5 w-% of bisphenol A and/or epoxy resin with respect to the entire coating material, and is in particular bisphenol A free and/or epoxy free, wherein in particular the coating material comprises one or more of a polyester resin, an acrylic resin, a fluorine containing resin (e.g. Lumiflon resin), and a polyurethane resin.

According to an embodiment the polyester resin comprises an (incorporated) acid monomer and wherein at least 10 w-% of the acid monomer is isophthalic acid, in particular at least 20 w-% of the acid monomer is isophthalic acid, in particular at least 30 w-% of the acid monomer is isophthalic acid, in particular at least 50 w-% of the acid monomer is isophthalic acid; in particular at least 80 w-% of the acid monomer is isophthalic acid, and further in particular at least 85 w-% of the acid monomer is isophthalic acid.

According to a further embodiment, a minimum glass transition temperature of the coating material, in particular of the uncured coating material, is above 40° C., in particular above 50° C., in particular above 60° C., for the cured one the Tg is above 50° C., in particular above 60° C., more particularly above 70° C., and more particularly above 80° C.

According to an embodiment, the remaining gloss after 300 hours of UV exposure (or in other embodiments after 600 h of UV exposure or 1000 h of Xenon exposure) according to the GSB International AL 631-Part VII Segment 20.1 Kurzbewitterung UV-B (313) is at least 50%. For example, if the coating material comprises a polyester resin, a concentration of (incorporated) isophthalic acid (with regard to the acid monomer in the polyester resin) may be chosen high enough to achieve the specified values of remaining gloss. Further, for example if the coating material comprises fluorine containing resin (fluoropolymer) and/or acrylic resin, the concentration of these resins may be chosen high enough to achieve the specified values of remaining gloss.

According to an embodiment, the remaining gloss after 300 hours of UV exposure according to GSB international AL631-PartVII-segment 20.1 Kurzbewitterung UV-B (313) is at least 50%, in particular at least 85%; a remaining gloss after 600 hours of UV exposure according to the test procedure of GSB international AL631-PartVII-segment 20.1 Kurzbewitterung UV-B (313) is at least 50%, in particular at least 85%; a remaining gloss after 1000 hours of Xenon exposure according to EN ISO 16474-2 determined according to ISO 2813, is at least 50%, in particular at least 85%.

According to an embodiment, the coating material is configured to, besides forming a part of a coating layer representing an image, serve in addition at least one of the following functions: sealing, high-temperature resistance, weathering resistance, long-term ultraviolet stability, wearing coat, being free from pinholes (in particular being substantially free from pinholes), wear based bleaching protection, outdoor capability, scratch resistance, resistance to solvents, diffusion reduction, corrosion protection.

According to an embodiment, the coating material comprises an amount of 0.1 w-% to 10 w-%, in particular 0.5 w-% to 5 w-%, in particular 0.8 w-% to 2.5 w-%, in particular 0.8 w-% to 1.3 w-%, e.g. 1 w-%, and in particular at least 2 w-% of a charge control agent. According to an embodiment, the charge control agent comprises or consists of one or more salicylic acid zinc compounds (zinc salicylic compounds). Such a charge control agent has shown to provide a surprising performance. However, according to other embodiments, other conventional charge control agents may be used, such as T99 from Hodogaya.

According to an embodiment, the coating material is a powdery coating material which is at least partly, in particular fully thermally curable.

According to an embodiment, a reservoir for a NIP device is provided, in particular a cartridge for a nonimpact impact printing device, the reservoir comprising in particular a coating material according to at least one embodiment of the herein disclosed subject matter.

According to an embodiment, there is provided a NIP device, in particular comprising a coating material according to one or more embodiments.

According to an embodiment, a processing system (which may also referred to as processing device) is provided, the processing system comprising a coating material according to one or more embodiments of the herein disclosed subject matter and further comprising a NIP device being configured for printing the coating material.

According to an embodiment, the NIP device is configured for generating from the coating material a coating layer, in particular on a transfer element. According to a further embodiment, the processing system further comprises: a coating layer application device being configured for receiving the transfer element; and the coating layer application device being further configured for applying the coating layer on the transfer element to a substrate.

According to an embodiment, the NIP device is configured for generating a coating layer from a coating material on a substrate.

According to a further embodiment, the processing system further comprises a curing device, for curing, in particular final curing, of the coating layer on the substrate.

According to a further embodiment, a transfer element is provided, the transfer element comprising in particular a coating layer generated from a coating material according to one or more embodiments of the herein disclosed subject matter or a coating layer generated from at least one coating material with comparable thermal expansion coefficient and/or free functional groups able to react with the coating material according to the invention.

According to a further embodiment, a substrate is provided, in particular a pre-coated substrate, the substrate comprising a coating layer generated from a coating material according to one or more embodiments of the herein disclosed subject matter.

According to a further embodiment, the substrate further comprises a base coat (below the coating layer, also referred to as pre-coating) and/or a top coat (above the base coat and/or above the coating layer).

According to an embodiment, a method is provided, the method comprising: applying a coating layer, generated from the coating material according to one or more embodiments of the herein disclosed subject matter, to a target surface, in particular by means of a NIP device.

According to an embodiment, a computer program product comprises a program element, the program element being adapted for, when executed on a processor device, performing the method according to aforementioned method.

According to an embodiment, a coating layer application device is provided, the coating layer application device being configured for receiving a transfer element comprising a coating layer generated from a coating material according to one or more embodiments of the herein disclosed subject matter, the coating layer application device being further configured for applying the coating layer to a substrate.

According to an embodiment, there is provided a use of a coating material for applying a coating layer according to one or more embodiments of the herein disclosed subject matter to a target surface, in particular by means of a NIP device.

Chapter 6

According to an embodiment, a NIP device is provided, the NIP device comprising: a coating material being curable and comprising a resin; a printing unit, in particular a electrophotographic printing unit, being configured for printing the coating material so as to form a coating layer, wherein the coating layer forms at least part of a layer package comprising at least one layer; the NIP device being configured for providing the layer package so as to define a surface structure with the layer package; wherein the surface structure is defined by a thickness variation of the layer package; wherein the thickness variation is in a range between 1 µm and 1000 µm, in particular in a range between 1 and 300 µm, and is in particular more than 1 µm, in particular more than 5 µm, in particular more than 10 µm and in particular more than 20 µm.

According to an embodiment, the coating material comprises an amorphous resin portion in an amount of at least 30 w-% based on the overall amount of resin. According to a further embodiment, the coating material comprises with respect to the entire amount of coating material less than 0.5 w-% of flow additive. According to a further embodiment, the coating material comprises with respect to the entire amount of coating material less than 0.4 w-%, less than 0.3 w-% or preferably less than 0.1 w-% of the flow additive.

According to an embodiment, a flow additive (or leveling agent, both terms may be used synonymously) is a flow addititve which influences the viscosity (in particular of the uncured coating material) and/or a smoothness of a surface of the coating layer (in particular of the at least partially cured coating layer or of a coating layer which was subjected to a temperature range in which the uncured coating material is in its supercooled liquid state). With small thickness variations, e.g. in the range of several micrometer, variations in the gloss of the coating layer may be introduced. Depending e.g. on the magnitude of the thickness variations and/or geometrical shape of the surface structure different appearances of the coating layer (and also of the cured coating layer on the substrate) may be provided.

According to an embodiment, the NIP device is configured for providing the layer package with a varying thickness such that a first package portion of the layer package at a first position has a first thickness and a second package portion of the layer package at a second position has a second thickness.

According to a further embodiment, the printing unit is configured for selectively printing the coating material depending on a lateral position in a plane of the coating layer.

According to an embodiment, the NIP device is configured for printing a further coating layer, in particular from the coating material, as a part of the layer package. According to a further embodiment, the coating layer and the further coating layer have a different spatial coverage. According to a further embodiment, the coating layer and the further coating layer overlap each other, resulting in a thickness variation within the layer package. According to a further embodiment, the coating layer and the further coating layer have functional groups which can react with each other to thereby attach adjoining regions of the coating layer and the further coating layer.

According to an embodiment, the printing unit is configured for printing of the further coating layer.

According to a further embodiment, the printing unit is a first printing unit and a different, second printing unit is provided, the second printing unit being configured for the printing of the further coating layer. According to an embodiment two or more printing units may be provided for printing the same coating material. This may improve the speed of the printing process necessary to provide the desired layer package. In other embodiments, two or more printing units may be provided for printing different coating material.

According to an embodiment, the NIP device is configured for printing a coating material in at least two touching layers in particular wherein the two touching layers include the coating layer and the further coating layer, in particular wherein the two touching layers have functional groups capable of reacting with each other. According to an embodiment, the coating layer and the further coating layer are formed from the same or different coating materials of a set of coating materials in particular a set of coating materials which define at least a CMYK color system. In other words, according to an embodiment the NIP device is configured for printing a set of coating materials which define at least a CMYK system (i.e. the set of coating materials defines a CMYK system and optionally comprises further coating materials (e.g. a transparent coating material, at least one effect coating material, at least one white coating material).

According to an embodiment, the NIP device comprises a structuring device, the structuring device being configured for imposing a height profile into the layer package, in particular by pressure, such as by pressing an embossing element into the layer package, further in particular by energy transfer such as the transfer of radiation energy, in particular by means of a laser beam (e.g. by a pulsed laser beam), into the layer package to evaporate part of the layer package.

According to an embodiment, the printing unit is configured for providing the coating layer with a resolution in the layer plane of the coating layer of more than 2 l/mm, in particular more than 5 l/mm and further in particular more than 10 l/mm.

According to an embodiment, the printing unit is configured for providing the coating layer with a resolution perpendicular to the layer plane of the coating layer of more than 2 l/mm, in particular more than 5 l/mm and further in particular more than 10 l/mm and further in particular with more than 20 l/mm.

According to an embodiment, the printing unit is configured for providing the coating layer with a resolution (in the layer plane and/or perpendicular to the layer plane) so as to establish by the application of the coating layer a height difference of at least 10 µm, in particular of at least 5 µm within a lateral distance of less than 254 µm, in particular less than 85 µm and more in particular less than 42 µm.

According to an embodiment, the coating layer is generated as a plurality of dots (as this is typical for NIP/digital printing such as laser printing). Hence, if the coating layer is provided with a resolution of 100 dpi, the diameter of a dot is about 254 µm. Hence, a height difference of 5 µm (corresponding to a thickness variation of 5 µm) within the lateral distance of less than 254 µm corresponds to a height difference that is achieved with a coating layer of 5 µm thickness and the resolution of 100 dpi.

According to an embodiment, a color in the coating layer (the coating layer may comprise a single color or two or more different colors (coating materials)) extends continuously from a top surface of the coating layer to a bottom surface of the coating layer.

According to an embodiment, the layer package exhibits a thickness variation of at least 1 µm, in particular at least 5 µm and further in particular at least 10 µm. In particular in combination with different colors continuously extending through the coating layer, a wheather resistant image with pronounced haptic effect may be achieved.

According to an embodiment, the layer package forms an image on the target surface.

According to a further embodiment, the layer package includes at least one void leaving the target surface at the position of the void uncovered.

According to an embodiment, a smallest lateral dimension of the surface structure is above 500 µm, in particular above 200 µm and further in particular 100 µm. This may provide for a tactile surface structure. It is noted that a smallest possible lateral dimension of the surface structure depends on the resolution of the printing process (e.g. on a dot size of the printing process).

According to a further embodiment, a substrate is provided, in particular a precoated substrate, the substrate comprising a layer package, the layer package being cured and comprising at least one coating layer. According to an embodiment, a thickness of the layer package exhibits a variation in a range between 1 µm and 1000 µm, in particular in a range between 1 and 300 µm, in particular more than 5 µm, in particular more than 10 µm and in particular more than 20 µm and wherein the layer package defines a surface structure.

According to an embodiment, a cured coating layer (generated from a coating material according to embodiments of the herein disclosed subject matter) comprises with respect to the entire amount of coating material of the coating layer less than 1 w-%, in particular less than 0.5 w-%, further in particular less than 0.4 w-%, less than 0.3 w-% and preferably less than 0.1 w-% of flow additive.

For example, according to an embodiment the at least one coating layer of the cured layer package comprises with respect to the entire amount of coating material of the coating layer less than 0.5 w-% (or less than any other amount specified herein, e.g. less than 0.4 w-%) of flow additive.

According to a further embodiment, a thickness of the layer package varies over the substrate, and in particular wherein a first package portion of the layer package at a first position has a first thickness and a second package portion of the layer package at a second position has a second thickness;

and/or wherein the layer package includes at least one void leaving a surface of the substrate at the position of the void uncovered.

According to an embodiment, the layer package defines a surface structure. According to a further embodiment, a smallest lateral dimension of the surface structure is below 254 µm, in particular below 85 µm and further in particular below 42 µm. According to a further embodiment, the layer package has a curing degree that the image is able to reach a rating of at least 2-3 in the Methylethylketone test after 10 s according to the DIN EN 12720 and/or the image resists at least 50 IPA (Isopropyl alcohol) double rubs and/or the image resists at least 5 acetone double rubs, in particular at least 10 acetone double rubs, in particular at least 20 acetone double rubs.

According to an embodiment, the layer package comprises a minimum arithmetic average roughness of larger or equal than 1 μm (Ra≥1 μm), in particular larger or equal than 3 μm (Ra≥3 μm) and further in particular larger or equal than 5 μm (Ra≥5 μm); and/or a maximum thickness of the layer package being at least 2 μm, in particular 10 μm, further in particular 20 μm and further in particular 40 μm.

According to an embodiment, the substrate and in particular the cured layer package on the substrate fulfills the requirements of Qualicoat class 1 and/or Qualicoat class 2 as defined in a specification for quality label for liquid and powder organic coatings on aluminum for architectural applications, 14 edition, approved on 6 Nov. 2014 and effective from 1 Jan. 2015, available from www.qualicoat.net.

According to a further embodiment, the surface of the substrate comprises a maximum arithmetic average roughness of equal or less than one micrometer (Ra≤1 μm), in particular equal or less than 0.5 micrometer (Ra≤0.5 μm) and further in particular equal or less than 0.2 μm (Ra≤0.2 μm), where a defined surface roughness of the substrate was compensated via an image of the preceding features.

According to a further embodiment, the layer package having a resolution of at least 100 DPI, in particular of at least 300 DPI, and further in particular of at least 600 DPI.

According to an embodiment, at least one coating layer has free functional groups capable of reacting with other layers and/or the substrate, in particular including a pre-coat on the substrate and/or a top coat in particular before the curing. Hence, according to an embodiment the substrate comprises a precoat and the free functional groups of the coating layer are capable of reacting with the precoat. According to a further embodiment, a top coat is applied to the at least one coating layer and wherein the coating layer has free functional groups capable of reacting with the top coat. According to an embodiment, the topcoat is applied before curing.

According to an embodiment, a method is provided, the method comprising: providing a layer package to a target surface, the layer package defining a surface structure and a thickness of the layer package, the layer package comprising at least one layer; the surface structure being defined by a thickness variation of the layer package; and the thickness variation being in a range between 1 μm and 1000 μm, in particular in a range between 1 and 300 μm, in particular more than 5 μm, in particular more than 10 μm and in particular more than 20 μm; wherein providing the layer package includes printing a coating material so as to form a coating layer, the coating layer forming a layer of the layer package, and the coating material being curable and comprising a resin, and the printing being performed by using a NIP method, in particular an electrophotographic printing method. In accordance with embodiments of the herein disclosed subject matter, the coating material comprises an amorphous resin portion in an amount of at least 30 w-% based on the overall amount of resin, and the coating material comprises with respect to the entire amount of coating material less than 0.5 w-% (or less than any other amount specified herein, e.g. less than 0.4 w-%) of flow additive.

According to an embodiment, the coating layer is a first coating layer, the method further comprising printing of least one further coating layer by performing a layer by layer printing, wherein in particular each of the first coating layer and the at least one further coating layer has a maximum thickness of at least 1 μm, in particular of at least 2 μm, further in particular of at least 4 μm, further in particular at least 10 μm, further in particular at least 20 μm.

According to an embodiment, layers of the layer package which are contacting each other in a contact region have free functional groups to react with each other in the contact region before or during curing, in particular wherein one or more existing layers are not cured or are at least only partly cured in the contact region before a further layer is applied which makes contact to the contact region of the one or more existing layers.

According to an embodiment, the coating material is provided as a plurality of particles, and wherein the coating material comprises an average powder particle size in a range between 1 μm and 25 μm, in particular in a range between 5 μm and 20 μm and in particular wherein the coating material has a d10 value in a range of 5 μm to 7 μm, a d50 value in a range of 8 μm to 10 μm and a d90 in a range of 12 μm to 14 μm.

According to an embodiment, a sphericity of the particles is at least 0.7, in particular at least 0.8, further in particular at least 0.9.

According to an embodiment, the coating material comprises effect pigments with a diameter of less than 50 μm, in particular less than 20 μm and further in particular less than 10 μm and, where more than 50%, in particular more than 75% and further in particular more than 90% of the surface of the effect pigment is covered with a thermosetting material which is in particular not electrically conductive.

According to an embodiment, there is provided a reservoir, in particular a cartridge, for a NIP device according to embodiments of the herein disclosed subject matter, the reservoir comprising a coating material for printing of the coating layer.

According to another embodiment a NIP device comprises a set of reservoirs with the same or different coating materials, preferably different coating materials defining at least a CMYK system, further in particular comprising at least one coating material of a further color and/or white and/or transparent and/or effect coatings. According to an embodiment, a NIP device comprises two or more (e.g. four) reservoirs containing the same coating material. According to an embodiment each of the reservoirs of the set of reservoirs may be associated with a separate printing unit. In case of two or more reservoirs containing the same coating material the NIP device thus allows an increased deposition rate for the coating material per time unit.

According to an embodiment, there is provided a transfer element comprising a layer package, the layer package being uncured or only partially cured and comprising at least one coating layer, wherein a thickness of the layer package is in a range between 1 μm and 1000 μm and wherein the layer package defines a surface structure. In accordance with embodiments of the herein disclosed subject matter, the at least one coating layer of the layer package comprises an amorphous resin portion in an amount of at least 30 w-% based on the overall amount of resin, and wherein the coating layer comprises with respect to the entire coating layer (i.e. with respect to the entire amount of coating material of the coating layer) less than 0.5 w-% (or less than any other amount specified herein, e.g. less than 0.4 w-%) of flow additive.

A multilevel method may be employed for providing a surface structure. Such a multilevel method is originally based on a method using gray shades but may be employed for providing the structured surface as described herein. Additionally or alternatively, a multilayer method may be employed for providing the surface structure. A multilayered method is usually employed to combine a variety of different colors thereby creating a wider range of a different color tones. Instead of providing different colors, according to a preferred embodiment, at least two of the color channels are exploited by using them with a single color material providing differentiation in the height and/or thickness of the material layer. According to a further preferred embodiment, at least two of the color channels are exploited by using them with a single color and/or a transparent material providing differentiation in the height and/or thickness of the material layer. According to a further preferred embodiment, at least two of the color channels are exploited by using them with a single color and/or a transparent material providing differentiation in the haptics and/or gloss of the material layer.

According to a preferred embodiment, a plurality of different layers is applied successively, i.e. at least one first layer and thereupon a second layer is formed. According to a further preferred embodiment, the described process comprises a compression step which may be achieved by raising temperature and/or pressure. Preferably such a compression step is carried out at least between the creation of a first and a second layer.

According to an embodiment, the non-impact printing device is configured and may be used for generating a surface structure having a Lotus type effect. Haptic perception is the ability to grasp something, in particular to feel a certain surface profile. Tactile perception is related to haptic perception. While haptic perception is achieved through the active exploration of surfaces and objects, tactile perception is achieved through the passive exploration of surfaces and objects, i.e. no movement over the surface is required to trigger tactile perception. By the coating and the corresponding method as disclosed in the present application, in particular by means of the described relief printing process, suitable surfaces capable of triggering haptic or tactile perception may be generated. In particular, the non-impact printing device is configured and may be used for generating a braille type surface structure. According to an embodiment, the non-impact printing device is configured and/or may be used for generating a surface structure having a Lotus type effect. The lotus effect is the result of ultrahydrophobicity as exhibited by the leaves of *Nelumbo* or "lotus flower". It has been found that the Lotus type surfaces can be exploited in such a way that they have a self-cleaning effect. Therefore, there is a significant interest in providing suitable artificially manufactured surface structures having such a Lotus type effect. By making use of the coating material and the corresponding method as disclosed in the present application, in particular by means of the described relief printing process, suitable surfaces having a pronounced Lotus type effect may be created. In particular it is possible by means of the described relief printing process to provide a self-cleaning, i.e. a Lotus type super hydrophobic surface, with a contact angle of 160° or even more. By means of the described relief printing process is possible to provide such advantageous structures efficiently, with the structures being stable, in particular resistant to degradation. According to an embodiment, the non-impact printing device is configured and may be used for generating a surface structure of having the plurality of channels. Such plurality of channels may advantageously provide humidifying effects and cooling effects by corresponding sucking in of suitable fluids, by capillary action.

According to an embodiment, the non-impact printing device is configured and may be used for generating a shark-skin effect.

According to an embodiment, the non-impact printing device is configured and may be used for generating a surface structure which is suitable for changing laminar or turbulent streams coming into contact with said surface. Stated differently the non-impact printing device may create surfaces which can be individually designed for triggering or controlling streams of a fluid (e.g. a gas or a liquid). Additionally, surfaces may be individually designed to reduce negative acoustic effects. Conversely surfaces may be individually designed to induce or amplify acoustic effects.

According to an embodiment, the non-impact printing device is configured and may be used for generating a surface having a color gradient with respect to the direction corresponding to the coating layer thickness, i.e. the thickness of the surface structure. By making use of such a gradient it is for instance possible to provide an indication for the abrasion of materials as caused by harsh weather conditions. For instance, the layer may be provided having a color gradient, i.e. the color becoming more intense with increasing distance from the layer surface. When abrasion occurs, the color intensity being exposed to the outer surface of the layer becomes more and more intensive, thereby indicating the progress of the abrasion process of the surface layer.

According to an embodiment, the surface structure is configured so as to generate interference (in particular interference colors) in electromagnetic radiation, in particular in visible light. According to a further embodiment, the surface structure is configured so as to receive incoming light and provide outgoing light, wherein the color distribution of the incoming light and the outgoing light is different, in particular different due to interference.

According to an embodiment, the non-impact printing device is configured and may be used for selectively generating a surface only on certain parts of the substrate. For instance, the surface as obtained by the described relief printing method may be only applied to areas which are particularly exposed to mechanical stress. For instance by means of the described relief printing it is possible to selectively provide a coating on handles, rails and tracks in the machines or machine components which are usually exposed to high mechanical stress. It is also part of the described concept to provide coatings with a different thickness in different substrate regions depending on the mechanical stress the different regions are usually exposed to. Surface coatings for a plurality of substrate structures in a variety of different fields of technology can be efficiently provided. The more mechanically stressed a certain region of substrate is, the thicker the coating layer applied should be. On the one hand, this allows for protecting the most mechanically stressed regions of substrate, while on the other hand the amount of material used for providing the coating can be reduced. Stated differently, by means of the process is possible to achieve suitable protection against mechanical stress at an optimized cost efficiency. On the other hand thickness can be reduced at regions where a high mechanical flexibility is required, in particular if weathering resistance is not that critical.

According to an embodiment, the non-impact printing device is configured and may be used for generating a surface structure by applying two different coatings i.e. at least one second coating layer (or further coating layer) is placed on and/or adjacent to at least one first coating, wherein the at least one first coating layer is preferably in direct physical contact with the at least one second coating layer. By means of such a structure is possible to exploit the advantages of an interaction of the first coating layer with the second coating layer and vice versa. In more particular embodiment, the first coating layer is suitable for adhering to the substrate on which the surface of structure is to be formed. The second coating layer may be configured for exhibiting an advantageous surface effect as for example a Lotus type effect or shark skin effect. However, the second coating layer may be less suitable for adhering to the substrate surface but instead being capable of forming a suitable connection to the at least one first coating layer. By providing a first coating layer which strongly binds to the substrate to be coated and by providing upon the first coating layer a second coating layer exhibiting a desired surface effect and strongly binds to the first coating layer, it is possible to provide individually designed surfaces for a plurality of different substrates. An adherence or a capability of connection of the first coating layer and the second coating layer may be achieved by suitably choosing the suitable coating materials for the first coating layer and the second coating layer. In particular, the first coating layer may comprise a coating material having a first functional group which is capable of interacting, in particular forming a chemical bond by a chemical reaction, with a second coating material as comprised in the second coating layer. In addition to a chemical reaction between the first coating layer and the second coating layer, connecting of the first coating layer and the second coating layer may be achieved by physical effects such as adherence and that the like. In the above and generally herein, instead of a second (or further) coating layer a layer package comprising a coating layer may be employed.

According to a further embodiment, the non-impact printing device is configured and may be used for generating a surface structure by applying three different coating layers i.e. at least one second coating layer being placed on and/or adjacent to at least one first coating layer and least one third coating layer being placed on and/or adjacent to the at least one second coating layer. By means of such a structure is possible to exploit the advantages of an interaction of the first coating layer with the second coating layer and the third coating layer and with the substrate.

According to a further embodiment, the non-impact printing device is configured and may be used for generating a surface structure by applying three or more different coating layers i.e. at least one second coating layer being placed on and/or adjacent to at least one first coating layer and least one third coating layer being placed on and/or adjacent to the at least one second coating layer. By means of such a structure is possible to exploit the advantages of an interaction of the first coating layer with the second coating layer and the third coating layer and with the substrate.

Chapter 7

According to an embodiment, there is provided a coating material, in particular for generating a coating layer by NIP, the coating material being provided in the form of particles and comprising: a curable resin preferably an at least partially thermal curable resin and even more in particular curable by a crosslinking agent able to react with functional groups of the resin, the resin comprising in particular an amorphous resin portion; wherein an average diameter of the particles is in a range between 1 μm and 25 μm; and wherein the particles have an average sphericity larger than 0.7, in particular larger than 0.8, in particular larger than 0.9.

According to an embodiment, there is provided a developer comprising: a carrier; and, in an amount of 10 wt-% or less (based on the total amount of developer), a coating material, in particular a coating material for generating a coating layer by non-impact printing, the coating material being provided in the form of particles and comprising: a curable resin preferably an at least partially thermal curable resin and even more in particular curable by a crosslinking agent able to react with functional groups of the resin, the resin comprising in particular an amorphous resin portion; wherein an average diameter of the particles is in a range between 1 μm and 25 μm; wherein the particles have an average sphericity larger than 0.7, in particular larger than 0.8, in particular a sphericity larger than 0.9; wherein, if the coating material is heated from room temperature with a heating rate of 5 K per minute, the coating material upon heating reduces its viscosity down to a minimum viscosity and increases its viscosity upon further increase of the temperature; wherein the minimum viscosity is in a range between 3 Pascal seconds and 20000 Pascal seconds.

According to an embodiment, the cross-linking agent may be of the same type or may even be the same material as the curable resin or a resin component thereof.

Generally the sphericity (S) of a particle is defined as the ratio of a surface area (As) of a sphere of the same volume as the particle over the surface area of the particle (Ap). Hence S=As/Ap. However, as the surface area of the particle may be difficult to measure, in particular for a plurality of particles, sophisticated methods have been developed which are implemented in commercially available apparatuses, as for example Sysmex FPIA-3000, available from Malvern Instruments GmbH, Germany, www.malvern.com.

According to an embodiment, the average sphericity is defined by averaging a circularity of the particles (i.e. by the average circularity of the particles), wherein the circularity of a particle is determined by a circumference of a circle having an area that is equal to largest area enclosed by a perimeter of the particle divided by the perimeter.

According to an embodiment, the average sphericity is defined so as to include only a portion of the particles for calculating the average sphericity, in particular a portion of the particles which includes the largest particles of the coating material up to an amount of 80% of the overall coating material.

According to a further embodiment, the mean sphericity is between 0.90 and 0.97, preferably 0.93 to 0.97. It is noted that according to an embodiment, a sphericity of 1.0 (spherical particles) is not desired. In accordance with an embodiment, a sphericity higher than 0.98 may provide less contact points of the coating material particles to the carrier particles, leading to slower charging of the coating material particles and/or may result in a more difficult cleaning of the excess (not transferred) coating material particles on the organic photo conductor, OPC (if an OPC is used) after the transfer.

According to an embodiment, a set of developers is provided, wherein each developer is configured according to one or more embodiments of the herein disclosed subject matter and wherein the set of developers provides at least a CMYK system (CMYK=cyan, magenta, yellow, and key (black)).

According to an embodiment, the coating material of each developer has a dl value equal to or larger than 5 μm and/or the coating material of each developer has an average sphericity in a range between 0.90 to 0.97, in particular between 0.93 and 0.97.

Further according to an embodiment, a set of coating materials is provided, wherein each coating material is configured according to one or more embodiments of the herein disclosed subject matter and wherein the set of coating materials provides one or more color systems, e.g. at least a CMYK system.

Possible applications may include e.g. high resolution monocolor logos or barcodes or phosphorescent/fluorescent images, just to name some examples.

According to an embodiment, each coating material of the set has a dl value equal to or larger than 5 μm and/or each coating material of the set has an average sphericity in a range between 0.90 to 0.97, in particular between 0.93 and 0.97.

According to embodiments of the herein disclosed subject matter a CMYK system of curable compatible coating materials is provided that allow a high resolution color print of the curable coating materials.

According to a further embodiment, the coating material is curable and/or comprises a charge control agent and/or a silicon compound, in particular SiO2 (=silica) and/or a titanium compound in particular TiO2 (=titania). According to a further embodiment, the particle size distribution of the silicon compound and/or the titanium compound has a d50 value in a range between 1 nm and 100 nm, in particular in a range between 3 nm and 50 nm. According to a further embodiment, the coating material comprises the silicon compound and/or the titanium compound in particular in an amount of more than 0.5 w-%, in particular more than 1 w-% and further in particular more than 1.5 w-%.

According to a further embodiment, the charge control agent includes zinc salicylic compounds in particular Zinc Salicylate. According to a further embodiment, the coating material comprises the charge control agent, with respect to the entire coating material, in an amount of less than 10 w-%, in particular less than 3.5 w-% and further in particular less or equal than 2 w-% and in particular higher than 1 w-%.

According to a further embodiment, the coating material is at least partially curable by radiation, in particular ultraviolet radiation and/or x-ray radiation and/or electron beam.

According to a further embodiment, the resin comprises thermosetting resin, and wherein the thermosetting resin is at least partly curable in particular by a reaction not including double bonds.

According to a further embodiment, if the coating material is heated from room temperature with a heating rate of 5 K per minute, the coating material upon heating reduces its viscosity down to a minimum viscosity and increases its viscosity upon further increase of the temperature; and wherein the minimum viscosity is in a range between 3 Pascal seconds and 20000 Pascal seconds, in particular in a range between 50 Pascal seconds and 10000 Pascal seconds and further in particular in a range between 250 Pascal seconds and 7000 Pascal seconds.

According to an embodiment, the coating material comprises an accelerator (e.g. a catalyst) which accelerates the curing (i.e. increases the curing rate compared to the composition without accelerator).

According to an embodiment, the accelerator is configured for accelerating the reaction between the carboxyl groups and the epoxy groups and/or for epoxy homopolymerization. According to an embodiment, the accelerators/catalysts disclosed in WO 2001/092367 A1 (the entire disclosure of which is incorporated herein by reference) may be used.

A suitable catalyst comprises one or more of the following:

imidazole (e.g. "2-methyl imidazole", "2-ethyl imidazole", "propyl imidazole", "2-isopropyl imidazole", "2-phenyl imidazole", "2-undecyl imidazole", "2-heptadecyl imidazole", "1-((2-methyl-1H-imidazole-1-yl)methyl)naphthalene-2-ol"), imidazoline (such as "2-phenyl-2-imidazoline"), tertiary amines (such as "2,4,6-tri-(dimethylaminomethyl)phenole, "N,N-dimethyl stearylamine"), phosphonium salts (such as "tetrabutylphosphonium bromide", "butyltriphenylphosphonium chloride", "butyltriphenylphosphonium bromide", "ethyltriphenylphosphonium bromide"), ammonium compounds (such as "benzyltrimethylammonium bromide", "tetraethylammonium benzoate", "choline chloride"), urone (such as "fenurone", "diurone", "chlorotolurone", "TDI urone"), guanidine (such as "ortho-tolylbiguanide"), zinc compounds (such as "zincacetyl acentonate", "zinc 2-ethylhexylphosphate salt").

Catalysts may also be used in the form of adducts (such as imidazole adduct, imidazoline adduct). The catalysts (such as imidazole, imidazoline, phosphonium salt) may also be added to polyester resins during resin synthesis.

Currently preferred as catalyst is "2-phenyl-2-imidazoline" (such as "Eutomer B31" of Eutec Chemical Co.). However also combinations of this catalyst with one or more of the above mentioned catalysts, preferably with imidazole(s) (e.g. 2-ethylimidazole) or phosphonium salts (such as ethyltriphenylphosphonium bromide), may be used. In this way a coating material may be achieved which is highly reactive and at the same time stable during storage (storage stability). By combination of these accelerator types it is possible to achieve more stable coating materials which exhibit an improved storage stability even in the presence of variations in the homogeneity of the composition of the coating material.

According to an embodiment, the coating material has a maximum concentration of 10 w-% of bisphenol A and/or epoxy resins with respect to the entire coating material, in particular a maximum concentration of 5 w-% of bisphenol A and/or epoxy resins with respect to the entire coating material, and is in particular bisphenol A free and/or epoxy free. According to a further embodiment, the coating material comprises one or more of a polyester resin, an acrylic resin, a fluorine containing resin (e.g. Lumiflon resin), and a di- or polyisocyanate compound. According to a further embodiment, the coating material comprises a polyester resin with an acid value above 50, in particular above 60, further in particular above 70, and/or an epoxy resin with an epoxy equivalent weight (EEW) of 300 to 700 g/eq, in particular 400 to 600 g/eq and further in particular 500 to 560 g/eq, and/or an accelerator (e.g. an accelerator as described herein).

According to a further embodiment, the coating material is configured to, serve at least one of the following functions: forming a part of a coating layer representing an image, sealing, high-temperature resistance, weathering resistance, long-term ultraviolet stability, wearing coat, being free from pinholes, wear based bleaching protection, outdoor capability, scratch resistance, resistance to solvents, diffusion reduction, corrosion protection, high temperature resistance.

According to a further embodiment, the amount of the amorphous resin component is at least 30 w-%, in particular 50 w-% and further in particular at least 70 w-% with respect to the overall amount of resin in the coating material.

According to a further embodiment, there is provided a use of a coating material according to one or more embodiments of the herein disclosed subject matter, for protection of substrates in particular against corrosion and/or weather and/or UV-light and/or aggressive liquids and/or scratching; wherein the coating material is in particular applied by NIP, wherein the coating material is in particular applied with a resolution higher than 100 DPI, further in particular with a resolution higher than 200 DPI and further in particular with a resolution higher than 300 DPI, further in particular with a resolution of more than 2 l/mm, in particular more than 5 l/mm and further in particular more than 10 l/mm.

According to a further embodiment, there is provided a use of a coating material according to one or more embodiments of the herein disclosed subject matter, for protection of substrates against corrosion and/or weather and/or UV-light and/or aggressive fluids (liquids and/or gases (such as ozone)) and/or scratching, in particular wherein the coating material is transparent and/or is applied via a NIP method.

Generally herein, according to an embodiment the use of a coating material may include a use of a developer comprising the coating material.

For example, according to a further embodiment, there is provided a use of a developer according to one or more embodiments of the herein disclosed subject matter for generating from the coating material a coating layer for protection of substrates in particular against corrosion and/or weather and/or UV-light and/or aggressive liquids and/or scratching; wherein the coating material is in particular applied by non-impact printing; wherein the coating material is in particular applied with a resolution higher than 100 DPI, further in particular with a resolution higher than 200 DPI and further in particular with a resolution higher than 300 DPI, further in particular with a resolution of more than 2 lines per millimeter, in particular more than 5 lines per millimeter and further in particular more than 10 lines per millimeter. According to a further embodiment, the coating material may not provide full protection of the substrate but rather adds to the protection of the substrate. According to a further embodiment the coating material is used to provide a decorating effect (e.g. an image) to the substrate. According to a further embodiment the coating material may provide both protection and a decorating effect (e.g. an image) to the substrate.

According to an embodiment, there is provided a use of a developer according to one or more embodiments of the herein disclosed subject matter for generating from the coating material a coating layer for protection of substrates against corrosion and/or weather and/or UV-light and/or aggressive liquids and/or scratching, in particular wherein the coating material is transparent and/or applied via a non-impact printing method.

According to an embodiment, there is provided a method, the method comprising: applying a coating layer generated from the coating material according to one or more embodiments of the herein disclosed subject matter (e.g. from the coating material of the developer according to one or more embodiments of the herein disclosed subject matter) to a target surface, in particular by means of a NIP device.

According to an embodiment, the target surface is a surface of a transfer element which is used to transfer the coating layer to a substrate. According to a further embodiment, the target surface is a surface of a substrate. According to a further embodiment, the method further comprises: mixing at least one carrier (e.g. at least one solid carrier or at least one liquid carrier) with the coating material.

According to an embodiment, there is provided a reservoir, in particular a cartridge, for a NIP device, the reservoir comprising a coating material according to one or more embodiments of the herein disclosed subject matter.

According to an embodiment, there is provided a reservoir, in particular a cartridge, for a NIP device, the reservoir comprising a developer according to one or more embodiments of the herein disclosed subject matter.

According to an embodiment, there is provided a NIP device comprising a coating material according to one or more embodiments of the herein disclosed subject matter.

According to an embodiment, there is provided a NIP device comprising a developer according to one or more embodiments of the herein disclosed subject matter.

According to an embodiment, there is provided a transfer element comprising a coating layer generated from the coating material according to one or more embodiments of the herein disclosed subject matter.

According to an embodiment, there is provided a transfer element comprising a coating layer generated from a coating material of the developer according to one or more embodiments of the herein disclosed subject matter.

According to an embodiment, there is provided a substrate, in particular a pre-coated substrate, the substrate comprising a coating layer generated from the coating material according to one or more embodiments of the herein disclosed subject matter.

According to an embodiment, there is provided a substrate, in particular a pre-coated substrate, the substrate comprising a coating layer generated from the coating material of the developer according to one or more embodiments of the herein disclosed subject matter.

According to an embodiment, the coating layer in particular has a thickness of at least 10 µm, in particular a thickness of at least 15 µm and further in particular a thickness of at least 30 µm.

According to an embodiment, the coating layer represents an image and wherein a resolution of the image is at least 100 DPI, in particular at least 200 DPI and further in particular at least 300 DPI, further in particular more than 2 l/mm, in particular more than 5 l/mm and further in particular more than 10 l/mm.

According to an embodiment, the (cured) coating layer on the substrate has an indentation hardness of above 87 with a layer thickness of 60 µm-80 µm according to ISO 2815 is given.

According to an embodiment, the (cured) coating layer on the substrate has a minimum glass transition temperature above 50° C., 60° C., in particular above 80° C.

According to an embodiment, the (cured) coating layer on the substrate has a remaining gloss after 300 hours of UV exposure according to GSB international AL631-PartVII-segment 20.1 Kurzbewitterung UV-B (313), is at least 50%.

According to an embodiment, the cured coating layer on the substrate has a remaining gloss after 600 hours of UV exposure according to the test procedure of GSB international AL631-PartVII-segment 20.1 Kurzbewitterung UV-B (313) of least 50%, in particular at least 85%.

According to an embodiment, the (cured) coating layer on the substrate has a remaining gloss after 1000 hours of Xenon exposure according to EN ISO 16474-2 determined according to ISO 2813, of at least 50%, in particular at least 85%.

According to an embodiment, there is provided a coating layer application device, the coating layer application device being configured for receiving a transfer element comprising a coating layer generated from a coating material according to one or more embodiments of the herein disclosed subject matter, the coating layer application device being further configured for applying the coating layer to a substrate.

According to a further embodiment, there is provided a coating layer application device, the coating layer application device being configured for receiving a transfer element comprising a coating layer generated from the coating material of the developer according to one or more embodiments of the herein disclosed subject matter, the coating layer application device being further configured for applying the coating layer to a substrate.

According to an embodiment, a layer thickness is determined according to ISO 2360. According to an embodiment, a reflectometry value is determined according to ISO 2813. According to an embodiment, a cross cutting/grid testing is performed according to ISO 2409. According to a further embodiment, an indentation hardness is determined according to ISO 2815.

According to an embodiment, a charge control agent is used. The charge control agent is preferably salicylic acid or a derivative thereof, more preferably zinc salicylic acid or a derivative thereof. By the presence of the charge control agent, in particular salicylic acid or a derivative thereof, the stability of the coating material is significantly enhanced in a particular when the coated substrate is used in outdoor applications. An enhanced stability of the coating material becomes particularly significant when rather harsh environmental conditions prevail or in the case of the coating material being exposed to mechanical stress.

Surprisingly, by using a charge control agent, which is preferably salicylic acid or a derivative thereof, network build-up may be more consistent during the curing process. By such a more consistent network a particularly high resolution may be achieved with at the same time equally and uniformly distributed color tones.

Surprisingly it was found that for high color density printing, best color density was achieved with values of about 1 w-% of charge control agent in the coating composition, in particular with values higher than 1 w-%, preferably higher than 2 w-%.

Surprisingly, using a charge control agent with unevenly distributed particle sizes is particularly effective for obtaining higher quality printing results.

In an embodiment, coatings comprising a suitable amount of charge control agent may be only applied to areas which are particularly exposed to mechanical stress. For instance by means of the described printing process, it is possible to selectively provide a coating on handles, rails and tracks for example in machines or machine components which are usually exposed to high mechanical stress. Surface coatings for a plurality of substrate structures in a variety of different fields of technology can therefore be provided efficiently.

In an embodiment, a suitable amount of the charge control agent is in particular 1 to 5 w-%. By such an amount of the charge control agent, an optimum of the relevant parameters, which are resistance to distortions, deformations and abrasion, due to harsh environment conditions and/or mechanical stress, on the one hand, and the high resolution, on the other hand, may be achieved. Stated differently, in particular by providing a charge control agent in an amount of 1 to 5 w-% an optimal composition may be obtained for providing not only stability but also high resolution for ensuring a high quantity and quality printing process.

Not being bound to any theory, it is assumed by the inventors that the surface of the charge control agent particles, which have in particular spike-like structures on their surface, contributes to an inner adherence of the coating material by means of a indention process. Such an internally indented coating material allows for the application of steeper angles and consequently to a better resolution of the final coating with well and clearly defined contours.

According to an particularly preferable example, the coating material comprises a charge control agent and a silica material, i.e. an oxide of silicon with the chemical formula $SiO_2$ or derivatives thereof, in an amount of 1 w-% to 5 w.-%. In the example, the charge control agent is preferably salicylic acid or a derivative thereof and the particle size of the coating material is between 5 μm to 15 μm, the sphericity of the coating particles is above 0.8. Further, in the example the silica material has a diameter in a range of 1 nm to 50 nm. Further, in the example preferably the diameter selection of the charge control agent is in a range of 1 μm to 20 μm.

According to an embodiment, a particle size distribution of the charge control agent exhibits a d10 of between 0.5 μm and 5 μm, and/or a d90 of between 5 μm and 50 μm. According to a further embodiment, the particle size distribution of the charge control agent exhibits a d10 of between 0.5 μm and 3 μm and/or a d90 of between 5 μm and 25 μm. According to a further embodiment, the particle size distribution of the charge control agent exhibits a d10 below 2 μm and/or a d90 below 10 μm.

According to an embodiment, the coating material is at least partly curable, in particular by crosslinking. Reduction of a contact pressure applied onto the coating material (coating layer) may be particularly advantageous for the coating as described in the present application, since a large contact pressure of a heating system may result in deformations and distortions of the printed image. Such deformations and distortions of the printed image may dramatically deteriorate the resolution of the printed image and are to be avoided. Therefore, a coating material which is at least partly curable, in particular comprising at least one component capable of forming crosslinks, is preferable for achieving an improved resolution of the printed image. Correspondingly, the process of forming of the coating material on the substrate by the printing process as described in the herein disclosed subject matter comprises in an embodiment a curing step, which can be a non-thermal curing step (e.g. a light induced curing step) or a thermally induced curing step, by which the coating material, which is at least partly curable, is cured, in particular by the formation of crosslinks by at least one component capable of forming crosslinks.

According to a further embodiment, the non-impact printing device is configured for and may be used for generating a surface structure by applying a plurality of coating layers, i.e. at least one second coating layer being placed on and/or adjacent to at least one first coating layer. The plurality of coating layers are applied subsequently. According to an embodiment, at least one of the coating layers of the plurality of coating layers is subjected to a pre-curing process, preferably by using a light source, preferably UV-light. By means of applying a plurality of coating layers in combination with at least one pre-curing step an improvement of the resolution can be achieved as the layers can be applied in a controlled and precise manner.

Chapter 8

According to an embodiment, there is provided a coating material configured for generating a coating layer by NIP, the coating material comprising: at least one effect particle, comprising at least one at least partially covered effect pigment, the effect pigment being covered, at least partially, by a curable polymeric matrix.

According to an embodiment, the polymer matrix is transparent.

Further, according to an embodiment, the coating material is curable, in particular thermally curable and/or radiation curable, further in particular at least partially thermally curable and/or at least partially radiation curable.

Further, according to an embodiment, the curable polymer matrix is thermally curable and/or radiation curable. Further, according to an embodiment, the curable polymer matrix is at least partially thermally curable and/or at least partially radiation curable.

According to a further embodiment, the coating material further comprises a curing agent, in particular a curing agent capable of cross-linking with at least one component of the curable polymeric matrix.

According to an embodiment, the coating material is provided in the form of a plurality of particles and an average particle diameter of the plurality of particles being between 5 µm and 100 µm, in particular between 5 µm and 50 µm, further in particular between 7 µm and 60 µm, further in particular between 7 µm and 70 µm, further in particular between 7 µm and 20 µm, further in particular between 7 µm and 50 µm.

According to a further embodiment, the coating material comprises a resin, the resin comprising a curable resin component, wherein the at least one effect particle is at least part of a first material portion of the coating material wherein the resin is part of a second material portion of the coating material.

According to an embodiment, the curable resin component is at least partially thermally curable and/or is at least partially curable by a crosslinking agent able to react with functional groups of the resin component, further in particular wherein the resin comprises an amorphous resin portion.

According to an embodiment, the first material portion and the second material portion being mixed with each other. According to a further embodiment, the coating material comprises the first material portion and the second material portion at a mass ratio of 1% to 50% of the first material portion to 50% to 99% of the second material portion. Per definition, the percentage of the first material portion and the percentage of second material portion add to 100%. For example, the mass ratio could be 10% of the first material portion to 90% of the second material portion.

According to an embodiment, the effect pigments are metallic effect pigments.

According to a further embodiment, the effect pigments are pearl luster pigments and/or interference pigments.

According to an embodiment, the second and/or the first material portion further comprise a charge control agent and/or silica and/or titanium dioxide wherein the silica and/or titanium dioxide have an average particle diameter of between 1 nm to 150 nm.

According to an embodiment, there is provided a method of producing a coating material according to one or more embodiments of the herein disclosed subject matter, the method comprising: heating the curable polymer matrix so as to soften the curable polymer matrix; and adding the at least one effect pigment into the softened curable polymer matrix.

According to an embodiment, the at least one effect pigment is added to the softened curable polymer matrix via at least one side feeder during an extrusion process; and/or wherein an average diameter of the effect pigments after adding to the softened curable polymer matrix and dispersing the effect pigments therein is at least 80%, preferably at least 90% of an average diameter of the effect pigments before the addition to the softened curable polymer matrix.

In accordance with an embodiment, the side feeder may be used for adding any kind of additive to the coating material.

After covering the effect pigment with the curable polymer matrix (e.g. a transparent curable polymer matrix) in the extrusion process (i.e. in an extruder), the extrudate is broken, grinded (preferably jet milled) and/or classified to obtain the desired particle size distribution.

According to an embodiment, the effect particles are part of a coating material which is provided in a cartridge and is then printed by non-impact printing. According to a further embodiment, any other coating material (e.g. a colored coating material (e.g. CMYK)) is located in a separate cartridge.

Accordingly, in an embodiment, the effect particles are part of a first coating material which does not contain a second material portion (e.g. a colored toner) but which is provided in a separate cartridge and is then printed by non-impact printing. According to a further embodiment, any other coating material (e.g. a colored coating material (e.g. CMYK)) is located in a separate cartridge. According to an embodiment, a printing order is: the second (e.g. colored) coating material, then the first coating material (effect particles) on top or vice versa, or effect particles somewhere in between two or more layers of a second (e.g. colored) coating material.

According to an embodiment, a set of coating materials is provided, each coating material of the set of coating materials being configured for generating a coating layer by non-impact printing, the set of coating materials comprising (at least): a first coating material comprising at least one effect particle, comprising at least one at least partially covered effect pigment, the effect pigment being covered, at least partially, by a curable polymeric matrix, wherein the polymer matrix is preferably transparent; a second coating material comprising a resin, the resin comprising a curable resin component, in particular wherein the curable resin component is at least partially thermally curable and/or at least partially radiation curable and/or is at least partially curable by a crosslinking agent able to react with functional groups of the resin component, further in particular wherein the resin comprises an amorphous resin portion.

According to an embodiment, the first coating material and the second coating material are compatible with each other (e.g. regarding printing and/or curing) such that they can be printed in direct contact with each other. Hence, according to an embodiment, in a layer package a first coating layer generated from the first coating material and a second coating layer generated from the second coating material are contacting each other. According to an embodiment, the set of coating materials comprises one or more first coating materials and one or more second coating materials. For example, in an embodiment four second coating materials are provided, such as a CYMK system. According to an embodiment, the compatibility is achieved because functional groups of the first coating material can react with functional groups of the second coating material upon curing.

According to an embodiment, the second coating material may be configured as the second material portion described herein. According to a further embodiment, the second coating material may be configured according to any one or more embodiments of a coating material described herein.

According to an embodiment, a 2K system (effect particles+carrier) may be provided, in accordance with embodiments of the herein dislosed subject matter. According to an embodiment, the final layer (e.g. with a transparent channel) can be achieved by the transparent matrix of the effect pigment.

According to an embodiment, the method further comprises forming a plurality of the effect particles from the curable polymer matrix with the added at least one effect pigment. According to a further embodiment, the method further comprises an after treatment of the effect particles so as to improve a coverage of the effect pigments with the curable polymer matrix, in particular by initiating viscous flow of the polymer matrix and/or by additional coating.

According to an embodiment, the method further comprises adding the second material portion to the first material portion. According to a further embodiment, the method further comprises at least partially curing the curable polymeric matrix before adding the second material portion to the first material portion.

According to an embodiment, the method comprises mixing the second material portion and the first material portion, in particular such that an average particle size of the effect particles after the mixing is in a range of 70% to 100%, in particular in a range of 80% to 90% of an average particle size of the effect particles before the mixing. A moderate reduction of the average particle size due to mixing may be achieved by choosing suitable mixing parameters so as to achieve gentle mixing.

According to an embodiment, there is provided a coating layer, in particular a coating layer generated from a coating material according to one or more embodiments of the herein disclosed subject matter, wherein the coating material comprises at least one effect particle. According to a further embodiment, there is provided a coating layer generated according to a method of producing a coating material according to embodiments of the herein disclosed subject matter.

According to an embodiment, at least one channel formed from the curable polymer matrix extends between a surface of the coating and an effect pigment out of the at least one effect pigment, in particular wherein the curable polymeric matrix is transparent. According to an embodiment, the curable polymeric matrix of the at least one channel is transparent.

According to an embodiment, there is provided a substrate comprising a layer package comprising at least one layer, wherein at least one of the at least one layer is a coating layer which comprises at least one effect particle, in particular wherein the coating layer is cured.

According to an embodiment, there is provided a transfer element comprising a layer package comprising at least one layer, wherein at least one of the at least one layer is a coating layer (according to one or more embodiments) comprising at least one effect particle. According to an embodiment, the coating layer on the transfer element may be partially cured or has been subjected to viscous flow.

According to an embodiment, there is provided a use of a coating material comprising at least one effect particle for NIP of a coating layer.

According to an embodiment, there is provided a use of a coating material comprising at least one effect particle, in particular for direct NIP of the coating layer onto a substrate, in particular onto a precoated substrate. According to a further embodiment, there is provided a use of a coating material comprising at least one effect particle for indirect NIP of the coating layer onto a transfer element which is configured for transferring the coating layer to a substrate, in particular a precoated substrate.

According to an embodiment, there is provided a processing device configured for processing a coating material according to one or more embodiments of the herein disclosed subject matter, the processing device comprising in particular at least one of: a NIP device configured for printing the coating material to thereby generate a coating layer; a pretreatment device configured for treating the coating layer before application of the coating layer to a substrate; a coating layer application device for applying the coating layer, printed onto a transfer element, from the transfer element to the substrate; a curing device for curing the coating layer applied to the substrate; wherein one or more of the NIP device, the pretreatment device, the coating layer application device, and the curing device are located at the same location and/or one or more of the NIP device, the pretreatment device, the coating layer application device, and the curing device are located in different locations.

According to an embodiment, there is provided a method of processing a coating material according to one or more embodiments of the herein disclosed subject matter, the method including in particular at least one of: printing the coating material to thereby generate a coating layer; treating the coating layer before application of the coating layer to a substrate; applying the coating layer, printed onto a transfer element, from the transfer element to the substrate; curing the coating layer applied to the substrate.

According to an embodiment, there is provided a reservoir, in particular a cartridge, for a NIP device, the reservoir comprising a coating material according to one or more embodiments of the herein disclosed subject matter.

A coating material according to embodiments of the herein disclosed subject matter may be provided for electrophotography and hence may be referred to as a toner (although being different from conventional toners). Further, although some embodiment refer to a toner, these embodiments are as well applicable to a coating material according to the herein disclosed subject matter in general.

Embodiments relate to an effect toner characterized by at least one effect particle, where the at least one effect particle is covered at least partially by a curable polymeric matrix A, preferably the polymeric matrix A being transparent. In particular the toner is including a curing agent which can crosslink with at least one component of the transparent polymeric A matrix and/or the toner has an average particle diameter between 5-100 µm, in particular between 5 and 50 µm, in particular between 7 and 20 µm. An embodiment relates to a toner comprising at least one base toner B and at least one effect toner A having effect pigments, the production of an effect toner of this type by means of an effect pigment-preserving dispersion of effect pigments in a melt of transparent toner, for example by means of gentle extrusion, and an effect coating as can be provided by the toner according to embodiments of the herein disclosed subject matter.

Toners with metallic effects are not very broadly used as they are difficult to produce and use based on the fact that the effect pigments often are conductive and therefor the charging properties in the printing machine are negatively influenced.

The following documents describe aspects of conventional toners: U.S. Pat. No. 9,383,669B2; WO2013166139A1; US20160216623A1; U.S. Pat. No. 9,323,169B2.

However, up to now no industrial effect toner printing solution is known which can be used to cover the needs of high quality printing together with a printing that can withstand the harsh environmental conditions of industrial applications. These conditions can include:
1) High weather resistance/high UV resistance
2) Resistance against abrasion
3) High chemical stability
4) Mechanical strength and/or flexibility
5) Adhesion to industrial substrates like steel, glass, ceramic, wood, MDF or plastics Embodiments of the herein disclosed subject matter enable to fulfil one or more of these conditions.

Effect toners for use in the printing field should be characterized by a pronounced effect (what is referred to as a sparkling effect) that is particularly effective especially for dark basic color tones. Due to the high contrast between lighter, brilliant effect pigments and the dark basic color, the slightest differences in the effect concentration, above all on the finished object, are very easy to recognize, particularly if printing is to take place on larger areas and multiple printed sections were aligned in an end-to-end manner. In addition, for the use of metallic pigments or powders which contain the metallic pigments, closer attention must be paid to the explosion protection during handling.

Current known metallic toner systems do not sufficiently fulfill these requirements and therefor the market requires a solution which can close this gap.

It was surprisingly found that toners for industrial applications with metallic effects can be achieved with the coating material according to embodiments of the herein disclosed subject matter. Embodiments of this toner systems can be even used for architectural applications with suitable resin systems as described below. However, for some applications an additional top coat might therefor be suggested. A preferred embodiment is given where the material comprises effect pigments with a diameter of less than 50 µm, preferably less than 20 µm and most preferably less than 10 µm. This effect pigments can be chosen out of the known state of the art. A special embodiment of a metallic/effect toner according to embodiments is given when more than 50%, preferably more than 75% and most preferably more than 90% of the surface of the effect pigment is covered with a curable material which is not electrically conductive or at least has a high ohmic resistance compared to metallic effect pigments. This curable material includes in particular a curing agent to react with a resin and/or is preferably at least partly transparent. Here surprisingly very good properties in the printing stability and printing quality as well as the effect quality and also durability against the environment was given. Such a matrix can also be curable via radiation like UV-light or electron beam. However, for many industrial applications the curing of a printing purely via radiation limits the potential applications dramatically based on the fact that big and complex substrates have to be printed and the accessibility of radiation is therefore limited, especially with the current designs of industrial ovens in the market.

The presented embodiments herein provide a solution to cover these needs. The present embodiments furthermore provide a cost efficient method to produce such a toner material with sparkling effects.

Surprisingly it was found that effect toner with good printing properties can be produced when the effect pigments are at least partly coated with an at least partly transparent coating. This coated pigments can then be mixed with a colored toner matrix (e.g. by dry blending or any other suitable method) and give brilliant colored toners with metallic effects. Furthermore, even more surprisingly it was found that the coating can withstand industrial applications when the at least partly transparent coating is curable and furthermore the colored toner matrix is also curable. Most preferably the curable matrix of the toner as well the curable transparent coating on the effect pigments is thermally curable, especially with a curing agent. Surprisingly it was found that if the formulations based on powder coatings are adjusted to toner applications (e.g. by adding a charge control agent and/or silica) suitable charging properties of metallic toners with the excellent properties of powder coatings for industrial applications can be merged.

Surprisingly it was found that by the use of a curable transparent coating on the effect pigments transparent channels can be built from an effect pigment up to the surface of the final cured printed layer which lead to an increased metallic effect of the printing.

Surprisingly it was found that the effect pigment leads to very good effects when the effect pigment was covered with the preferably at least partly transparent matrix by mixing the effect pigment and the preferably at least partly transparent matrix by extrusion, especially when a side-feeder was used to add the effect pigments to the at least partly transparent matrix and the side feeder allows adding the effect pigments with low shear forces.

An object may be considered as the production of unique and brilliant effect toners for use in the printing field, including electrostatic, electrophotographic and 3D printing, wherein the appearance and/or effect manifestation of the effect toner according to the embodiments is not influenced or only insignificantly influenced by the printing process. These absolutely process-reliable and pronounced metallic effects have a special impression of depth and are even suitable in an embodiment for use in highly weather-resistant systems. Furthermore, the present embodiment relates to a toner of this type, containing effect pigments produced according to the embodiments in a ground premix.

Surprisingly, it was found that the combination of a ground premix, comprising effect pigments dispersed in a melt of at least one transparent curable matrix, with an additional toner forming the base of the effect toner keeps the shear forces occurring on the effect pigment so low that the majority of the effect pigments do not experience any significant reduction in particle size. Equally surprisingly, it was found that the at least partial envelopment of the metallic pigments with a transparent curable matrix significantly reduces the negative effects of the conductive pigments on the charge behavior of the toner during the printing process.

Particularly surprisingly, it was found in an embodiment that the combination of metallic pigments in an at least thermally curable matrix with a base toner is suitable for producing weather-resistant coatings in a printing process, and that the toner and matrix satisfy the corresponding requirements for UV and weather resistance according to industrial standards (e.g., AAMA, GSB, etc.). In this case, it is possible, with the use of toner formulations that are based on powder coatings (e.g. by adding charge control agents and/or silica), to combine the charge characteristics of toners with the coating characteristics of industrial powder coatings.

Effect toners of this type are characterized by at least one of the following points:
High process stability under a wide range of different printing parameters
Pronounced metallic effects, in particular characterized by a high impression of depth, a brilliant effect and specifically by an independence from the viewing angle of the effects. Additionally, substrates printed with the metallic toners according to embodiments show significantly fewer color fluctuations over the area.

Improved printing properties, since the at least partial envelopment of the metallic pigments with a preferably transparent curable matrix improves the charge behavior of the metallic toner during the printing process.

High weather resistance/high UV resistance

Resistance against abrasion

High chemical stability

Mechanical strength and/or flexibility

Adhesion to industrial substrates like steel, glass, ceramic, wood, MDF or plastics According to an embodiment, the object mentioned above is attained by a toner comprising at least one base toner B and at least one effect toner A having effect pigments, wherein the effect pigments in effect toner A are at least partially enveloped by an at least partially transparent curable toner matrix. The effect pigments can thereby be dispersed in a melt of at least partially transparent and mostly colorless toner matrix. A toner composition that is mainly only composed of resins and curing agents and/or initiators (like UV and/or thermal initiators) and/or curing catalysts and necessary additives (e.g. for setting the chargeability) is typically used as a transparent and mostly colorless matrix. The hardened matrix shows a high transparency. Within the scope of embodiments, a transparent matrix is preferably used which, at hardened film layer thicknesses of 15 μm, still has sufficient transparency to detect the coating layers or substrates located therebelow.

The effect pigment can be incorporated in the binder matrix of toner A by many different ways. For example extrusion is a possibility. A special embodiment is shown afterwards:

An excessively strong shear stress during the dispersion (mixing or extrusion) of effect pigments in a toner produced in this manner typically causes the effect pigments to become damaged, and to no longer achieve the desired effect or to achieve at least a strongly reduced effect. Furthermore, other disadvantages also result, such as the poorer process characteristics mentioned above. Surprisingly, it was shown that the low-shear introduction of effect pigments into molten transparent hardenable toners enables a very suitable dispersion/homogenization of the effect pigments in the polymer matrix of the transparent toner.

Particularly surprising in this case was the finding that, quite the contrary, with a toner containing at least two toners A and B, wherein toner A contains effect pigments that are at least partially surrounded by an at least partially transparent toner matrix, and toner B is a colored base toner and is not transparent as described herein, outstanding effect characteristics occurred, such as a uniform color and effect impression of printed substrates (with none of what is referred to as clouding), and above all an effect appearance that is essentially independent of the viewing angle.

In the opinion of the inventors—without being bound to a theory—the observed and measured effect can be explained in that, with the toner according to embodiments, channels form in the toner layer which are composed of transparent toner. Thus, even those pigments that are not on the surface, but rather only in the interior of the coating can become visible for the observer. This effect results on the one hand in the independence from the viewing angle, but also in an optically perceptible 3D effect or an impression of depth of the toner according to embodiments.

In one embodiment of the toner, the shear forces occurring on the effect pigment in effect toner A during production are so small that the majority of the effect pigments do not experience any significant reduction in particle size. This can be technically attained in that, for example, transparent toner is melted or at least softened in a heated stirred reactor, for example, and at least one effect pigment is stirred into the softened polymer matrix (e.g. a melt), wherein the effect toner A produced from this mixture by means of grinding after the cooling is then mixed with an opaque, preferably colored base toner B. Other technical embodiments are also conceivable within the scope of embodiments. One preferred embodiment consists in that at least one effect pigment is added to the transparent softend polymer matrix (e.g. the toner melt) via at least one side feeder during an extrusion process, wherein the effect toner A (effect particles/first material portion) produced from this polymer matrix (e.g. the toner melt) comprising the at least one effect pigment by grinding after the cooling is subsequently mixed with a base toner B (second material portion), thereby resulting in a coating material which can be used in accordance with embodiments of the herein disclosed subject matter. The term "side feeder" implies the addition of a substance (typically an additive or effect pigment according to the prior art, see for example information material from the extruder manufacturer Leistritz Extrusionstechnik GmbH (Germany) "Master_V_07_GB/17.09.13 Masterbatch") at a different position in the extruder processing section than directly at the beginning of the extruder (premix feed in barrel 1). By means of the side feeder, the effect pigment is force-fed laterally into the extruder and introduced into the softened polymer matrix (e.g. melt) at a defined ratio to the transparent toner premix. The shear force that acts on the pigment in the extruder can be influenced by the position of the side feeder along the processing section and the screw configuration used. A low shear force within the extruder is characterized by a low destruction of the effect pigment. Through the use of screw elements that are only used for mixing or for conveying the extruder melt, a reduction of the shear forces to an amount provided according to embodiments with a simultaneous sufficient homogenization/dispersion is possible. Above all, an addition in the rear section, preferably in the final third of the processing section (e.g. in the second-to-last housing) of the extruder via a side feeder has proven particularly advantageous. Starting from the adding point of the pigment, the shear force is kept as small as possible by special screw configurations, for example the exclusive use of conveying elements, so that the pigment(s) is/are only destroyed or damaged to a small extent.

As previously mentioned, a transparent effect toner A can be produced for the toner according to embodiments by adding at least one effect pigment by means of at least one side feeder into the softened polymer matrix (e.g. melt) of a subsequently transparently hardening toner during an extrusion process and by grinding the cooled polymer matrix (cooled melt), wherein effect toner A is then mixed with at least one additional toner B according to embodiments as disclosed herein, referred to as the base toner, for example by means of dry blending or another suitable method. Also possible is the joint grinding of extrudate chips from the effect toner A according to embodiments with extrudate chips of another toner B in a combined grinding process. The base toner B can thereby be a unicolored toner that does not contain any effect pigments, or an effect-containing toner.

As previously mentioned above, effect toner A can be produced in an extruder by adding effect pigments to an at least partially transparent, softened toner material (e.g. to an at least partially transparent toner melt) via a side feeder. The side feeder itself is located in the final third of the processing section. After the adding point of the side feeder, only small shear forces are introduced via the extruder shaft. After the extruding, the effect toner is cold-rolled, broken down, ground and classified. The toner according to embodiments can be produced by preparing and weighing the raw materials, including the transparent effect toner A and the base toner B, subsequent premixing, extrusion or mixing, cold rolling, breaking down, grinding and classifying.

In a preferred embodiment of the present invention, the toner according to embodiments comprises effect toner A mixed with base toner B at a mass ratio of 1%-50% effect toner A to 50%-99% base toner B, in particular preferably 5%-30% effect toner A to 70% to 95% base toner B. The production of the toner according to embodiments can take place by means of what is referred to as dry blending. The mixing of effect toner A with base toner B in the softened (or melt) phase or other suitable methods is also possible within the scope of embodiments.

As extruders, generally all types available on the market, such as single- or double-shaft extruders, can be used with a side feeder within the scope of embodiments. The parameters that are to be set for this purpose, such as screw configurations, torque and throughput, can be designed flexibly depending on the toner system used and the toner properties that are to be set, provided that the shear forces are kept appropriately low starting from the adding position of the effect pigments via the side feeder. Here, a positioning of the side feeder for admixing effect pigments in the rear third of the extruder with the tested extruder types commercially available on the market has proven successful. To ensure clarity in this regard, it should be noted that it is, of course, also possible to supply materials other than effect pigments to the toner via the side feeder(s) (for example, additives).

Other embodiments that also enable an admixture into the softened polymer matrix (or into the melt phase) without significant shear forces are naturally also within the scope of embodiments.

This method has proven particularly successful for the toner production according to embodiments of toners which exhibit a very clearly visible sparkle effect. An effect of this type can be produced in particular by mixing aluminum effect pigments with a D50>=35 µm in the shape of what are referred to as silver dollars with a dark basic color hue. Silver dollar pigments are produced from a special aluminum grit and ground according to the size classification. In this manner, pigments are formed which are characterized by their round to oval shape and smooth surface. These pigments normally exhibit a very high degree of sparkling, that is, light is hardly scattered and is more strongly reflected by the pigment. The higher the contrast between effect pigment (light, silver) and basic color hue, the more difficult it is to produce these effect colors and process them at the end user. However, having said this furthermore it should be mentioned that depending on the printing device, the necessary resolution of the final printing other embodiments with different particle size (e.g. smaller for high resolution prints, bigger for prints with high haptic effects) are also in the scope of embodiments.

Specific substrates for coating with the toners (coating materials) according to embodiments are in particular pre-treated and/or cleaned/degreased aluminum alloys, or steel and alloys thereof. Other suitable industrial substrates without limitations could be MDF, wood, particle boards, glass, ceramic or polymers.

Coating Material/Toner:

Potential binding agents for the toners according to embodiments include saturated and unsaturated systems. The latter can be, among other things, radically crosslinked by UV and/or thermal initiators such as peroxides.

Among these binding agents, specifically saturated polyesters play the largest role. Carboxyl-functional polyester resins which have a functionality of 2 or higher are named here by way of example. These can be crosslinked with organic compounds that are capable of reacting with the functional groups like carboxyl or OH groups of the polyester while producing a covalent bond, and if necessary, common pigments, fillers and additives can be added thereto. However, surprisingly it was found that without fillers and additives (especially flow additives) sometimes even better printing performance was given. In the following description is added for some potential embodiments without limitation according to embodiments.

Another embodiment includes an additional step of after treatment of the toner particle which are at least partly covered by a curable, preferably transparent, polymer matrix. This step is done to reduce or completely prevent surfaces of the effect pigments which are not covered by the curable, preferably transparent, polymer matrix. This steps can be for example thermal treatment to allow viscous flow of the polymer matrix over the uncovered surfaces and/or additional coating afterwards e.g. via spraying (maybe liquids or even gas- or vapor- or chemical-deposition).

In an embodiment the curable polymer matrix of which at least partially covers the effect pigments the matrix can be at least partially cured to reduce further flow of the matrix afterwards during processing, coating and/or curing, As hardeners for carboxyl-functional polyester resins, both triglycidyl isocyanurate (=TGIC) and also the common alternatives such as, among others, ß-hydroxyalkylamides like PrimidR XL-552 (=bis[N,N'-di-(ß-hydroxyethyl)]-adipamide) or PrimidR QM-1260 (=bis[N,N'-di-(ß-hydroxypropyl)]-adipamide), both EMS chemicals, are suitable for the production of weather-resistant coatings. A special feature of these (Primid) hardeners is their toxicological harmlessness according to the current body of knowledge.

Other possible alternatives like TGIC as a hardener for carboxyl-functional polyester resins are, for example, the glycidyl esters of aromatic or cycloaliphatic dicarboxylic acids; an appropriate commercially available hardener of an analogous chemical structure is, for example, AralditR PT 910 (terephthalic acid diglycidyl ester/trimellitic acid triglycidyl ester, approximately 75:25) from CIBA Spezialitatenchemie GmbH. The presence of the trifunctional trimellitic acid ester in AralditR PT 910 can be considered advantageous for the crosslinking density of cured coatings in comparison with pure diglycidyl esters. However, other hardeners for carboxyl-functional polyester resins as known in the art are also within the scope of the herein disclosed subject matter.

Polyester resins for the production of weather-resistant powder coatings that are hardened with polyepoxides and/or ß-hydroxyalkylamides have among other things typically an acid number in the range from 15 to 70 mg KOH/g polyester and a hydroxyl number less than or equal to 10 mg KOH/g polyester. These are essentially composed of units of aromatic dicarboxylic acids, such as terephthalic acid and isophthalic acid, in addition to which possibly smaller amounts of aliphatic and/or cycloaliphatic dicarboxylic acids, such as adipic acid and/or cyclohexane dicarboxylic acid, are used, and aliphatic diols, namely preferably branched aliphatic diols, such as neopentyl glycol, in addition to smaller amounts of linear and/or cycloaliphatic diols.

The additional use of hydroxycarboxylic acids or functional derivatives thereof, such as the inner esters thereof (=lactones), is also possible. The modification of this type of resins through the use of dimeric and trimeric aliphatic acids is also known. In addition, smaller amounts of trifunctional or polyfunctional and possibly monofunctional compounds can be used.

Other potential curable toner binder materials are epoxy, hybrid (combination of two or more different binder systems, for example this term is used for the combination of epoxy resins and polyester resins which often can react with each other, so therefore the epoxy is acting like a crosslinker for the polyester), urethane or urethane building systems and acrylate are just mentioned as additional options according to embodiments which can be used.

In a special embodiment so called leafing pigments and/or small effect pigments preferably with an average particle size between 1-20 µm, more preferably between 2 and 10 µm are used to be mixed in a matrix which comprises at least one curable resin, in particular a transparent resin to provide a toner. This toner material can be printed and afterwards can be coated by an additional at least partly transparent top coat, whereby this top coat can be applied by NIP (in particular by digital printing) or either by conventional coating means as liquid coating and/or powder coating.

Effect Pigments for Toner:

For the toner according to embodiments, mainly two types of pigment are used as effect pigment, namely aluminum pigments and mica pigments. Brass pigments and copper pigments can also be used. However, also other effect pigments are contemplated.

Effect pigments can be categorized into metallic effect pigments and special effect pigments.

For metallic effect pigments, platelets of metal, in particular of aluminum, are used. Light is reflected by the metallic surface, which is perceived by the viewer as a metallic effect.

Important metallic effect pigments are aluminum, bronze and copper platelets. Pearl luster pigments and interference pigments are grouped together under the term special effect pigments. Pear luster pigments are effect pigments which are composed of transparent platelets with a high refractive index. They create a pearl-like effect through multiple reflections. Interference pigments are effect pigments whose coloring effect depends entirely or mostly on interference. Interference pigments can be based on transparent or non-transparent platelets. Most commonly used in industry are metal oxide-coated mica pigments which, depending on the type and thickness of the coating, can belong to the pearl luster pigments or to the interference pigments. The most important interference pigments are platelet/flacky-shaped titanium dioxide, platelet/flacky-shaped organic pigments, metal oxide mica pigments, aluminum oxide flakes, Ca Al borosilicate flakes, silicon dioxide flakes, metal oxide-coated metal platelets or multilayer pigment. Many of these pigments are also subsequently coated with metal oxides (for example, titanium dioxide). The color effect can thus be influenced depending on the oxide layer thickness. Commercial names therefor are Iriodin®, Miraval® or Colorstream®.

Pigments based on natural mica are usually produced from naturally occurring muscovite mica by means of grinding, fractionating, cleaning and recoating, drying and calcination.

The effect of the pigments is based on the principle of directed reflection for metallic effect pigments, and directed reflection and interference for pearl luster pigments.

A commonality between all effect pigments is that the effect is very highly dependent on the viewing angle. In visual comparisons, this is simulated by tilting the samples. A color measurement is only useful with multi-angle measuring devices.

In a preferred embodiment of the herein disclosed subject matter, it is provided that, for the toner according to embodiments, the average diameter of the dispersed effect pigments is at least 90% of the average diameter of the original effect pigments. The diameter of the effect pigments (normally in the shape of pigment platelets) is, depending on the type, typically approximately 3 to 100 µm; the thickness of the individual platelets is less than 1 µm. The platelets can thereby be composed of one or more layers. The substrate is thereby crystalline (for example, mica) or amorphous (glass platelets or silicon dioxide platelets). To achieve a suitable effect appearance, the particles must have a smoothest possible surface and must be aligned in the individual application.

The metallic effect pigments are also categorized into leafing or non-leafing pigments.

Leafing pigments are aligned on the surface by means of special surface treatments in the hardened coating film. In this manner, a strong metallic luster is produced. However, this effect is not scratch- or smear-proof, which usually necessitates an overcoating with a protective clear coat film which of course can be provided by printing or conventional coating means.

Non-leafing pigments disperse uniformly in the film matrix after application. Only a portion of the pigment is aligned on the surface. As a result, they are protected against abrasion and chemical attack. However, the effect has a less brilliant and metallic appearance than is the case with leafing pigments. Embodiments of the herein disclosed subject matter will now be explained in greater detail using the examples and figures below, wherein embodiments are not limited to these examples.

EXAMPLES

The toner according to this invention embodiments can be made from two components where the one component (first material portion) is a transparent effect toner A and the other component (second material portion) is the colored opaque base toner B. In order to produce the following toner examples, all components were premixed in a high-speed mixer for 1 min, followed by extrusion in a twin-screw ZSK-18 extruder (temperature of the extruder segments: 60° C., 80° C., 100° C., 100° C., about 30% of torque). The extruded compound was cooled down, granulated and finely ground to produce a powder with the desired grain size distribution. The preferred grinding and classification was done by jet-milling with a Multino M/S/N opposed jet mill from NOLL if not stated otherwise with nitrogen inertisation. Before printing, silica (0.5% HDK H05 TD+1% HDK H30 ™ from Wacker Silicones) was bonded to the powders using a Henschel Mixer MB10.

Example

A transparent and colorless toner (effect toner) was made from 810 parts Crylcoat® 4642-3 or comparable polyester, 61 parts Primid® XL-552, 5 parts Richfos® 626, 8 parts Benzoin, 2 parts Tinuvin® (Tinuvin® 144) and 18 parts of CCA by mixing these components. By gravimetrical dosing the before mentioned mixture was fed to the extruder and molten and dispersed by the use of a suitable screw configuration which are known by a person skilled to the art. In the last third of the extruder 5 parts of aluminium powder PCU 5000 was fed via side feeder. The temperature inside the extruder is preferably hold below 120° C. After the extrusion the molten extrudate was cooled down, broken and then grinded down to a D50 of about 10 μm to 20 μm depending on the wanted effect.

The particle size of the pigments (D50 or average particle size) is depending on the desired effect and can be between 3 to 130 μm. The effect pigment concentration in the transparent masterbatch (toner A) can be between 1 w-% to 40 w-%, in particular between 2 w-% and 10 w-%.

The opaque and colored base toner B can be produced in a similar way than described for the effect toner A. In particular the base toner B includes additionally color pigments but no more effect pigments.

One example for that kind of toner B is given here:

830 parts CRYLCOAT® 4655-2, 63 parts Primid® XL-552, 9 parts Benzoin and 18 parts of CCA. For different colours (Cyan, Magenta, Yellow, Black and White) 32 parts of Heliogen Blue K7090 (BASF) for cyan, 32 parts of Cinquasia Violet L5120 (BASF) for magenta, 100 parts of Sicopal Yellow L1100 (BASF) for yellow, 32 parts of Printex 90 BEADS (Orion Engineered Carbons) for black or 190 parts of TI Select TS6200 (DuPont) for white were added.

After this both grinded toners A and B were mixed by dry blending in a ratio A/B=20/80 according to the weight.

Further General Remarks

A combination of the technological fields of non-impact printing and powder compositions is achieved by the herein disclosed subject matter and in particular by the claimed subject-matter. In this context it should be noted that common coating powder compositions as used for powder coating in industrial applications are not suitable for non-impact printing. It has been found that this is in particular due to the triboelectrical charging behavior of the commonly used powder compositions.

Therefore, it is an object of the claimed subject matter to advantageously combine both, the concept of non-impact printing as well as the concept of coating powders profiting from the advantages of both technical fields while at the same time avoiding the respective disadvantages.

It is a further advantage of the described technology, that thereby printing becomes possible on surfaces which are not susceptible to the common direct printing methods. An Example for such a surface is for instance a tin can for food conservation. Most cans are right circular cylinders with identical and parallel round tops and bottoms with vertical sides. However, where the small volume to be contained and/or the shape of the contents suggests it, the top and bottom may be rounded-corner rectangles or ovals. Even such surfaces as that of a tin can becomes available as possible printing targets of the presently described technology.

The aspects and embodiments defined above and further aspects and embodiments of the herein disclosed subject matter are apparent from the examples to be described hereinafter and are explained with reference to the drawings, but to which the invention is not limited. The aforementioned definitions and comments are in particular also valid for the following detailed description and vice versa.

DESCRIPTION OF EXEMPLARY EMBODIMENTS

Figure 1:
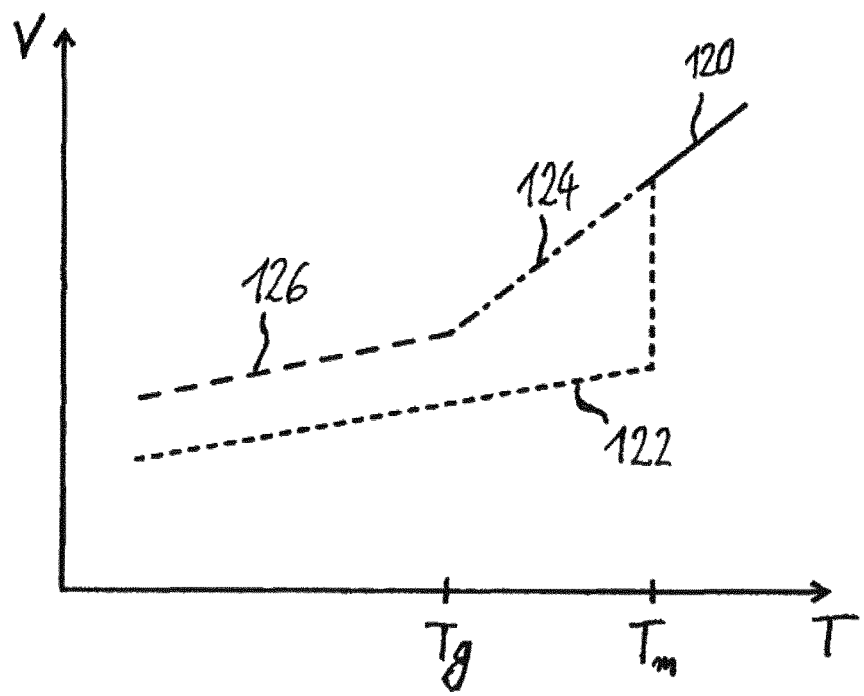
FIG. 1 schematically shows the behavior of a glass-forming material with regard to temperature.

The illustration in the drawings is schematic. It is noted that in different figures, similar or identical elements are provided with the same reference signs. Accordingly, the description of the similar or identical features is not repeated in the description of subsequent figures in order to avoid unnecessary repetitions. Rather, it should be understood that the description of these features in the preceding figures is also valid for the subsequent figures unless explicitly noted otherwise.

In the following, exemplary embodiments of the herein disclosed subject matter are described, any number and any combination of which may be realized in an implementation of aspects of the herein disclosed subject matter.

It is noted that as far as the embodiments and examples described below refer to a parameter range of a parameter (e.g. concentration, e.g. of a resin, temperature, etc.) which differ from parameter ranges specified above for the parameter, according to an embodiment any parameter range specified below shall be replaced by a parameter range specified above. In other words, any statement (e.g. regarding effect, relationship, advantage etc.) specified below for a particular parameter range of a parameter is also valid for a respective parameter range specified above for the parameter, and vice versa. The same is true for types of parameters. For example, statements given below regarding a first temperature are also valid for the first temperature range specified above.

NIP or digital printing is gaining importance as the printing market requests more and more flexibility. The future goal is to be able to provide a one piece printing at suitable prices which can only be fulfilled by digital printing. Toners for digital printing are well known. However, up to now no industrial digital printing solution is known which can be used to cover the needs of high quality printing together with a printing that can withstand the harsh environmental conditions of industrial applications. These conditions can include:

1) High weather resistance/high UV resistance
2) Resistance against abrasion
3) High chemical stability
4) Mechanical strength and/or flexibility
5) Adhesion to industrial substrates like metal (e.g. aluminum, steel, etc.), glass, ceramic, wood, MDF or plastics Known toner systems which can be cured by UV radiation might fulfill principally some of these requirements. However, for real industrial applications the curing of a printing only with radiation limits the potential applications dramatically based on the fact that big and complex substrates have to be printed and the accessibility of radiation is therefore limited, especially with the current designs of industrial furnaces in the market. The market requires a solution which can close this gap.

Embodiments of the herein disclosed subject matter are based on the idea that surprisingly it is possible to use compositions which are based on the chemistry used in powder coatings and therefor also in particular partially on conventional materials for powder coating so as to provide a coating material for NIP and/or that the processing of such compositions with a NIP method can be adapted so as to provide a curable coating layer to a substrate.

However, only a certain window of adjustment of viscosity and reactivity of heat curable coating materials is suitable to provide high quality printing. Out of this window the quality could be bad because with too low viscosity and/or too low reactivity the printed dots (sometimes referred to as printed spots) would undergo too much viscous flow and intermix to each other and with too high reactivity the adhesion to the substrate and/or the surface quality (no smooth surface) could be negatively affected.

In this regard, it is noted that according to an embodiment both, the viscosity as well as the reactivity are considered to achieve the desired results. For example, a lower viscosity may be acceptable (and may provide sufficient resolution of the printing) if the reactivity is sufficiently high such that on the timescale available for viscous flow the amount of flow is small enough so as to not adversely affect the quality (and in particular the resolution) of the printing.

By taking the interplay between viscosity and reactivity into account, surprisingly characteristic properties of conventional powder coatings can be achieved with coating layers generated by NIP, in some embodiments even if the layer thickness of the coating layer is smaller than the corresponding thickness of the conventional powder coating. Hence, the efficiency of coating may be improved (i.e. less coating material is necessary for achieving the same properties) while on the other hand a high resolution print is possible.

According to an embodiment, a coating material for generating a coating layer by NIP is provided, wherein the coating material comprises a curable resin.

The interplay between viscosity and reactivity may be taken into account by the different measures. For example, the coating material usually exhibits a minimum viscosity when being heated from room temperature up to a temperature where curing of the coating material occurs. This is due to the fact that upon increasing the temperature the viscosity is usually reduced if no additional processes occur. On the other hand, when curing sets in the viscosity increases, leading to a (local) minimum in the viscosity at a certain temperature. Hence, in this picture, for example a high reactivity of the coating material will shift the temperature at which the minimum viscosity occurs to a lower temperature and hence the viscosity value at the minimum viscosity will be higher (because the minimum is at lower temperature). Since the minimum viscosity also reflects the change of mechanical properties of the coating material with temperature as well as the curing dynamics, the minimum viscosity will usually depend on the heating rate.

The aforementioned concepts may be taken into account for defining a measure which allows to determine whether or not a coating material is suitable for the desired NIP (digital printing) of a coating layer generated from the coating material. According to an embodiment, a coating material is considered a suitable coating material if, with a heating rate of 5 Kelvin per minute (5 K/min), the minimum viscosity of a suitable coating material is in a range between 3 Pascal seconds to 10000 Pascal seconds. According to a further embodiment, with a heating rate of 5 Kelvin per minute the minimum viscosity is in a range between 50 Pascal seconds and 3000 Pascal seconds.

According to a further embodiment, a so-called a pill flow length test is used for determining as to whether a coating material is a suitable coating material. According to an embodiment, a pill flow length of a coating material is determined according to embodiments of the herein disclosed subject matter.

According to an embodiment, the pill flow length of the coating material is below 350 mm at a potential curing temperature which may be used to cure the coating material.

Surprisingly, it was found that a coating material which exhibits the above mentioned properties regarding minimum viscosity and/or pill flow length can withstand the needed requirements for many industrial applications and also the needs of high quality printing. According to an embodiment, the final curing of the coating layer may be performed thermally at the potential curing temperature (e.g. at 180°).

Coating materials according to the herein disclosed subject matter can be built up by many different resin systems. The preferred system contains at least 30 w-%, preferably at least 50 w-% and most preferably at least 75 w-% of an amorphous resin related to the overall amount of resin. Surprisingly it was found that with such values high quality printing can be achieved. A higher content of crystalline resins lead to printings which showed less resolution after heat curing. The used resin systems can be different depending on the special needs of the industrial applications. Potential resin systems (resin components) can be polyester, epoxy, urethanes, acrylics, fluorocarbon resins or combinations of two or more of these resin components. Some exemplary embodiments are given in the following paragraphs. However, for a person skilled in the art it might be easy to find additional suitable combinations based on the given principles.

The above mentioned resin systems can be modified by many different options. For example additives like flow additives or leveling agents can also influence the viscosity and a smooth surface. However, surprisingly it was found that the printing performance (in particular in respect to the printing quality) of the coating material was better when a low concentration or even no flow additive or leveling agent was added. A concentration less than 1 w-% of leveling agent/flow additive with regard to the entire coating material was used in some embodiments. According to another embodiment, less than 0.5 w-% and most preferably less than 0.1 w-% of the leveling agent/flow additive with regard to the entire coating material was used in some embodiments. According to an embodiment, a cured coating layer (generated from a coating material according to embodiments of the herein disclosed subject matter) comprises with respect to the entire amount of coating material of the coating layer less than 1 w-%, in particular less than 0.5 w-%, further in particular less than 0.4 w-%, less than 0.3 w-% and preferably less than 0.1 w-% of flow additive.

The addition of fillers like CaCO3, talc, clay, mica, kaolin or barium sulfate lead surprisingly to a loss of printing quality especially if, with regard to entire coating material, more than 1 w-%, or even more than 5 w-% or even more than 10 w-% of inorganic filler material was added. However, in this regard, according to an embodiment titanium oxide (titanium dioxide, TiO2) is not a filler but a pigment. In other words, fillers may be provided in an amount of less than 10 w-%, in particular less than 5 w-%, further in particular less than 1 w-% based on the overall amount of coating material, in accordance with an embodiment, despite the specified amount of filler, titanium oxide (titanium dioxide) may be included in a higher amount, e.g. according to embodiments disclosed herein. Further as mentioned herein, despite the specified amount of filler silicon dioxide and/or titanium dioxide may be used to improve the powder flow or charging properties of the coating material.

Surprisingly only a certain window of reactivity and viscosity, which may be determined according to embodiments of the herein disclosed subject matter, led to high resolution printing performances in NIP (digital printing). With compositions out of this window during heating up the likelihood of bad printing was very high. For example, bleeding effects occurred in which single printing spots (e.g. of different color) were mixing with each other during heating up, especially under industrial conditions were the printed substrates are hold vertical in a curing furnace. Further, outside the specified window of reactivity and viscosity, which may be determined according to embodiments of the herein disclosed subject matter, a loss of contours of the printed coating material layer appeared.

Usually for reactive high melting polyesters, esters of terephthalic acid (TPSA) are used, because they show a relatively narrow melting region due to their pronounced linearity (and therefore crystallinity), which furthermore correlates with the molecular weight. However, for coating materials according to the herein disclosed subject matter, i.e. coating materials with thermosetting properties, surprisingly it turned out that by turning away from the linear polyester and/or (semi)crystalline structure particular advantages in the processing can be achieved: broader softening region, higher minimum viscosity, cross-linking to elastic cured coating layers/coatings which though comply with the relevant tests for adhesion and resistance requirements (e.g. Erichsen test or methyl ethyl ketone test). This may in particular be achieved by using different monomers, in particular aliphatic components—if applicable also with sidechains, multi-functional monomers (for example trivalent organic carbon acids) or non-linear carbon acids as for example isophthalic acid (IPSA). Already at least 5% of IPSA instead of TPSA lead to a positive effect. Additionally, using IPSA leads to a higher weathering resistance of the cured coating layer. Polyester in which the TPSA has been replaced completely by IPSA show the best weathering resistance among the polyesters. The amount of IPSA and/or TPSA may be determined during manufacturing of the resin and in particular during polycondensation by using a mixture of both phthalic acids or by using a mixture of uniform polyesters in the desired ratio.

In particular for geometrically complex substrates according to an embodiment a coating is applied to a substrate by implementing the following method:

1) Printing (e.g. by digital printing) a coating material according to embodiments of the herein disclosed subject matter on a transfer element (e.g. a transfer sheet)

2) Applying the printed transfer sheet to the substrate and transfer the coating material (e.g. a coating layer formed therefrom) to the substrate 3) Final curing of the print on the substrate Between any two of the individual method steps 1, 2, and 3 a partial curing (for example via radiation) can be implemented.

According to an embodiment, formulations of a coating material according to the herein disclosed subject matter includes at least 30 w-%, for example at least 50 w-% and in particular at least 75 w-% of an amorphous resin with regard to the total amount of resin.

According to an embodiment, a coating material as described herein showed best printing performance when it was used as so called two components (2K) system. A 2K system is commonly used in electrophotographic printing. In a two components 2K—soft magnetic brush technology a soft carrier, in particular a ferrite core carrier, is used. Also other carriers known to persons skilled in the art are according to the invention. In particular the carrier surface can be between 500 and 1000 cm$^2$/g and the average particle size of the carrier between 20 to 150 µm with coatings made of different resins like silicone resin. Other embodiments work with a liquid carrier known in the art. According to still other embodiments the coating material as described herein is used as a monocomponent system (without carrier).

According to an embodiment, a printing unit according to the herein disclosed subject matter is a 2K printing unit. In this case the printing unit may include a carrier known in the art, e.g. a ferrite core carrier, e.g. in a developer of the (electrophotographic) printing unit.

According to a further embodiment, a coating material as described herein comprises a charge control agent (CCA) in a concentration of higher than 0.1 w-%, for example higher than 1 w-% and in particular higher than 2 w-% with regard to the overall coating material. It was found that such a concentration of a charge control agent may improve the quality of the printing.

Surprisingly it was found that the color density was better with a CCA concentration above 1 w-% with regard to the overall coating material formulation. So therefor in particular this threshold was used for high quality printings independently of the charging effects. Even more surprisingly it was found that not all CCA types lead to a coating material which fulfills the requirement of architectural applications concerning UV/weather stability. Surprisingly CCAs comprising or based on salicylic compounds showed high performance according to this aspect. Very good UV resistance was achieved when N-type (negative type) colorless CCAs, preferably zink salicylic comprising CCAs where used.

According to an embodiment the coating material has an absolute value of chargeability of at least 5 µC/g, preferably of at least 10 µC/g and most preferably of at least 20 µC/g and an activation time of 1 minute to 15 minutes, for example 2 minutes to 10 minutes tested in a standard (e.g. soft blow) Epping q/m equipment.

Surprisingly it was found that the charging could also be influenced by the addition of one or more of inorganic surface additives, preferably inorganic oxides of silicon and/or titanium, for example with a d50 particle size between 1 nanometer and 100 nanometer (e.g. d50=50 nanometer), in particular with a particle size between 5 nanometer and 70 nanometer. Further, it was surprisingly found that the addition of at least two inorganic oxide components with different average particle diameter may improve the charging performance. In this regard, if the two inorganic oxide components with different average particle diameter are made of the same material, these two inorganic oxide components may be considered equivalent to a single inorganic oxide component the particle size distribution of which comprises two distinct maxima. According to an embodiment, the two inorganic oxide components are both silicon oxide powder but with different average particle diameter. According to an embodiment, the silicon oxide is silica. In particular, according to an embodiment, a ratio of the average particle diameter of the two inorganic oxide components (e.g. silica) is between 2 to 10, for example between 5 to 7. According to a further embodiment, of the two inorganic oxide components a first inorganic oxide component is silicon oxide with a particle distribution d50=50 nm and a second inorganic oxide component is silicon oxide with a particle distribution of d50=8 nm.

According to a further embodiment, the coating material has an average particle diameter in a range between 1 μm and 25 μm, for example in between 5 μm and 20 μm with a particle size distribution of d10 in a range between 5 μm and 7 μm and/or of d50 in a range between 8 μm and 10 μm and/or a d90 in a range between 12 μm and 14 μm. Herein and as is generally known, a specific value for dx (in the above examples x=10, 50, 90) indicates that an amount x of the particles is smaller than the specified size. For example, d10=5 μm specifies that 10% of the particles are smaller or equal to 5 μm.

Preferably a sphericity of higher than 0.7, more preferably higher than 0.9 is given. Interestingly it was found that in case of lower sphericity and/or bigger particle sizes of the coating material a certain haptic effect occurred in the final printing and/or final cured printing layer which might be of an advantage for certain applications.

According to embodiments of the herein disclosed subject matter, a coating material may have a surprisingly high chemical resistance compared to the state of the art. The chemical resistance can be influenced by many different aspects. Especially the type of resin (e.g. acrylic, polyester, etc.) and also the amount of functional groups have shown to have a huge influence on the chemical stability. Principially it was found that the higher the crosslinking density of the cured system was the higher the chemical stability was given. Also it was found that acrylic and/or epoxy based coatings have given high chemical stability. One embodiment is characterized by the fact that at least one type of crosslinking agent is chosen in an amount suitable that the coating material is able to reach a rating of at least 2-3 in the Methylethylketone-test after 10 s according to the DIN EN 12720. For this crosslinking material can be chosen from epoxy/glycidyl-group-containing materials, including epoxy-resins, hydroxyalkylamide hardeners, isocyanate hardener and/or double bond containing compounds with a thermal radical initiator system. For this the curing agent is added in an amount between 0.3 to 1.7, preferably 0.7 to 1.3 and most preferably 0.9 to 1.1 of the molar ratio sufficient to cure the at least one type of resin.

In another embodiment of the herein disclosed subject matter the resulting coating resists at least 50 IPA (Isopropyl alcohol) double rubs and/or at least 5 acetone double rubs, in particular at least 10, in particular at least 20.

The low thickness of the coating layer which is sufficient to achieve results comparable to conventional powder coatings is surprising in particular because for powder coatings usually much higher thicknesses are necessary (e.g. GSB norm for architectural applications with a minimum thickness of 50 μm, EN 12206-1:2004 (D): a mean layer thickness must be at least 50 μm. No value below 40 μm is allowed, materials to be coded-coatings on aluminum and aluminum alloys for constructional purposes part one: coatings made of coating powders).

According to an embodiment, the coating is applied in more than one coating layer and the coating material comprises a curable resin and wherein during each pass of the printing process the resin is at least partially subjected to viscous flow. This may improve the properties of the resulting coating. If during each pass of the printing process the applied layer is subjected to partial curing, also cross-linking with the previous layer may occur at this stage, i.e. before final curing of the coating (the layer package comprising at least two coating layers).

Also surprising was the fact that for the most industrial applications coatings with sufficient resolution can already be achieved with a ratio of the average particle diameter over the thickness of the coating layer of 1:2.

Further, it was found that the coating material with a suitable amount of curing agent and/or initiator for the cross-linking of the binder, can provide that the coating material according to ÖNORM EN 12720 satisfied class IB after 10 seconds of acetone influence.

The coating material was found to be capable to be used as corrosion protection, preferably if the thickness of the coating is at least 30 μm, e.g. by two coating layers, in particular if the (two or more) coating layers are (at least partially) individually cured. If a first coating layer comprises a pinhole but is at least partially cured before a second coating layer is applied on the first coating layer it is unlikely that the second coating layer comprises a pinhole at the exactly same location. Hence, the formation of pinholes in the final coating is avoided or at least reduced.

According to an embodiment, the coating material is configured for being applied with a thickness of at least 20 μm, in particular with a thickness of at least 30 μm, further in particular with a thickness of at least 40 μm.

According to a further embodiment, a ratio of the average particle diameter to a thickness of the coating layer is smaller than 1:2, in particular smaller than 1:3, further in particular smaller than 1:4.

According to an embodiment, the coating material comprises a polyester resin, and wherein the coating material is in particular bisphenol A free and/or epoxy free or at least BPA was not intentionally added as raw material.

According to a further embodiment, the polyester resin comprises an (incorporated) acid monomer and wherein at least 25 w-% of the acid monomer is isophthalic acid, in particular at least 50 w-% of the acid monomer is isophthalic acid; and further in particular at least 85 w-% of the acid monomer is isophthalic acid.

According to an embodiment, a minimum glass transition temperature of the coating material (e.g. a glass transition temperature of the uncured coating material) is below 80° C., in particular below 60° C.

According to an embodiment, the remaining gloss after 300 hours of UV exposure, determined according to ISO 2813, is at least 50% for the cured coating. A remaining gloss after 600 hours of UV exposure according to the test procedure of GSB international AL631-PartVII-segment 20.1 Kurzbewitterung UV-B (313) is at least 50%, in particular at least 85%; a remaining gloss after 1000 hours of Xenon exposure according to EN ISO 16474-2 determined according to ISO 2813, is at least 50%, in particular at least 85%.

According to an embodiment, the coating material is configured to, besides forming a part of a coating layer representing an image comprising one or more different colors, in particular at least two different colors, serve in addition at least one of the following functions: ceiling, high-temperature resistance, weathering resistance, long-term ultraviolet stability, wearing coat, being free from pinholes, wear based bleaching protection, outdoor capability, scratch resistance, resistance to solvents, diffusion reduction function. It is noted that according to an embodiment any optically distinguishable contrast is considered as being formed from two different colors (e.g. even parts of a coating layer formed from a coating material of a same color but where the parts comprise a different surface structure).

According to a further embodiment, the coating material comprises an amount of 0.1 w-% to 10 w-% of a charge control agent, wherein the charge control agent in particular comprises or consists of one or more salicylic acid zinc compounds (zinc salicylic compounds). According to a further embodiment, the coating material comprises an amount of 0.2 w-% to 5 w-% of a charge control agent or, in another embodiment, an amount of 0.5 w-% to 3 w-%.

According to an embodiment, the coating layer is applied to a target surface. Herein, a target surface is a desired surface on to which the coating layer is to be applied. The target surface may be formed e.g. by a transfer element if the printing method uses a transfer element. According to another embodiment, the target surface may be formed by the substrate, in case of a direct printing method.

According to a further embodiment, the coating material is a powdery coating material. Further, while some embodiments of the herein disclosed subject matter refer to a powdery coating material, it should be understood that the use of a liquid (e.g. as a transfer medium in which the powdery coating material is dispersed, or as a solvent in which the coating material is dissolved) is also contemplated. However, since after evaporation of the liquid the coating material remains as the coating layer on the desired surface, using a liquid in combination with a coating material according to embodiments of the herein disclosed subject matter is easily applied and taken into account by a skilled person.

According to a further embodiment, the coating material is thermally curable, in particular at least partially thermally curable. Thermally curing provides an efficient method, in particular for curing a large number of substrates having the coating layer thereon. Furthermore thermally curing offers a wide range of powder coating chemistry which is known to fulfill industrial needs which current toner technologies cannot provide. According to an embodiment, when applied to the substrate the coating layer according to embodiments of the herein disclosed subject matter is finally cured. It should be understood that finally curing does not mean that there is not any residual uncured material in the finally cured coating layer. Rather, final curing relates to curing to a degree that is necessary to achieve the desired properties of the thus cured coating layer.

According to an embodiment, a coating layer application device comprises: a transfer element support for supporting a transfer element according to the fourth aspect; a substrate support for receiving a substrate onto which the coating layer shall be applied, wherein the transfer element support and that the substrate support are operable to bring the coating layer on the transfer element in contact with the substrate in order to apply the coating layer to the substrate; a heating device being configured for heating the coating layer on the transfer element; and a control device configured for controlling the heating device so as to (i) maintain the temperature of the coating layer below a first temperature before removal of the transfer element from the coating layer, wherein at the first temperature the uncured coating material is in its supercooled liquid state or in its glassy state; and/or (ii) partially cure the coating layer during the contact of the coating layer and the substrate and before removal of the transfer element from the coating layer, in particular by increasing the temperature of the coating layer to a temperature at or above a curing temperature of the coating layer.

According to an embodiment, the curing temperature is equal or higher than the start temperature of the curing reaction determined according to ISO 12013-1:2012 Paints and varnishes—Determination of curing characteristics using a free damped oscillation method—Part 1: Start temperature of the curing reaction. According to a further embodiment, the curing temperature of the coating material is higher or equal to a temperature at which after maximal 60 minutes no more heat is generated and/or consumed by the coating material and/or the Tg of the cured coating after maximal 60 min at a certain temperature is changing not more than 5° C., in particular not more than 3° C. in a DSC measurement when measured first time during the first heating up and measured a second time during a second heating up with 20 K/min and between the first and second heating up the coating was hold for 15 min at a temperature well above—at least 10° C. above—the curing temperature. According to a further embodiment, the curing temperature of the coating material is equal or higher than a temperature at which after 60 minutes no more heat is generated and/or consumed by the coating material.

The lowest temperature among the curing temperatures determined by the methods disclosed herein may be considered as a lowest possible curing temperature. In order to achieve time-efficient coating processes, an actually chosen curing temperature may be higher than the lowest possible curing temperature or higher than a curing temperature determined by the methods disclosed herein.

According to an embodiment, the method further comprises: providing a transfer element according to one or more embodiments thereof; bringing into contact the coating layer on the transfer element and the substrate in order to apply the coating layer to the substrate; controlling a temperature of the coating layer on the transfer element so as to (i) maintain the temperature of the coating layer below a first temperature before removal of the transfer element from the coating layer, wherein at the first temperature the uncured coating material is in its supercooled liquid state or in its glassy state; and/or (ii) partially cure the coating layer during the contact of the coating layer and the substrate and before removal of the transfer element, in particular by increasing the temperature of the coating layer to a temperature at or above a curing temperature of the coating layer.

According to an embodiment, the coating layer is transferable to a substrate and comprises a polyester resin, wherein the polyester resin is in particular bisphenol-A free and/or epoxy free (or the respective amount is at least below 1 w-%, in particular below 0.1 w-%) and/or a thermosetting resin.

According to an embodiment, the coating layer (in particular the cured coating layer) comprises a charge control agent.

According to an embodiment, the printing device comprises: a printing unit being configured for applying the coating material to a transfer element; and an energy transfer device being configured for transferring energy to the coating material on the transfer element; wherein in particular the energy transfer device is configured for transferring the energy to the coating layer so as to partially cure the coating layer on the transfer element and/or to induce viscous flow in the coating layer on the transfer element.

According to a further embodiment, instead of printing on a transfer element, the printing device is configured for printing directly on a substrate to be coated.

Regarding processing of the coating layer, it was found that it is advantageous to avoid for the coating layer as far as possible a temperature range between a melt temperature and a curing temperature of the coating layer before removal of the transfer element from the coating layer, if such a melt temperature exists (i.e. if the coating layer contains a material portion which exhibits a melt temperature). In other words, embodiments of the herein disclosed subject matter are based on the idea that it is advantageous to (i) maintain the temperature of the coating layer below a first temperature before removal of the transfer element from the coating layer, wherein at the first temperature the uncured coating material is in its supercooled liquid state or in its glassy state, and/or (ii) partially cure the coating layer during the contact of the coating layer and the substrate and before removal of the transfer element from the coating layer, in particular by increasing the temperature of the coating layer to a temperature at or above a curing temperature of the coating layer. As described in more detail below, the supercooled liquid state is above the glass transition temperature Tg and below the melt temperature Tm, if such a melting temperature is existing.

In curable polymers, usually the glass transition temperature raises with time and curing degree. Therefore, if at the first temperature the uncured coating material is in its supercooled liquid state or in its glassy state, this implies that at the first temperature also the coating layer as received with the transfer element in the transfer element support is in its supercooled liquid state or in its glassy state.

According to an embodiment, the coating layer comprises a crystalline phase or can be at least partially brought into the crystalline phase, wherein the crystalline phase defines a melt temperature and the first temperature is below the melt temperature.

According to a further embodiment, the coating layer application device further comprises a printing device being configured for applying the coating material to the transfer element by printing to thereby form the coating layer.

According to an embodiment, the printing device is a NIP device or a digital print device. NIP or digital printing may use one or more of electric fields (e.g. electrographic methods), magnetic fields (e.g. magnetic graphic methods), ions (e.g. ionographic methods), inkjets (inkjet methods), thermographic methods and photographic methods for generating an image made from coating material on a transfer element.

According to an embodiment, the printing device for generating the coating layer on the transfer element is a separate device and may be geographically separated from the coating layer application device which applies the coating layer to the substrate. Accordingly, the transfer element with the coating layer thereon may be removable from the printing device, e.g. for shipment, storage, etc. According to an embodiment, one or more transfer elements are being provided. Further, it is noted that two or more transfer elements may be provided, e.g. two transfer elements wherein the printing device is configured for printing on a first transfer element and wherein the printing device is configured for transferring the coating layer from the first transfer element (e.g. an intermediate transfer element) to the second transfer element. In such a case, it is the second transfer element (or generally the last transfer element) with the coating layer thereon that is transferred to the coating layer application device (which may be a standalone coating layer application device, e.g. a coating layer application device which is configured for solely applying the coating layer to the substrate).

According to a further embodiment, the printing unit (or printing device) comprises a single, removable transfer element. Further it is noted that the removable transfer element may also be referred to (and is herein also referred to) as a standalone transfer element, and vice versa.

Accordingly, in an embodiment the transfer element having the coating layer thereon (e.g. the single transfer element or the second transfer element) is a separate part and the transfer element support is configured for receiving the transfer element having the coating layer thereon as a separate part.

According to an embodiment, the coating material is a powdery coating material. This may provide the advantage that experience and understanding of properties of conventional powder coatings may be used for and/or transferred to a coating material according to embodiments of the herein disclosed subject matter.

According to an embodiment, the printing device is configured for applying the coating material to the transfer element with a thickness of (i.e. the coating layer has a thickness of) at least 10 µm, in particular with a thickness of at least 20 µm, for example with a thickness of at least 40 µm. While in many known applications for toner a smallest as possible thickness is desirable to safe material costs as there is no technical need for higher coating thicknesses, embodiments of the herein disclosed subject matter may provide for even thicker coating layers.

According to an embodiment, the printing device is configured for applying the coating material as an image comprising one or more different colors, in particular at least two different colors, to the transfer element. According to an embodiment, the coating layer may comprise a single color or two or more different colors (coating materials).

According to an embodiment, the image extends entirely through the coating layer in a direction perpendicular the coating layer. In this regard it is noted that if the coating on the transfer element includes two or more layers, the image does not necessarily extend also through the other layers, although this is the case in an embodiment.

According to a further embodiment, the printing device is configured for applying the image of the coating material to the transfer element with a resolution of more than 2 l/mm, in particular with a resolution of more than 5 l/mm, e.g. with a resolution of more than 10 l/mm. Generally herein, the term "resolution" refers to a lateral resolution in the plane of the coating layer unless indicated otherwise. Numerous embodiments of the herein disclosed subject matter may assist in achieving the desired resolution, as is described in detail below.

According to an embodiment, the coating layer application device (or the printing device) further comprises an energy transfer device being configured for transferring energy, in particular heat, into the coating material on the transfer element before the contact of the coating layer and the substrate. According to a further embodiment, the energy transfer device is configured for transferring the energy to the coating layer so as to partially cure the coating layer on the transfer element. According to another embodiment, the energy transfer device is configured for transferring energy to the coating layer so as to initiate viscous flow in the coating layer.

According to an embodiment, the coating layer is compacted by a compaction device configured for compacting the coating layer on the transfer element (e.g. the standalone transfer element) before the contact of the coating layer and the substrate. According to an embodiment, the compaction device is configured (e.g. located) so as to compact the coating layer before, during or after the energy transfer by the energy transfer device. According to an embodiment, the coating layer application device is configured for applying to the coating layer a pressure, in particular a pressure of more than 0.1 bar, in particular more than 1 bar, in particular more than 3 bar, in particular more than 5 bar and further in particular more than 10 bar.

According to a further embodiment, the coating layer application device (or the printing device) further comprises a compaction device configured for compacting the coating layer on the transfer element before the contact of the coating layer and the substrate, e.g. a compaction device configured as described herein.

According to an embodiment, the printing device comprises one or more printing units, e.g. a single printing unit. According to an embodiment, the printing device comprises two or more printing units. According to a further embodiment, the two or more printing units are configured for applying two or more different coating materials (e.g. coating materials of different color) to the transfer element to thereby form the coating layer (e.g. a two or more color coating layer, in particular a coating layer representing an image) on the transfer element. According to a further embodiment, the two or more printing units are configured for applying the same coating material to the transfer element to thereby form the coating layer on the transfer element (with a larger thickness).

According to an embodiment, the printing device provides a transfer element, in particular a standalone transfer element, comprising a coating layer, the coating layer being formed from a coating material, the coating layer being curable and comprising an amorphous material, wherein the coating layer is transferable to a substrate and comprises a polyester resin, wherein the polyester resin is in particular bisphenol-A free and/or epoxy free and/or is a thermosetting resin. According to a further embodiment, the coating material and hence the cured coating layer comprises a charge control agent.

According to a further embodiment, there is provided a method of operating a coating layer application device comprising a transfer element support, a substrate support, and a heating device, the method comprising: receiving by the transfer element support a transfer element comprising a coating layer, the coating layer being formed from a coating material, the coating layer being curable and comprising an amorphous material; receiving by the substrate support a substrate onto which the coating layer shall be transferred, wherein the transfer element support and the substrate support are operable to bring the coating layer on the transfer element in contact with the substrate in order to apply the coating layer to the substrate; operating the heating device so as to (i) maintain the temperature of the coating layer below a first temperature before removal of the transfer element from the coating layer, wherein at the first temperature the uncured coating material is in its supercooled liquid state or in its glassy state; and/or (ii) to partially cure the coating layer during the contact of the coating layer and the substrate before removal of the transfer element from the coating layer, in particular by increasing the temperature of the coating layer to a temperature above the curing temperature. It is noted that by increasing the temperature of the coating layer to a temperature above the curing temperature usually leaves the temperature range in which the uncured coating material is in its supercooled liquid state or in its glassy state. Hence, in this case the "or" of the "and/or" combination of features (i) and (ii) applies.

According to an embodiment, the transfer element support and the substrate support are operable to bring the coating layer on the transfer element in contact with the substrate and apply the coating layer to the substrate with a pressure, in particular a pressure of more than 0.1 bar, in particular more than 1 bar, in particular more than 3 bar, in particular more than 5 bar and further in particular more than 10 bar, e.g. with a pressure in a range between 3 bar and 10 bar, e.g. between 5 bar and 8 bar.

It is further noted that according to an embodiment of one of the aspects mentioned herein, the respective entity (device, method, etc.) is adapted for providing the functionality or features of one or more of the herein disclosed embodiments and/or for providing the functionality or features as required by one or more of the herein disclosed embodiments, in particular of the embodiments of the other aspects disclosed herein.

The control device may be implemented by at least one of mechanics, hardware and software. For example, the control device may comprise the processor device and the computer program product according to embodiments of the herein disclosed subject matter, e.g. a memory for storing the program element.

As used herein, reference to a computer program product is intended to be equivalent to a reference to a computer program and/or a computer readable medium containing a program element as described herein, in particular for controlling a processor device to effect and/or coordinate the performance of a method as described herein. According to an embodiment, the processor device is a network node and/or a computer comprising a memory and at least one processor for carrying out instructions defined by the program element.

The computer program may be implemented as computer readable instruction code by use of any suitable programming language, such as, for example, JAVA, C++, C #, etc., and may be stored on a computer-readable medium (removable disk, volatile or non-volatile memory, embedded memory/processor, etc.). The instruction code is operable to program a computer or any other programmable device to carry out the intended functions. The computer program (as well as any data) may be available from a network, such as the World Wide Web, from which it may be downloaded.

Any suitable aspect or embodiment of the herein disclosed subject matter may be realized by means of a computer program respectively software. However, the herein disclosed subject matter may also be realized by means of one or more specific electronic circuits respectively hardware. Furthermore, the herein disclosed subject matter may also be realized in a hybrid form, i.e. in a combination of software modules and hardware modules.

In the above there have been described and in the following there will be described exemplary embodiments of the subject matter disclosed herein with reference to a coating layer application device, a method, a computer program product, a printing device, a transfer element and a substrate. It has to be pointed out that of course any combination of features relating to different aspects of the herein disclosed subject matter is also possible. In particular, some features have been or will be described with reference to device type embodiments (e.g. relating to a coating layer application device, a printing device, or a control device thereof) whereas other features have been or will be described with reference to method type embodiments (e.g. relating to a method or a computer program product). However, a person skilled in the art will gather from the above and the following description that, unless otherwise notified, in addition to any combination of features belonging to one aspect also any combination of features relating to different aspects or embodiments, for example even combinations of features of device type embodiments and features of the method type embodiments are considered to be disclosed with this application. In this regard, it should be understood that any method feature derivable from a corresponding explicitly disclosed device feature should be based on the respective function of the device feature and should not be considered as being limited to device specific elements disclosed in conjunction with the device feature. Further, it should be understood that any device feature derivable from a corresponding explicitly disclosed method feature can be realized based on the respective function described in the method with any suitable device disclosed herein or known in the art.

Embodiments of the herein disclosed subject matter are based on the idea that with suitable adaptions printing principles known from NIP, such as image print, laser print, etc. can be used to apply a coating material which has properties of typical powder coating materials to a substrate. To this end, it may be necessary to form a coating layer of the coating material with a suitable thickness which is usually higher than conventional toner thicknesses used in laser printing (e.g. 5 µm to 10 µm). Even more, while in a conventional digital printing technologies high efforts are made to reduce the toner thickness in order to reduce costs, for the intended applications of the herein disclosed subject matter it is advantageous to have higher thicknesses, for example above 10 µm.

According to an embodiment, the coating material comprises an amorphous material the properties of which are used to achieve the desired coating layer.

In one example, NIP based transfer systems are used to realize aspects and embodiments of the herein disclosed subject matter. According to a further example, a NIP based transfer method is used to provide the coating layer entirely colored throughout its layer thickness. According to a further example, a NIP based transfer method is used to provide the coating layer with a high resolution throughout its layer thickness.

Known NIP systems are often large or located in a central infrastructure to provide a direct print onto a desired material. Further, the geometries for direct print are limited regarding printing width, unevenness of the desired material, or capability of printing on 3D parts. Conventional powder coating systems, which usually operate with spray guns from which the powder is provided by means of pressurized gas. After application of the powder on the desired material (also referred to as substrate) the powder is heated so as to transform into a continuous layer. Coating materials of conventional powder coating technologies are not suitable for (direct or indirect) NIP, in particular NIP based transfer systems because the size of the powder particles is too big for NIP based methods, especially when high resolution printing is desired.

However, surprisingly chemically curable coating materials with a particle size distribution (PSD) that is suitable for a NIP system (e.g. mean size of approximately 9 µm and a spread of a Gaussian distribution of particle sizes of 5 µm to 16 µm) are suitable for providing thick coating layers via a NIP method. According to other embodiments, the mean size of the particle size distribution of the curable coating material is in a range between 5 µm and 15 µm. The PSD according to embodiments of the herein disclosed subject matter facilitates an application of a thinner coating layer (e.g. with a thickness in a range between 15 µm and 50 µm (compared to conventional powder coatings having a typical thickness between 30 µm to 200 µm) which may still have the same chemical and physical properties as conventional powder coatings. Without being bound to theory, the reason is thought to be the uniformity of the powder particles, the small particle size distribution when compared to conventional powder coatings and the lack of fillers and additives. In this regard, it is again noted that a thickness in a range between 15 µm and 50 µm is exceptionally thick compared to conventional toners of conventional NIP systems (which are applied in a thickness of typicality 2 µm to 10 µm).

For coatings generally the following principles apply: the thinner the coating the better are its mechanical properties, the thicker the coating the better are the chemical properties, the aberration behavior and the ultraviolet (UV) stability. Further, scratch force exerted with a pointed object has to be the higher, the thicker the coating layer is in order to penetrate the coating entirely down to the substrate. Hence, scratch resistance is improved by thicker coatings.

Transfer systems may have the problem of the insufficient adherence of the coating material on the substrate or too high adherence of the coating material on transfer elements (resulting in difficulties in the removal of the coating material from transfer element). A crystalline material usually has a small transition region between solid and liquid state. This may result in a small thermal process window for good adherence of the coating layer on the substrate and the removal of the transfer element without adversely affecting the coating layer.

The lateral resolution achieved in the application of the coating material is often an essential quality feature of the transfer process in which the coating material is transferred by the transfer element from a printing device to the substrate. Hence, a high amount of crystalline material may reduce the achievable resolution due to the small transition region between solid and liquid state.

For a coating layer which is an image comprising at least one or more different colors, in particular more than two different colors, it is advantageous to have the coating layer entirely colored throughout its layer thickness, in particular regarding ablation and/or bleaching of coating material due to environmental impact (e.g. wind, sand, rain, solar radiation). In this regard, it is also advantageous to have a similar resolution of the image throughout the layer thickness of the coating layer.

Further, it is advantageous to prevent cracks or openings in in the coating layer on the substrate (e.g. allgae may grow in cracks in an outdoor application, in particular visible in transparent protection coating layers). Especially this is very critical when the coating additionally fulfills corrosion protection aspects which can be achieved by curable, especially heat curable coatings which comprise at least a curable resin together with at least one curing agent, according to the invention.

Further, in many applications a glossy surface is desirable. According to an embodiment, the coating material is configured for providing a glossy surface.

In an embodiment also very low gloss levels below 35, in particular below 30, in particular below 20 and even in particular below 10 measured at a specular angle of 60 degrees according to ISO 2813 can be reached. One solution for this is the use of at least two different resin systems in a coating material which provides different viscosities and/or different reactivities during curing, in particular by different amount of functional groups in the resins.

The above mentioned advantages may be supported or achieved by providing the coating layer with a suitable thickness, e.g. with a thickness of at least 5 μm, at least 10 μm, at least 20 μm, at least 30 μm or at least 40 μm.

By the use of coating material according to embodiments of the herein disclosed subject matter various advantages may be achieved in particular by suitable processing of the coating material as described herein. For example, according to an embodiment the coating material comprises a resin and the resin comprises an amorphous resin component in an essential amount, for example in an amount of at least 35% at least 50%, at least 60%, at least 70% or at least 80%. The percentages in this case are referring to the amount of amorphous resins in the overall resin composition of the coating material independently of the other ingredients. Purely amorphous resin is also possible.

In achieving various advantages mentioned herein, the temperature spread of the flow properties of the amorphous material in the coating material is helpful and may be advantageously combined with suitable process windows as disclosed herein. In this regard, relevant process parameters may be absolute temperature, temperature change cycles, the product of temperature and exposure in time, temperature change rate, pressure, force impact (e.g. mechanical and/or magnetic forces), radiation (e.g. ultraviolet radiation), surface adherence control (mechanical design, contact angle, contact angle depending on temperature), etc.

Using a coating material which comprises an amorphous material and avoiding as far as possible a temperature window between a melt temperature of the coating material (if such a melt temperature occurs under the process conditions) and the curing temperature is advantageous in achieving or supporting the above mentioned advantages, in particular with the higher amounts of crystalline resins, in particular above 10 w-%. In particular, by avoiding this temperature window a high lateral resolution can be achieved. Further, running of different dyes into each other may be avoided. Further, a high edge steepness can be achieved which provides for no or minimal change of an image of the coating layer upon abrasion of the coating layer.

As is commonly known and generally herein, the supercooled liquid range is considered as a temperature range between the glass transition temperature and the equilibrium melting/crystallization temperature. However, compared to crystallization in simple, small molecules, polymer crystallization occurs even further away from the thermodynamic equilibrium. However, the crystalline state is not always reachable, depending on the material (e.g. the chain structure of a polymer). Below the equilibrium melting temperature, the Gibbs free energy of the isotropic liquid is always higher than that of the crystalline solid. Therefore the supercooled liquid is, by definition, thermodynamically metastable. (Stephen Z. D. Cheng, "phase transitions in polymers, the role of metastable states", Elsvier, 2008, page 78, 1.1). The timescale on which crystallization occurs is known to depend on a number of factors which are not discussed here.

FIG. 1 shows schematically the behavior of a glass-forming material in particular regarding an extensive property such as volume or free enthalpy (see for example: S. R. Elliot, "Physics of amorphous materials", Longman Scientific & Technical, $2^{nd}$ edition, 1990). Exemplarily, in FIG. 1 the volume V of the material is plotted over the temperature T.

Starting at a temperature above the melt temperature Tm, in the liquid phase and cooling down, the volume changes according to its coefficient of thermal expansion of a liquid state 120. At the melt temperature Tm in thermodynamic equilibrium the material crystallizes forming a crystalline state 122. If crystallization does not occur, the material is supercooled into a supercooled liquid state 124. The transition from the liquid state 120 into the supercooled liquid state 124 is smooth and no phase transition (or sharp change in volume) occurs at the melting temperature Tm. For example, the coefficient of thermal expansion (the slope of the curve shown in FIG. 1) in the liquid state 120 and the supercooled liquid state 124 is similar. Upon further cooling, at a temperature, which is referred to as the glass transition temperature Tg, the coefficient of thermal expansion changes to a value which is comparable to the thermal expansion of the crystalline state 122. Hence, although below the glass transition temperature Tg the material still exhibits an amorphous (disordered) structure its properties are similar to a solid. Usually the state 126 below the glass transition temperature is referred to as glassy state (or vitreous state). It should be understood that FIG. 1 and the above explanation is provided for describing some principle aspects of amorphous materials while in some materials, in particular in curable resins one or more of the above mentioned states, in particular the liquid state 120, may not be reachable because curing may set in at lower temperatures.

Generally herein, unless stated otherwise, a melting temperature or crystallization temperature refers to the equilibrium melting/crystallization temperature. While this temperature may be difficult to measure directly, the equilibrium melting/crystallization temperature may also be determined by extrapolation, as is known in the art.

Further, it is well known that a glass transition temperature of an amorphous material and in particular of an amorphous thermosetting polymer depends on the degree of cure (often denoted as "alpha", α), and on the method used for the measurement of the glass transition temperature. According to an embodiment, the glass transition temperature referred to in this document is the onset point of the glass transition measured with a heating rate of 20 K per minutes in a DSC experiment. In another embodiment, the glass transition temperature referred to in this document is the inflection point of the glass transition measured with a heating rate of 20 K per minutes in a DSC experiment. Generally herein, a material is considered an amorphous material if the material is amorphous in the coating material, i.e. in the powder before it is applied on the transfer element.

In order to facilitate understanding of the behavior of amorphous material and in particular of an amorphous thermosetting polymer, time temperature transformation diagrams (TTT diagrams) have been introduced (see e.g. John K Gillham, Polymer Engineering and Science, 1986, volume 26, number 20, pages 1429 to 1433, in particular page 1430).

Figure 2:
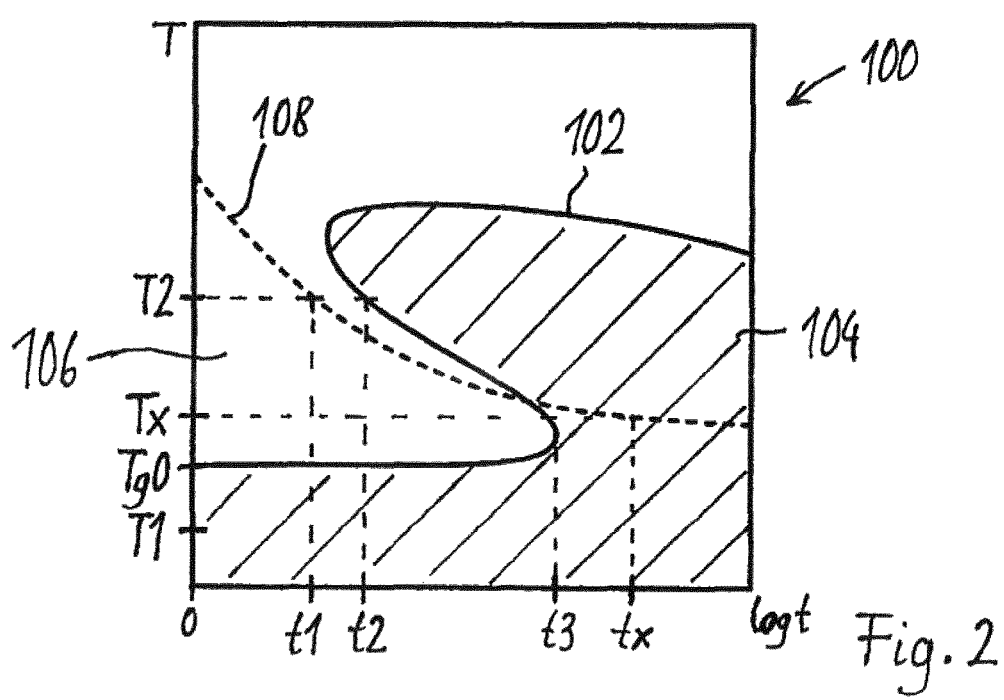
FIG. 2 schematically shows a simplified TTT diagram 100 indicating the transformation of a thermosetting polymeric material.

FIG. 2 schematically shows a simplified TTT diagram 100 indicating the transformation of a thermosetting polymeric material with respect to temperature T and the logarithm of time t. In the TTT diagram 100 a first line 102 indicates the transformation from a vitreous or a glassy state 104 (hatched area) to a supercooled liquid state 106 (unhatched area) or vice versa. Accordingly, the first line 102 indicates the glass transition. Further indicated in the TTT diagram 100 is a gelation line 108 which indicates the transformation from the supercooled liquid state 106 into a gelled state above the gelation line 108. As is known, the ability of a polymer to flow essentially stops at the gelation line 108.

At the time t=0 the first line 102 indicates the glass transition temperature for the uncured polymer which is often referred to as Tg0. As can be seen from the TTT diagram 100, maintaining the polymer at a temperature T1 (this would correspond to a horizontal line in the diagram 100, not shown) does not result in a transformation. Maintaining the system at a higher temperature T2 would result in gelation of the polymer at a time t1 and would result in vitrification of the polymer (i.e. transition into the glassy state, in particular into a gelled glass) at a time t2.

As can be taken from the TTT diagram 100, after maintaining the temperature below Tg0 for a processing time tx>t3, the formation of the supercooled liquid is avoided but an increase of the temperature (even up to the curing temperature, not shown in FIG. 2) does not result in a transition into the supercooled liquid state but rather in gelation of the polymer at a temperature Tx. In other words, by suitable processing of the thermosetting polymer gelation (and hence curing) can be achieved even by avoiding the supercooled liquid state. However, in order to increase the speed of the process, usually a temperature in the supercooled liquid state would be preferred.

Operation in the supercooled liquid or in the glassy state (i.e. avoiding of the liquid state above the melt temperature) can effectively prevent the lateral flow of the material of the coating layer in the plane of the coating layer (such flow can give rise to blurring laterally defined edges (e.g. if the coating layer includes characters or other fine structures) or in merging of different adjacent colors (running of different colors into each other) in the coating layer. This undesired flow of the material of the coating layer may be less of a problem for horizontally oriented substrates but may be more pronounced for vertically oriented substrates since in this case gravity is acting on the material in the plane of the coating layer.

If the liquid state above the melt temperature is not avoided, this may result in the formation of undesired drops in the coating layer, in particular if the curing temperature is not reached fast enough, which again rises the viscosity.

Since the coating layer on the transfer element usually cannot be hardened so as to be dimensionally stable during the transfer, it is advantageous if the transfer element has a high lateral stability (i.e. if it does not undergo plastic deformation and has a relatively high elastic modulus in the lateral direction (i.e. in the plane parallel to the coating layer). Further, it is helpful if the transfer element is peelable from the coating layer after the coating layer has been attached to the substrate. For example, according to an embodiment the transfer element is flexible perpendicular to its main surface on which the coating layer is deposited. For example, this may be achieved by cross laminated foils which are longitudinally stable in one direction such that by cross lamination (lamination of individual foils onto each other wherein the foils are oriented transverse (e.g. perpendicular) to each other) a high stretch resistance in both coordinate directions is achieved. In this regard, a sufficient lateral stability may be achieved with a rather thin foil. A thin foil on the other hand provides for good flexibility which facilitates the peel off of the thin foil (transfer element). However, according to other embodiments any suitable transfer element may be used, such as a transfer foil, a transfer belt, a transfer plate, etc.

According to an embodiment, the transfer element is transported by a transport device which may include a transfer belt carrying the transfer element. In direct printing embodiments, the transfer element is replaced by the substrate to be coated.

Using a transfer element may be advantageous compared to direct printing because it allows a partial curing of the coating material on the transfer element. The partial curing of the coating material on the transfer element (before it is brought in contact with the substrate) is also referred to as pre-curing herein. The pre-curing may provide easier accessible processing windows and may increase the quality of the fully cured coating layer. Also regarding the pre-curing amorphous materials have advantages compared to crystalline materials since crystalline materials may have smaller processing windows. By using a coating material which is a combination of crystalline material and amorphous material (e.g. a crystalline resin and an amorphous resin) or by using a coating material the resin of which is purely amorphous it is possible to configure the coating material in various ways by one or more of the parameters time, pressure and heat. It is noted that according to an embodiment also a coating layer on a substrate (e.g. applied by direct printing onto the substrate) may be subjected to partial curing as described herein, in particular by UV curing.

In particular, the amorphous material allows a flexible transfer of the coating layer on the transfer element (e.g. it allows tailoring the properties of the coating layer to the particularities of the transfer, e.g. by keeping the coating layer mechanically flexible) while on the other hand providing sufficiently high viscosity that during the timescale of the transfer the material of the coating layer does not undergo the detrimental flow. Further, the viscosity of the amorphous material can be adjusted (e.g. by the temperature) such that the coating layer thus sufficiently adheres onto the substrate without reducing a lateral resolution in the plane of the coating layer.

According to an embodiment, the pre-curing is performed at temperatures outside the temperature window which extends between the melt temperature and the curing temperature. In other words, the pre-curing is performed either in the supercooled liquid state or above the curing temperature. In this regard, it should be understood that the time needed to reach a certain partial curing state strongly depends on the temperature and is generally higher for lower temperatures.

Besides the advantages regarding pre-curing, transfer systems (i.e. the use of a transfer element) may be accompanied by problems of the detachment of the transfer element from the coating layer after attachment of the coating layer to the substrate. The inventive solution allows a preconditioning of the coating layer in a way that the adherence between powder particles or a film formation is already advanced such that the adherence between the coating layer and the transfer element is minimized after applying the coating layer to the substrate. In this way, a detachment of the transfer element from the coating layer is achieved without difficulty after the coating layer has been applied to the substrate. This may be further supported by providing the transfer element with a material that reduces the adherence (e.g. by providing the transfer element with Teflon) or by printing different layers and including in the coating layer near to the transfer element (e.g. a transfer foil) a substance reducing the adherence to the transfer element. Another option could be to make a pre-curing for the coating layer near to the transfer element—in particular with UV—before applying the coating layer to the transfer element and therefore reduce the adherence of the coating layer to the transfer element depending on the curing degree. Another possibility of supporting the detachment of the transfer element from the coating layer is to use a structured transfer element, e.g. by using a perforated foil, a foil with lotus effect, etc. Another possibility of supporting the detachment of the transfer element from the coating layer is to provide a transfer element with a structured surface (e.g. with a surface structure similar to a tissue or with a certain surface roughness). Another possibility of supporting the detachment of the transfer element from the coating layer is to provide a suitable detachment facilitating material between the transfer element and the coating layer. A detachment facilitating material may be for example a fluidic intermediate layer or a release powder.

Embodiments of the herein disclosed subject matter combine materials conventionally used for powder coating with materials which are conventionally used for the manufacture of toners. According to an embodiment, by additional means (e.g. optimized charge control agents, CCAs in small amounts) a larger thickness of the coating layer is achieved.

According to an embodiment, a larger thickness may also be supported by a thicker coating of the transfer element (e.g. a thicker coating of a transfer drum by a developer unit) or by intermediate mechanical compaction. Due to the use of amorphous materials an additional rapid adherence of the coating material particles among each other is achieved during the transport phase between latent image generation and the optional pre-curing: by a pressure based compaction of the coating layer at the temperature close to the glass transition temperature Tg an amorphous component of the coating material a high inter-particle adherence is achieved. The inter-particle adherence allows an embedding of further amorphous components of the coating material which are below glass transition temperature thereof and/or an embedding of crystalline components of the coating material which are below the melt temperature thereof. In this way, a weak adherence of the coating layer on the transfer element is achieved or sufficient, respectively.

According to one embodiment, a high lateral resolution is achieved by the pressure based compaction of the coating layer at a temperature which is above the glass transition temperature and below an upper temperature, wherein the upper temperature is 30° C. above the glass transition temperature. According to other embodiments, the upper temperature is 5° C. above the glass transition temperature or, in another embodiment, 15° above the glass transition temperature. By such pressure based thermally assisted compaction fine-grained powder can be built up with steep edges. The mechanical compaction assists in maintaining the steep edges up to the pre-curing which allows a high lateral resolution in the coating layer. For example, according to an embodiment resolutions of above 400 dots per inch (dpi) or above 10 l/mm are achieved.

According to an embodiment, only a single coating layer is applied to the transfer element/substrate. According to another embodiment, two or more coating layers are applied on the transfer element, wherein a first coating layer of the at least two coating layers is applied on the transfer element and a second coating layer is applied on the transfer element (and in particular over the first coating layer). Two or more coating layers may require some effort in registration of the two or more layers (in particular if the two or more layers include high-resolution images). On the other hand, applying the desired coating thickness by two or more coating layers may facilitate the generation of steep edges. This is in particular the case if the first coating layer is compacted before the second coating layer is applied over the first coating layer. Compaction may include mechanical compaction (e.g. pressure induced) and/or thermally assisted compaction (e.g. temperature induced). Thermally assisted compaction includes heating the respective coating layer to a temperature at which during in the desired processing time a flow of amorphous material occurs (wherein the temperature is in particular in a temperature range in which the amorphous material is in its supercooled liquid state).

According to an embodiment, the first coating layer is pre-cured or at least partly pre-cured before the second coating layer is applied over the first coating layer. This may allow for stable steep edges of the coating (which comprises the first coating layer and the second coating layer) even at large thicknesses, e.g. above a thickness of 50 µm. According to an embodiment, the pre-curing is performed such that in each coating layer sufficient functional groups remain which can react with the neighboring coating layer. On the one hand this may be achieved by only a partial cure of the individual coating layers before applying the next coating layer, or by non-stoichiometric composition (e.g. excess of specific functional groups in the first coating layer and excess of the complementary functional group, which reacts with the specific functional group, in the second coating layer) or just by the fact that after curing still some functional groups are left based on the increase of immobility during the curing process. Hence, in such a non-stoichiometric composition even if the component having the specific functional groups in the first coating layer is completely cured (i.e. no further reaction takes place) there will remain a portion of the specific functional groups that react with the complementary functional group in the second coating layer.

Further, by specific additives or by functionalization of mechanical properties of conventional toner components, e.g. charge control agents, an inter-particle adhesion among the particles of the powdery coating material may be improved, thus allowing steeper edges of the coating material (larger angles of repose) in the coating layer (i.e. before any compaction, flow or partial cure is effected). Such measures may assist in achieving both, high-resolution and large thicknesses of the coating layer. For example, a resolution of 1000 dpi corresponds to a dot size of 25 µm. With a thickness of the coating layer of 50 µm this corresponds to an aspect ratio of 2:1. This in turn requires an angle of repose of more 76° to avoid coalescence of two dots separated by a single dot size (25 µm). The influence of additives may be compared to sand. Dry sand has an angle of repose of about 35° wherein for wet sand an angle of repose close to 90° is possible.

A high angle of repose is preferred because the higher the angle of repose is (i.e. the closer the angle of repose is to 90 degrees and hence the steeper the edge of the coating layer is) the less is the effect of ablation of the coating layer on an image depicted by the coating layer.

In contrast to conventional powder coating, no pressurized air is used as primary conveying medium in NIP methods. This allows for thin coating thicknesses while still maintaining known properties of conventional powder coatings since in a NIP method no or only very low danger of inclusion of microscopically small air bubbles exists. Nevertheless, compared to conventional NIP methods an oversized thickness of the coating layer is necessary to achieve the typical properties of a powder coating (e.g. long-term weathering resistance). For example, by a sand abrasion usually a certain thickness of the coating layer is abraded each year which has to be provided in advance by a sufficient (initial) thickness of the coating layer.

According to an embodiment the coating material does not contain degassing agents. This is possible because according to an embodiment no pressurized air is used for applying the coating material to the transfer element. Further, a compaction of the coating layer on the transfer element has a degassing effect. Since the compaction of the coating layer is performed on the transfer element, the pressure of compaction can be optimized in particular regarding compaction degree and degassing separate from the application of the coating layer to the substrate. According to an embodiment, the compaction is performed at the glass transition temperature of the uncured amorphous material (sometimes also referred to as Tg0) or in the vicinity thereof, e.g. in a temperature range the lower limit of which extends down to 20 Kelvin below the glass transition temperature and the upper limit of which extends up to 15 Kelvin above the glass transition temperature [Tg0−20 K; Tg0+15 K].

By using an amorphous material in the coating material it can be achieved that an initial adherence (without thermal treatment) among the powder particles is higher than an initial adherence of the powder particles on the transfer element. According to an embodiment the electrostatic parameters of a printing device according to the herein disclosed subject matter are respectively adapted. For example, if the printing device comprises a transfer drum and an intermediate transfer belt, the voltage of the transfer drum and the transfer power of the intermediate transfer belt are adjusted accordingly.

In the following a printing process according to embodiments of the herein disclosed subject matter is described exemplary: First it is started the activation of the powder particles in the developer station with a system of screws and particles together with carrier get activated by movement/friction. Then a (−) voltage is applied to the mixing (step 3 below)

1. Charging: The whole surface of the image organic photoconductor roller (OPC) is uniformly electrically charged by the charging corona (−800 VDC) A LED light source is used in writing an electrostatic latent image on the OPC.
2. Exposure: The print pattern is written in dots with LED light (−100 VDC) and the OPC is discharged where light hits the surface. An electrostatic latent image is formed on the OPC.
3. Developing: Toners negatively charged (−500 VDC) are adhered to the latent image on the OPC.
4. Transferring: The toners adhered to latent images are transferred to the surface of the transfer roller positively charged ((+) 200-800 VDC) and then toner is transferred from transfer roller to the surface (Metal, MDF, Glass, Tiles, standalone transfer element)

According to an embodiment the heating device, which is configured for heating the coating layer on the transfer element before or during the application of the coating layer to the substrate, is a heatable element, e.g. a heatable roller which is also referred to as fixation roller. Caking of part of the coating material on the heatable element can be avoided or at least be reduced by several measures. For example, one such measure is to induce viscous in flow in the coating material (e.g. by pressure and/or temperature). For example, flow of the coating materials (and in particular of the powder particles) and hence coalescence of the powder particles can be achieved by heating the coating material into the supercooled liquid state above the glass transition temperature Tg0 but (well) below a melt temperature Tm (if such melt temperature exists). Another such measure is to partially cure the coating layer (e.g. by pressure, ultraviolet light, temperature (e.g. by infrared radiation, contact heating elements, etc.)). Another measure and in accordance with a further embodiment, (further) compaction of the coating layer can be performed after inducing flow of the coating material before partially curing of the coating material. Another such measure is to provide a combination of elastomeric and durable plastic effects, e.g. by combination of crystalline and amorphous binder materials in the coating material or by using purely amorphous binder materials in the coating material.

According to an embodiment, at least one of an UV initiator and a thermal initiator (e.g. a mixture of UV initiator and thermal initiator) in case of a resin with radical curing and/or an UV initiator in case the resin can be cured by cross linkers (i.e. in case the resin comprises unsaturations).

By inducing viscous flow in the coating material and/or partial curing of the coating material a high mechanical stability of the coating layer can be achieved, which according to an embodiment can be a foil like (connected) intermediate state. Such a foil like intermediate state of the coating layer can reduce or avoid the caking on heatable elements.

Viscous flow of the coating layer and/or partial curing of the coating layer (and in particular a foil like intermediate state of the coating layer) also facilitates the handling of the transfer element since the coating layer already has some stability against environmental impacts but is not brittle as the fully cured duroplastic systems usually are. Brittleness could lead to a cracking off of the coating layer from the transfer element.

Thereby inducing viscous flow at comparably high viscosities (i.e. in the vicinity of the glass transition temperature) and in particular by avoiding a liquid state above the melt temperature Tm micro gas bubbles can be avoided. Further, by using amorphous binder materials in the coating material the curing range can be extended over a larger temperature range without the detrimental effects on the lateral resolution of the coating layer. In this way, desirable properties of conventional powder coatings can be achieved with the coating layer described herein (e.g. ceiling, high-temperature resistance, weathering resistance, long-term ultraviolet stability, wearing protection, being free from pinholes, wear based bleaching protection, outdoor capability, scratch resistance, resistance to solvents, diffusion reduction/diffusion barrier, etc.).

According to a further embodiment, for applying the coating layer to the substrate (e.g. before applying or during applying the coating layer to the substrate) the temperature of the coating layer is increased to a temperature above a curing temperature of the coating layer so as to partially cure the coating layer before removal of the transfer element. In this regard it is emphasized that before removal of the transfer element the coating layer is only partially cured, e.g. by a suitable time period during which the temperature of the coating layer is maintained at or above the curing temperature. For example, according to an embodiment the partial curing of the coating layer before removal of the transfer element is performed by rapid heating of the coating layer to a temperature above the curing temperature and rapid cooling of the coating layer after a short period of time.

Such a typical heating/cooling range could be between 10 K/min and 100 K/min. However, the main aspect is that only partial curing happens. Such partial curing can be defined in that way that after this partial curing still some reactions heat is given or consumed depending on the type of reaction (endotherm or exotherm or combinations thereof). Also a shift of higher than 1-2° C. of the Tg measured with DSC with a heating rate of 20 K/min of the coating is a good indication that only partial curing has happened. Preferably based on the heat formation/consumption of the reaction a partial curing of below 80%, even more preferably below 50% is chosen.

According to an embodiment, the rapid heating of the coating layer to a temperature above the curing temperature is performed after application of the coating layer to the transfer element but before the transfer of the coating layer to the substrate. A rapid heating of the coating layer to a temperature above the curing temperature (e.g. a shock-like (sudden) impulse heating) may also provide a gloss forming liquid phase before curing begins. By controlling the heating parameters the degree of degassing, the ductileness/brittleness and hence the ability to handle the coating layer during the transfer from the printing device to the substrate is also controlled. In another embodiment the ductileness/brittleness is also controlled in direct printing.

According to a further embodiment, the partial curing of the coating layer (or the rapid heating of the coating layer to a temperature above the curing temperature) is performed during applying the coating layer on the transfer element to the substrate. In this way, the coating layer and in particular an image represented by the coating layer has a sufficiently high curing degree which ensures that a subsequent vertical position in a curing oven does not adversely affect the quality of the image/the lateral resolution of the coating layer. According to an embodiment, during the application of the coating layer to the substrate the substrate is in a horizontal position (i.e. the direction of gravity is perpendicular to the coating layer) or the substrate is at least not in a vertical position.

The rapid heating of the coating layer can be performed by any suitable heating device, e.g. an infrared radiator, a laser, etc. According to an embodiment, the heating device is configured for directly heating the coating layer. According to a further embodiment, the heating device is configured for heating the coating layer indirectly, e.g. by heating the substrate.

The viscous flow and/or the partial curing of the coating layer may improve the fully cured coating layer on the substrate regarding resistance to abrasion, scratch resistance and long-term resistance regarding solvents.

By the continuous coloring of the coating layer throughout the thickness of the coating layer in particular in the case where the coating layer represents an image, an integrated bleaching protection for the applied image is achieved in outdoor applications. In known systems a thin undercoat is covered with a transparent thick protection layer e.g. by electromagnetic brush (EMB, see e.g. http://www.emb-technology.com/). In contrast, embodiments of the herein disclosed subject matter include the image throughout the coating layer.

In this way, in an outdoor application the natural operation is functionalized and exposes continuously new color pigments in deeper positions which are not bleached. Hence, the natural operation serves the function of removal of bleached pigments. In an outdoor application, the abrasion is considered typically in the range of 1 μm to 2 μm per year. Hence, it is possible to provide a wearing coat which maintains an image over several years even if subjected to sand erosion.

According to an embodiment, the transfer element is removable from the coating layer application device. For example, according to an embodiment the transfer element is removed after applying the coating layer with the printing device. The transfer element may be shipped or stored separately. The transfer element may include protection features like soft packaging made of polymers or other foil layers between for transport and storage of the coating layer on the transfer element. Preferably the packaging material is chosen in a way that during the storage time and conditions no transfer of materials coming out of the packaging material to the coating happens. Special attention is given here to the use of materials not including a high content of mobile plasticizers which could reduce the Tg of the coating. Also the transport should be done below Tg, especially if some pressure is given to coatings. The aforesaid applies as well for the final cured printing on the substrate.

A conventional NIP transfer method adapted to embodiments of the herein disclosed subject matter may provide one or more of the following features: first, the heating rate may be precisely controlled; second, a rapid heating of the coating layer to a temperature above the curing temperature may be provided. Final curing (which may be performed at a different place) may provide properties which are typical for powder coatings, in particular regarding adherence and sealing.

Since the glass transition temperature of the amorphous material is a measure for the dynamics of processes in the coating material, a low glass transition temperature may provide for properties known from powder coatings, e.g. diffusion increasing properties and the desired pinhole free state of the cured coating, within a short curing time. In connection with the possible expression of residual micro gas bubbles during (or before) the curing process a pinhole free film is formed which exhibits the desired diffusion reducing properties.

Besides the thermal treatment also the chemical composition of the coating material can assist in providing the desired properties of the finally cured coating layer. For example, it was found that a large thickness and a good lateral resolution can be achieved (and optimized) by including a charge control agent in the coating material, e.g. in an amount in a range between 1 to 5 w-% of the coating material. In particular advantageous has proven salicylic based, especially a zink salicylic acid based charge control agent.

Diffusion reducing/preventing properties of a coating layer depend essentially on two parameters: the diffusion rate of the material and the thickness of the coating layer. According to embodiments of the herein disclosed subject matter a large thickness of the coating layer is achieved which provides (at a given diffusion value, e.g. for water, oxygen, etc.) good diffusion reducing properties. By adding a suitable amount of charge control agent an optimum of both parameters diffusion rate and coating layer thickness may be achieved, in particular by a relatively small amount of charge control agent of 1% to 5%.

In particular by the zinc salicylic acid based CCA additional advantages are achieved: good outdoor stability (keeping the outdoor stability known from powder coating systems by choosing the right CCA), good consistent network-forming a behavior, and high color density. For outdoor application it was surprisingly found that about 1% or even more like 2% was necessary to get the best color density. Additionally silica, preferably with a particle size between 1 and 100 nm, most preferably between 5 and 70 nm was found to increase the charging properties of the here mentioned thermoset materials.

According to an embodiment, the use of suitable CCAs provides for a rapid latent image generation during the printing. In this way, a high throughput in the printing process is achieved. According to an embodiment, a latent image change within less than one second can be achieved with a coating layer thickness of more than 5 μm, in particular more than 10 μm and in particular up to 100 μm, e.g. a thickness between 5 μm and 8 μm.

Further, the addition of particulate material, the particles of which have (and preferably maintain) a shape which deviates from a spherical shape may assist in providing desired properties of the finally cured coating layer, e.g. in providing a high lateral resolution in the coating layer. Also a high surface roughness of the particles may assist in providing such desired properties. Such particulate material may only serve one function or may serve a further function as described herein. For example, the particulate material may also serves the function of a charge control agent. In this regard, the zink salicylic acid based charge control agent mentioned above also improves the mechanical properties of the uncured or partially cured coating layer and helps to achieve a high lateral resolution in the coating layer. Without being bound to theory it is assumed that this advantageous property is due to the elongated (rod-like) shape of the particles and/or the surface roughness of the particles.

It is noted that the term "curing" in the sense of the herein disclosed subject matter means in particular curing by reaction of one or more (e.g. two or more) binder materials with itself and/or each other (e.g. initiated by thermal radical initiators for unsaturated systems or by one or more binder materials and additional curing agents (e.g. polyester with epoxy resins, primid curing systems (β-hydroxyalkyl-amide (HAA)), etc.). According to an embodiment, including thermal curing systems or pure thermal curing systems is preferred.

According to an embodiment, after applying the coating layer to the transfer element (or to the substrate in a direct print method), the coating layer is subjected to a further treatment according to embodiments of the herein disclosed subject matter, e.g. inducing viscous flow in the coating layer, partially curing the coating layer, compaction of the corporate coating layer (in particular by exerting pressure on the coating layer).

According to an embodiment, by suitable controlling of the partial curing the retention time in the gel state of the coating material is sufficiently reduced so that notwithstanding the continuous coloring throughout the coating layer a high lateral resolution is achieved but no blurring effects reduces the lateral resolution. For example, in a further embodiment, a high pre-curing temperature is used but for a short time period which triggers the vitrification process by curing (change of alpha) such that a viscous flow is reduced or prevented and a later handling during application of the coating layer to the substrate is facilitated, for example by reduced tendency of the coating layer to plastic deformation. This process could be supported by radiation curing like UV and/or electron beam.

In an embodiment of the aforementioned principle the impulse like heating of the coating layer is performed such that after the coating layer has been brought into contact with the substrate the temperature of the coating layer is increased to a temperature above the curing temperature for a short time such that due to the following rapid cooling a partial vitrification occurs such that no negative blurring is noticeable. Further, in such an embodiment the point in time at which the transfer element is removed from the coating layer can be optimized depending on the application and the requirements. According to an embodiment, the adhesion of the coating layer on the substrate at a temperature which is in the vicinity of the glass transition temperature or slightly above the glass transition temperature is good enough such that the transfer element can be already detached from the coating layer. In this way, the gloss of the coating layer may be optimized. Further, the transition free attachment of coating layers may be facilitated. According to an embodiment, by the temperature profile (rapid heating of the coating layer to a temperature above the curing temperature) the adherence between the coating layer and the coating element is reduced (e.g. by suitable conditioning of the transfer element) such that the peeling off of the coating layer from the transfer element is facilitated. According to an embodiment a sacrificial layer is provided on the transfer element which facilitates the peel off. According to an embodiment, after application of the coating layer and before removal of the transfer element the sacrificial layer can be altered in its properties (e.g. by heating) such that thereafter the peel off is facilitated. According to an embodiment, the sacrificial layer is destroyed during the final curing. For example, during the final curing the sacrificial layer may evaporate or outgas.

According to an embodiment, viscous flow at a temperature where the uncured coating material is in its glassy state (below its glass transition temperature) is assisted by exerting pressure on the coating layer on the transfer element. According to an embodiment, the pressure on the coating layer is exerted by a roller. For example, if the transfer element is a transfer drum, the pressure may be exerted by a roller pressing in a direction against the transfer drum.

In a further embodiment, the coating material is functionally supplemented, e.g. by suitable choice of polymers, color pigments or dyes, that a long-term stable color fastness and ultraviolet (UV) resistance is achieved. By using of polyester derivatives an enhanced ultraviolet resistance (e.g. compared to epoxy variants) in the final product but also a simple thermal fixation in the electrophotographic or thermal NIP process may be achieved. Alternatively to this acrylic, F-polymer or urethane based coatings can also achieve a very good weather stability.

At high temperatures (above 200° C.) conventional powder coatings have the tendency to significantly change the color at least in critical color regions and to lose the glossy appearance due to thermal attack on the coating surface. By providing these colors as coating material according to embodiments of the herein disclosed subject matter due to the amorphous component and the resulting controllability and deeper curing temperatures such problems can be avoided.

According to an embodiment a color gradient is formed in the coating layer, wherein the color changes in a direction perpendicular to the coating layer. According to an embodiment, the coating layer (e.g. on the transfer element) is provided as an image comprising one or more different colors, in particular more than two different colors, wherein the image is different at different depths of the coating. For example, according to an embodiment the change in the image may be a gradual change, e.g. resulting from a shallow edge of a coating layer. According to a further embodiment, the change in the image may be stepwise. Such a stepwise change in the image of the coating (e.g. change from an upper image to a lower image in a direction from a surface of the coating towards the substrate) may be realized by providing two different coating layers on top of each other wherein the different coating layers show different images. In particular a stepwise change in the image at a certain depth provides the possibility of exposing the lower image after abrasion of the upper image. In particular the lower image may include human readable or machine readable portions (e.g. symbols or characters indicating e.g. the remaining thickness of the coating).

Once transferred to the substrate and subjected to abrasion, different images at different depths of the coating may indicate the remaining thickness of the coating. This may be used as an indication as to when an after treatment of the coating is necessary. Such features can also be used to detect missing coating spots when the coating has also a protection function against corrosion (e.g. fluorescent coating below which shine through when the above coating is not completely closed).

According to an embodiment, the fact that an uncured or partially cured coating layer provides a good adhesion to a further uncured or partially cured coating layer is used for providing additional functionality. For example, the transfer element may already comprise a first coating layer when a second coating layer is applied to the transfer element. Likewise, the substrate may already comprise an undercoat when one or more coating layers on a transfer element are applied to the first coating layer. In this regard it is noted that the undercoat may be generated by conventional powder coating or other conventional coating technologies or may be a coating layer in the sense of the herein disclosed subject matter. It should be emphasized that with this embodiments of the herein disclosed subject matter a special benefit is given by the fact that a high resolution printing can be build up which follows the same chemistry like conventional coatings like powder coatings and therefor a very good compatibility according to adhesion, chemistry, thermal expansion and so on is given. This opens the use of high quality printing in many industrial applications which were not achievable up to now.

According to a further embodiment, by suitable selection and composition of charge control agents, polymers, color pigments and dyes, and in particular amorphous components as well as by suitable control of the curing degree a high temperature stability of the coating layer can be achieved like with silicone based resin systems. In the use of conventional toners or crystalline coating materials in the following problems are known: At high fixing temperatures of the toner, in particular in case of a relatively thick toner layer, deposits may form on the fixation roller due to the thermoplastic properties of the toner. Further, for example PANTONE® Rhodamine Red, Purple, Blue 072, Reflex Blue as well as HKS® 27, 33 and 43 are known to be prone to cause problems due to the low temperature stability of its pigments during fixation of the toner. Accordingly in conventional toner systems usually it is attempted to replace the pigments of low stability with more stable pigments of similar color.

In accordance with embodiments of the herein disclosed subject matter, a multistage curing, includes a partial curing of the coating layer at low temperatures and/or rapid partial curing at high temperature. Such processing may assist in avoiding problems due to low temperature resistance of color pigments. In particular the application of the coating layer to the substrate can be divided into two stages: thermal start of the fixation of the coating layer on the substrate (for substrates with high thermal conductivity (e.g. metals) a (shocklike) temperature impulse may be achieved). According to an embodiment, the thermal start of the fixation is performed at a temperature which is above the curing temperature which transfers the coating layer into a gelled or soft state which promotes a spontaneous adhesion on the substrate and facilitates the detachment of the transfer element. In the subsequent final curing a different temperature profile may be imposed, e.g. so as to achieve a glossy surface and a high quality finish.

According to an embodiment, partial curing of the coating layer on the transfer element is performed by non-thermal curing mechanisms. For example, according to an embodiment the non-thermal curing mechanism is a partial curing by ultraviolet radiation. Non thermal curing mechanisms have the advantage that curing and viscous flow of the coating material can be controlled separately.

According to a further embodiment, partial curing in the sense of the herein disclosed subject matter includes different curing degrees over the thickness of the coating layer. For example, according to an embodiment a first portion of the coating layer which is facing the transfer element is cured to a higher degree than a second portion (e.g. a free surface portion which is to be attached to the substrate) of the coating layer which is opposite the first portion. In this way, the adherence of the coating layer on the transfer element may be reduced while maintaining good adhearing properties of the free surface of the coating layer which is facing away from the transfer element and which is intended to be attached to the substrate and additionally the resolution then at the top of the coating on the substrate may therefore be improved.

Compared to conventional powder coatings the thickness of the coating layer is reduced. However, surprisingly such relatively thin coating layers (compared to the thickness of conventional powder coatings) applied according to embodiments of the herein disclosed subject matter provide still the desired characteristics of conventional powder coatings (in weathering protection and resistance against chemicals and even corrosion protection can be achieved in some embodiments). Without being bound to theory it is assumed that the reason for the surprisingly good performance of the coating layer according to embodiments of the herein disclosed subject matter is in particular at least one of (i) the compaction of the coating layer on the transfer element, (ii) the initiation of viscous flow of the coating layer (i.e. the viscous flow of the coating material in the coating layer) and (iii) a reduced particle size of the coating material compared to conventional powder coating materials.

Due to the possibility to provide the desired protection with a relatively small thickness of the coating layer embodiments of the herein disclosed subject matter provide a cost efficient coating already due to material savings.

According to an embodiment, a coating on the transfer element is provided by one or more coating layers as described herein. According to an embodiment, a first coating layer of the one or more coating layers is subjected to viscous flow and/or partial curing before a second coating layer of the one or more coating layers is applied on the transfer element above the first coating layer. According to a further embodiment, one or more coating layers are applied to the transfer element without subjecting the one or more coating layers to viscous flow and/or partial curing. In this case, the coating comprising one or more coating layers may be subjected to viscous flow and/or partial curing afterwards.

According to an embodiment, the application of the one or more coating layers on the transfer element is performed by a single printing device. In particular, in such a case the one or more coating layers may be applied subsequently on the transfer element by the same printing device, e.g. the transfer element may run through the printing device one or more times.

According to a further embodiment, the application of the one or more coating layers are performed by a respective number of printing devices (i.e. one or more printing devices).

Providing the coating on the transfer element by one or more coating layers allows for a higher resolution because the effect of the angle of repose is reduced.

By the multilayer structure of the coating the inherent stability of the coating to be transferred may be increased and therefore the mechanical requirements for the transfer element may be reduced. For example, according to an embodiment a micro perforated transfer element (e.g. a micro perforated transfer film) may be used as a transfer element. By micro perforation the adherence of the coating on the transfer element and/or a surface structure of the coating after application to the substrate may be controlled.

Further, increased inherent stability of the coating to be transferred may be used to reduce processing requirements for the transfer of the coating on the transfer element (e.g. maximum temperature change during transfer (may lead to mechanical stresses), minimum angle of bending of the coating (may result in detachment of the coating from the transfer element), minimum temperature (too low temperatures may increase brittleness of the coating)).

According to an embodiment, the coating material comprises at least one amorphous component (e.g. an amorphous binder) without compounds (e.g. additives) which are typical for conventional toners, such as bisphenol A and epoxy resins. Due to the renouncement of these additives a coating of substrates is possible which may end up in the metabolism of a human being (bisphenol A) or which relate to outdoor applications without further protection mechanisms (epoxy).

Presently bisphenol A as plasticizer is subjected to criticism because it is assumed that this compound has a negative influence on the hormonal system, reproduction disorder and developmental disorder. Epoxy based applications without additional protection are not suitable for outdoor applications because they do not exhibit weathering stability.

By using a transfer element coatings may be applied to substrates which cannot be coated in a direct method (e.g. because the printing system would be too large or would be not available at a particular (peripheral) location. A typical example would be a can with an advertisement or a notice on its inside surface (e.g. "please do not discharge", "please recycle") or thermochromic coatings which are applied to a frying pan and indicate the working temperature.

According to an embodiment, by partial curing before application to a substrate the coating is transferred into a film-like state which allows a transfer without transfer element (in this case no transfer element is needed for transferring the coating to the substrate). Nevertheless, by final curing of the coating on the substrate the full adherence of the coating on the substrate is provided. Whether or not a coating has sufficient inherent stability to be transferred without transfer element may depend on the thickness of the coating and the material parameters (e.g. elastic modulus, hardness, etc.) of the partially cured coating.

According to an embodiment, the surface of the transfer element, on which the coating is applied, is configured such that the interfacial energy between the transfer element and the coating is temperature dependent such that the adherence of the coating on the transfer element becomes smaller at higher temperatures. Hence at elevated temperatures, during the contact of the coating and the substrate, the adhesion between the transfer element and the coating is smaller than at low temperatures during the transfer from the printing device to the substrate. Hence, the peel off of the transfer element is facilitated while on the other hand during the transfer from the printing device to the substrate the coating is securely adhered to the transfer element. A respective configuration of the surface of the transfer element may be realized by providing the transfer element with a wax, e.g. a Teflon based wax, which defuses to the surface at elevated temperatures thus reducing the adherence of the coating on the transfer element. Also the use of different electrostatic charging of the transfer element during the transfer of the coating to the transfer element and/or the transfer from the transfer element to the substrate is an option according to the invention. Further, according to an embodiment, charging of the substrate during applying of the coating layer to the substrate is performed, in particular in a direct printing application where a coating layer is directly applied to a substrate.

According to a further embodiment, the transfer element is covered with a nonstick agent. The nonstick agent facilitates removal of the transfer element from the coating after applying the coating with the transfer element to the substrate.

According to an embodiment, the coating material comprises a powdery solid state material which remains solid over the entire temperature range used for processing and curing of the coating layer. As is known from early work of Einstein (A. Einstein, "Eine neue Bestimmung der Moleküldimensionen", Ann. d. Physik, 19(4):289, 1906) solid particles dispersed in a viscous liquid increase the viscosity of the viscous liquid. Hence, for a given polymer the (temperature dependent) viscosity may be adjusted by the powdery solid state material. Hence, for example the viscosity of the coating material at the curing temperature may be adjusted so as to provide sufficient viscous flow within the respective process time window while on the other hand providing a desired lateral resolution.

According to an embodiment, a final curing of the coating layer on the substrate is performed in a conventional curing oven. According to a further embodiment, final curing is performed or at least initiated by ultraviolet (UV) radiation. For UV curing the thickness of the coating layer according to embodiments of the herein disclosed subject matter is well suited. While in a conventional powder coating UV curing is often difficult due to the large thickness which leads to an over curing at the surface (and hence to a danger of brittleness) or the radiation density in greater depth is too low for a uniform curing process (or the heating over the volume is not sufficiently uniform) or for achieve curing during the integral "energy density*time". Because according to embodiments of the herein disclosed subject matter thinner coating layers may achieve similar or identical properties as comparatively thicker conventional powder coating layers, thinner coating layers may be applied which avoided or at least reduced problems of conventional powder coating layers in ultraviolet curing. Further, pressure rollers (corresponding to fixing rollers of conventional NIP systems) may be used to compact the coating layer which again allows for a thinner coating layer compared to conventional powder coating systems.

According to an embodiment, the composition of the coating material is adapted to the desired thickness of the coating layer on the substrate. For example, according to an embodiment, a larger mean particle diameter of powdery coating material may be used for thicker coatings. This is in particular suitable, for relatively thick coatings (in particular if the thick coating is applied in a single coating layer) and if no exceptional high demands on the resolution are made.

Further, an angle of repose of the coating material may be adapted by suitable additives. Hence, the desired angle of repose may be achieved while considering the adhesion values in the NIP process and the transport time between the printing and the initiation of partial curing/viscous flow. In particular bigger particles might improve the haptic effect of the coating.

According to another embodiment, also for a larger thickness a small mean particle diameter of the coating material may be used for achieving a high resolution. In combination with the control of a steeper edge on boundaries, e.g. color boundaries in the coating layer thus a higher resolution may be achieved. In particular with a coating layer thickness of over 150 µm with a particle diameter of below 30 µm on the one hand a high resolution is achieved while on the other hand a high thickness of the coating layer after the curing is achieved.

Figure 3:
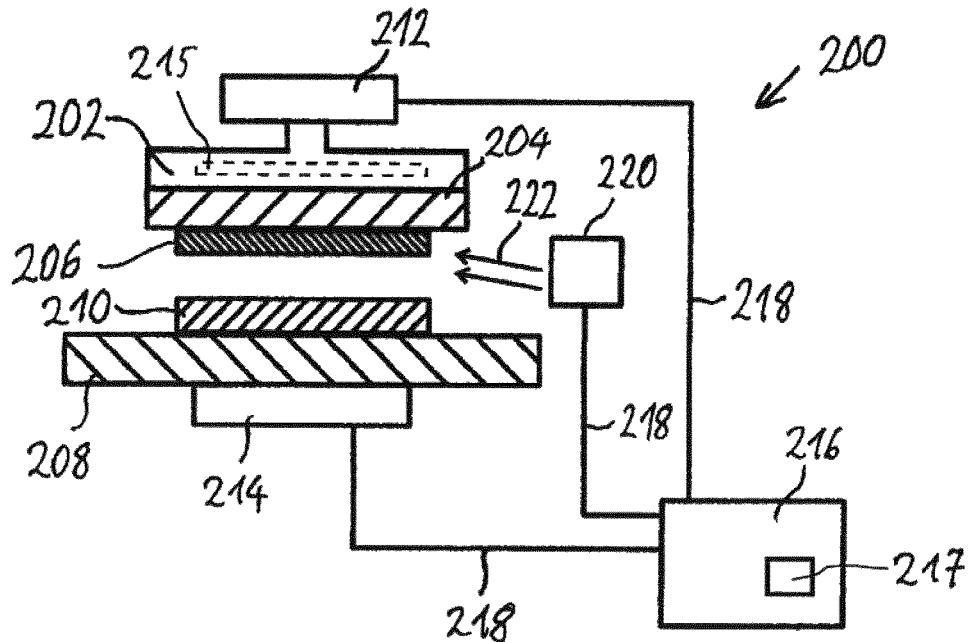
FIG. 3 shows a cross-sectional view of a coating layer application device 200 according to embodiments of the herein disclosed subject matter.

FIG. 3 shows a cross-sectional view of a coating layer application device 200 according to embodiments of the herein disclosed subject matter.

According to an embodiment, the coating layer application device 200 comprises a transfer element support 202 for supporting a transfer element 204 comprising a coating layer 206. The coating layer is curable and comprises an amorphous polymer. In accordance with an embodiment, the coating layer 206 is a thermosetting polymer composition which was applied to the transfer element 204 in the form of a powdery coating material. The coating layer application device 200 further comprises a substrate support 208 for receiving a substrate 210 onto which the coating layer 206 shall be transferred. In accordance with an embodiment, the transfer element support 202 and the substrate support 208 are operable to bring the coating layer 206 in contact with the substrate 210. For example according to an embodiment this is effected by an actuator 212. According to an embodiment, the actuator 212 is operable to drive the transfer element support 202 with the transfer element 204 and the coating layer 206 towards the substrate 210 and to thereby bring in the coating layer 206 and the substrate 210 into contact. The actuator 212 may be further operable to drive the transfer element support 202 so as to exert a pressure on the coating layer 206 in order to press the coating layer 206 onto the substrate 210.

The coating layer application device 200 further comprises a heating device 214. According to an embodiment, the heating device 214 is configured to heat the substrate 210 (e.g. via the substrate support 208). At least by bringing the coating layer 206 in contact with the substrate 210, also the coating layer 206 is heated by the heating device 214. According to a further embodiment the heating device is configured to heat the transfer element support 202 (heating device 215, shown as alternative embodiment in dashed lines in FIG. 3). Hence, if the transfer element 204 with the coating layer 206 is received by the transfer element support 202, the coating layer 206 is heated by the heating device. According to an embodiment, a control device 216 is provided for controlling in particular the heating device 214, 215. To this end, the heating device 214, 215 is controllably connected to the control device 216, as indicated at 218 for the heating device 214. According to a further embodiment, the control device 216 is also controllably connected, indicated at 218, to the actuator 212 in order to coordinate the operation of the actuator 212. According to an embodiment, the control device comprises a processor device 217 which is configured for executing a program element which is configured for implementing a control according to one or more embodiments of the herein disclosed subject matter. It is noted that the control device may be configured in any suitable way to implement such embodiments, e.g. in an open loop control configuration or in a closed loop control configuration.

After attaching the coating layer 206 to the substrate 210, which is according to an embodiment performed by suitably heating the coating layer 206, in accordance with an embodiment the transfer element 204 is removed from the coating layer 206 (i.e. is separated from the coating layer 206). Such a removal of the transfer element 204 from the coating layer 206 may be affected by the actuator 212 which according to an embodiment is operable to retract the transfer element support 202 and hence the transfer element 204 from the coating layer 206 attached to the substrate 210.

According to an embodiment, the control device 216 is configured for controlling the heating device so as to maintain the temperature of the coating layer 206 below a first temperature before the removal of the transfer element 204 from the coating layer 206, wherein at the first temperature the uncured coating material is in its supercooled liquid state or in its glassy state. As described in detail herein, this may allow in particular for maintaining a high resolution of an image of the coating layer 206. In another view the above corresponds to controlling the temperature of the coating layer 206 so as to maintain the temperature of the coating layer 206 within a first temperature range before the removal of the transfer element 204 from the coating layer 206 wherein within the first temperature range the uncured coating material is in its supercooled liquid state or in its glassy state.

According to a further embodiment, the control device 216 is alternatively configured to partially cure the coating layer 206 during the contact of the coating layer 206 and the substrate 210 by increasing the temperature of the coating layer 206 to a second temperature at or above a curing temperature of the coating layer 206. According to one embodiment, the second temperature is at or above a curing temperature of the uncured coating material.

According to an embodiment, the coating layer application device 200 comprises an energy transfer device 220, e.g. in the form of a radiation device which is configured for emitting radiation 222 towards the coating layer 206. The energy transfer device 220 may be configured to partially cure (or assist in the partial curing of) the coating layer 206 during the contact of the coating layer 206 and the substrate 210 (e.g. if the radiation 222 is ultraviolet radiation), even if the temperature of the coating layer 206 is maintained below the first temperature.

According to a further embodiment, the energy transfer device 220 may be configured for emitting the radiation 222 in the form of infrared radiation. In other words, the energy transfer device 220 may be configured as heating device in the sense of the herein disclosed subject matter to heat the coating layer 206 to an elevated temperature, e.g. to the first temperature or, in another embodiment, to the second temperature. In accordance with an embodiment, the energy transfer device 220 is controllably coupled, indicated that 218, to the control device 216.

It is noted that although more than one heating device 214, 220 (and even 215 as alternative embodiment) is shown in FIG. 3, according to other embodiments only a single heating device configured for heating the coating layer 206 on the transfer element (e.g. only 214 or 215 or 220) may be provided.

According to an embodiment, the transfer element support 202 comprises a flat support element which supports the transfer element 204 and the coating layer 206 thereon over the entire surface of the coating layer 206. According to a further embodiment, the transfer element support 202 comprises a support element which conforms to the shape of the substrate. According to a further embodiment, the transfer element support 202 comprises a roller which supports a portion of the transfer element 204 (and which may exert a pressure on the portion of the transfer element 204) at a particular time. In such an embodiment, in which the transfer element support comprises a roller, the (entire) transfer element 204 is supported (and pressed towards the substrate) by moving the transfer element 204 past the roller of the transfer element support.

It is noted that the above description with regard to FIG. 3 is given by referring to a coating layer 206. It should be understood that within the scope of other embodiments this description may be considered as referring to a layer package comprising at least one layer wherein one of the at least one layer is the coating layer 206.

Figure 4:
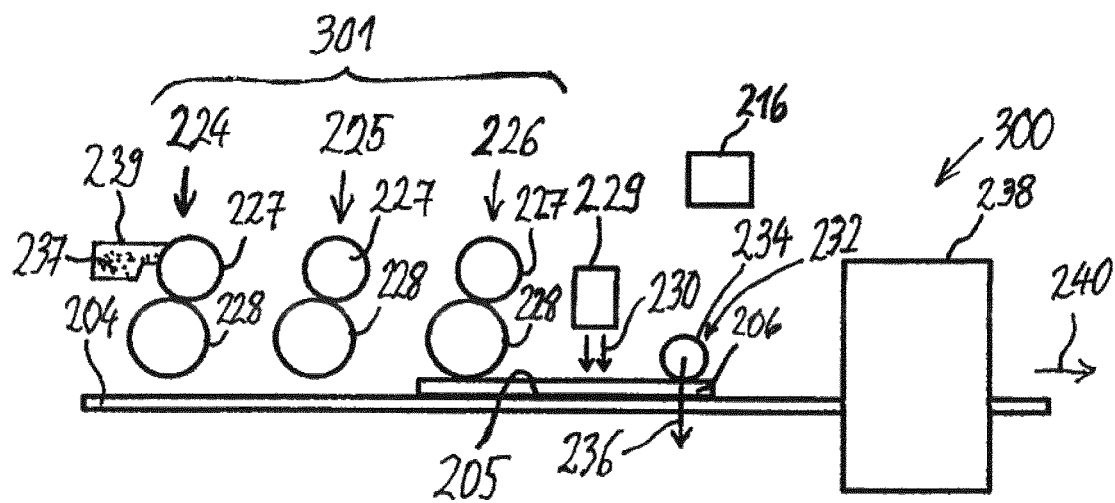
FIG. 4 shows a coating layer application device according to embodiments of the herein disclosed subject matter.

FIG. 4 shows a coating layer application device according to embodiments of the herein disclosed subject matter.

According to an embodiment, the coating layer application device 300 comprises a printing device 301. According to an embodiment, the printing device 301 comprises at least one printing unit, e.g. three printing units 224, 225, 226. According to other embodiments, more or less printing units (e.g. four printing units) may be provided. According to an embodiment, at least eight printing units may be provided (e.g. for cyan, magenta, yellow, key (black), white, transparent, metallic effect, at least one spot color). For example, according to an embodiment coating materials of different colors (e.g. for cyan, magenta, yellow, key (black), white, transparent, different metallic effects and colors and different spot colors for each type of coating (e.g. Indoor, Outdoor, . . . )) may be provided and for each such coating material an individual printing unit may be provided. As this is optional, it should be understood that according to an embodiment two or more printing units may comprise the same coating material. It is noted that generally any reference to different colors may be considered as a reference to different coating materials.

For the avoidance of doubt it is mentioned that independently of the type of printing machine and number of printing units any suitable color or set of colors can be used, in particular CMYK, white, transparent, effect colors and/or so called spot colors, within the frame of the herein disclosed subject matter.

According to one embodiment, each printing unit 224, 225, 226 is configured for applying its coating material to the transfer element by printing to thereby form the coating layer. According to one embodiment, at least some of the coating materials (which may be referred to as image forming coating materials) are each applied only to certain portions of the transfer element to thereby combine to a common image. In this sense, at least some of the coating materials (the image forming coating materials) together form a single coating layer 206. According to an embodiment the transfer element 204 is moved past the at least one printing unit 224, 225, 226 and hence the different coating materials are applied subsequently to the transfer element 204 (and in particular to a surface 205 of the transfer element 204), by the different printing units 224, 225, 226. In this regard, the surface 205 forms a target surface of according to the herein disclosed subject matter. As in a conventional NIP device, such as a conventional color laser device, this requires an appropriate registration of the image portions applied by the individual printing units. The movement of the transfer element 204 and the control of the printing device or the at least one printing unit 224, 225, 226 is controlled by control device 216 which is controllably connected to the respective devices.

According to an embodiment, each printing unit is an electrostatic (and in particular an electrophotographic) printing unit, which include an organic photoconductor 227 (OPC) which is first uniformly electrically charged, a light source (e.g. LED or laser source) is used for writing an electrostatic latent image on the OPC and the thus exposed OPC is developed with a coating material 237 according to embodiments of the herein disclosed subject matter. Thereafter, the coating material 237 is transferred to a first transfer element 228 (intermediate transfer element), e.g. by applying a suitable electrical field, to thereby form the coating layer 206 on the first transfer element 228. According to an embodiment, the coating layer 206 is then transferred to the transfer element 204 (which may be referred to as second transfer element 204). According to an embodiment, the coating material 237 is located in a cartridge 239. According to an embodiment, for each type of coating material to be provided (to be applied to the transfer element 204), a separate cartridge 239 is provided. According to an embodiment, to each printing unit 224, 225, 226 a cartridge is associated (e.g. a separate cartridge is provided). In order to not obscure FIG. 4, exemplarily a cartridge 239 is shown only for one printing unit 224 of the printing units of the printing device 301.

Figure 11:
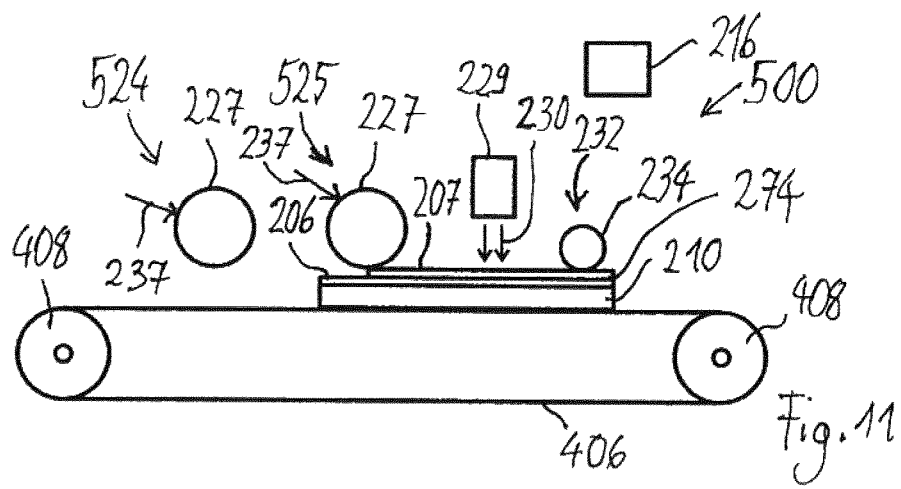
FIG. 11 shows a further printing device according to embodiments of the herein disclosed subject matter.

According to other embodiments, a printing unit does not include a first (intermediate) transfer element, as described with regard to FIG. 11. Accordingly, in such an embodiment, the printing units 224, 225 226 do not comprise the first transfer element 228. Rather, the coating material is applied from the OPC 227 to the transfer element 204 (indirect printing) or directly to the substrate (direct printing).

According to another embodiment, the coating material is applied from the OPC 227 to the first transfer element 204 and from here to the second transfer element 204 (indirect printing) or to substrate (direct printing).

According to an embodiment, the transfer element is a foil, paper, a belt, etc. in both cases.

Instead of two or more individual printing units for each color/coating material, a common printing unit which is configured for applying two or more colors/coating materials to the transfer element may be provided.

According to an embodiment, the coating layer application device further comprises an energy transfer device 229 being configured for transferring energy 230, e.g. in the form of radiation into the coating layer 206 on the transfer element 204 before the contact of the coating layer 206 and the substrate (not shown in FIG. 4). The energy may be heat. For example, according to an embodiment the radiation is infrared (IR) radiation.

According to an embodiment, the energy transferred into the coating layer 206 results in viscous flow in the coating layer 206. In particular, according to an embodiment the energy transferred into the coating layer 206 is configured so as to cause viscous flow of at least portions of the powder particles of the coating material which forms the coating layer 206 at this stage. According to an embodiment, the viscous flow in the coating layer 206 occurs at least upon application of pressure on the coating layer 206. To this end, according to an embodiment a compaction device 232 is provided configured for compacting the coating layer 206 on the transfer element 204 before the contact of the coating layer 206 and the substrate (not shown in Fig. FIG. 4). According to the embodiment, the compaction device 232 comprises a roller 234 which is pressed against the coating layer 206, resulting in a pressing force 236 in a direction towards the coating layer 206, as shown in FIG. 4. According to an embodiment, in a conveying direction of the transfer element 204 (or the substrate in direct printing) the compaction device 232 (or in particular the roller 234 thereof) is located after the energy transfer device 229, as shown in FIG. 4. According to an embodiment, in a conveying direction of the transfer element 204 (or the substrate in direct printing) the roller 234 may be located before the energy transfer device 229.

The transfer element support and the substrate support as well as the heating device (embodiments of which are shown in FIG. 3) are indicated by the device 238 in FIG. 4.

It is noted that, although the coating layer application device 300 in FIG. 4 includes both, the device 238 (which includes the transfer element support, the substrate support and the heating device) and the printing device 301, according to another embodiment, the printing device 301 may be a separate device which located at a location which is geographically different from the location where the device 238 is located. In such a case, the coating layer application device may not include the printing device 301. It should be understood that, e.g. if the printing device 301 and the device 238 located at different locations, each of the two devices 301, 238 (or any other device, e.g. a curing device) may have a separate control device. According to another embodiment, the two devices 301, 238 share the same control device 216, as shown in FIG. 4.

It is further noted, that besides the printing units 224, 225, 226 the printing device may include further devices which act on the coating layer 206, for example the energy transfer device 229 and the compaction device 232. According to a further embodiment, the coating layer application device 300 includes further devices 229, 232 which act on the compacting layer 206.

According to an embodiment, the transfer element 204 is foil-like or belt-like and may in particular be a transfer foil as shown in FIG. 4. The transfer foil may be moved at constant speed as indicated by the arrow 240 in FIG. 4. According to an embodiment, the transfer element 204 is a continuous transfer element, e.g. a continuous belt which extends between two deflection pulleys. According to another embodiment, the transfer element is capable of being rolled up. For example, according to an embodiment the transfer element is provided on a supply roll and is, after application of the coating layer, again provided as a roll, e.g. an intermediate product roll. There intermediate product roll of transfer element with the coating layer thereon may be stored or shipped for further use in a coating layer application device according to embodiments of the disclosed subject matter.

According to an embodiment, the transfer element 204 having the coating layer 206 thereon is removable from the coating layer application device. To this end, the transfer element and the coating layer thereon may be provided in any suitable shape, e.g. in the form of a played, a foil or a roll (e.g. a rolled-up foil).

FIG. 5 to FIG. 8 illustrates different stages of a printing method according to embodiments of the herein disclosed subject matter.

Figure 5:
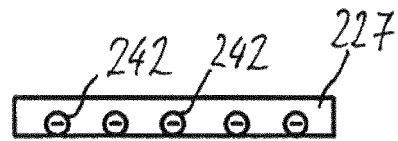
FIG. 5 to FIG. 8 illustrates different stages of a printing method according to embodiments of the herein disclosed subject matter.

According to an embodiment and as shown in FIG. 5, the whole surface of the organic photoconductor 227 (OPC) is uniformly electrically charged by a charging corona (e.g. −800 V DC). Some of the negative charges shown in FIG. 5 are indicated at 242.

Figure 6:
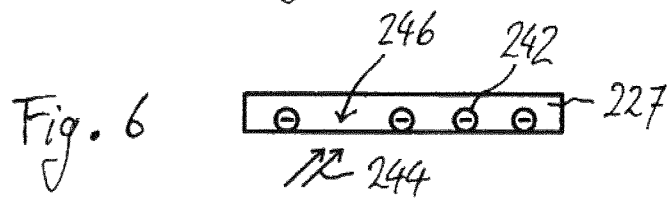

Thereafter, exposure of the OPC 227 is performed with a suitable radiation 244, e.g. LED light or laser light. The OPC 227 is discharged where the radiation 244 hits the surface. In this way, and an electrostatic latent image 246 is formed on the OPC 227, as shown in FIG. 6.

Figure 7:
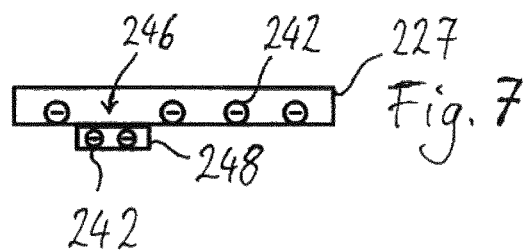
Figure 8:
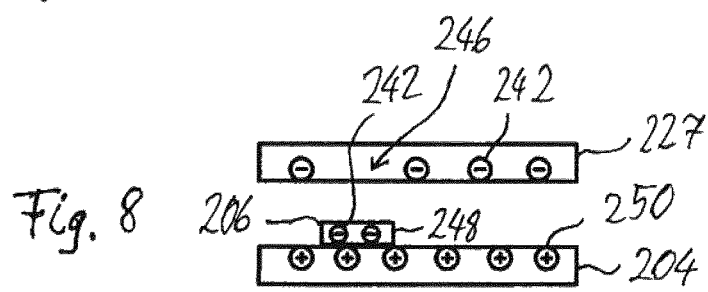

Thereafter, powdery coating material 248 according to embodiments of the herein disclosed subject matter is negatively charged (−500 V DC) and adhered to the latent image 246, as shown in FIG. 7. Negative charges are again indicated at 242.

Thereafter the powdery coating material 248 is transferred to the transfer element 204 which is positively charged to this end. Positive charges are indicated at 250. Thus the powdery coating material 248 forms the coating layer 206 (or forms part of the coating layer 206) on the transfer element 204 and resembles the electrostatic image 246 on the OPC.

It should be understood that FIG. 5 to FIG. 8 illustrate only the principle of an embodiment of a printing device. For example, while FIG. 5 to FIG. 8 show flat surfaces of the OPC 227 and the transfer element 204, any of these surfaces may also be curved (e.g. may form part of a roller). Further, it is noted that for positive charging systems (e.g. depending on the charge control agent) the voltages may be inversed (e.g. the OPC and/or the powdery coating material may be positively charged).

Figure 9:
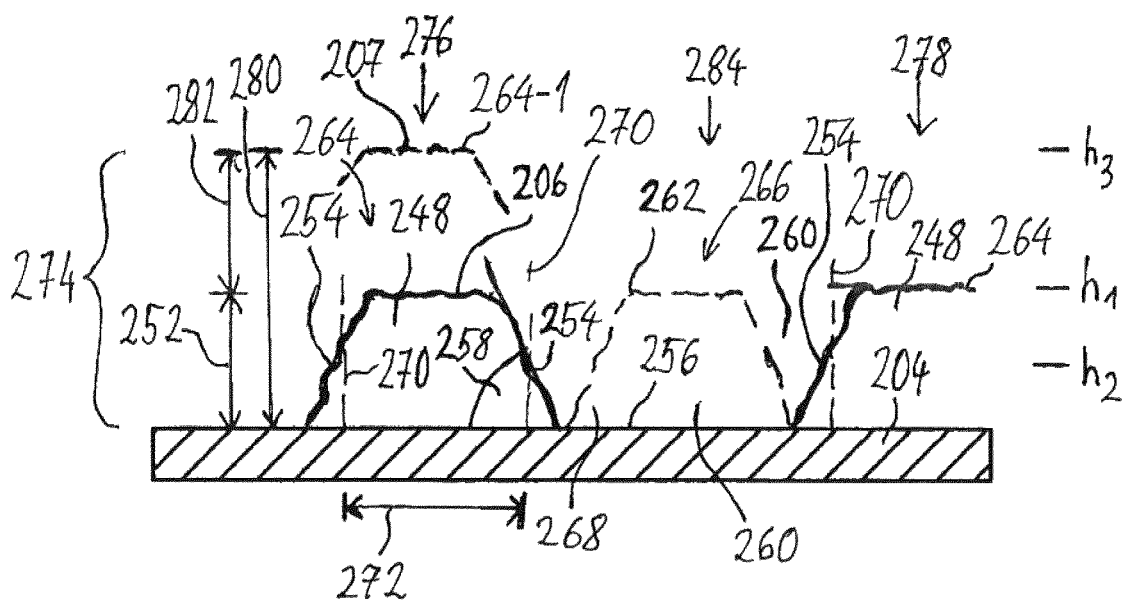
FIG. 9 illustrates a part of a coating layer according to embodiments of the herein disclosed subject matter.

FIG. 9 illustrates a layer package and in particular a part of a coating layer according to embodiments of the herein disclosed subject matter.

For a powdery coating material, the application of the powder with a large thickness 252 does not result in ideal edges but, according to an embodiment, rather in tapered edges 254 which form an angle 258 which is less than 90 degrees with the surface 256 of the transfer element 204. For example, according to an embodiment the angle 258 is in a range between 60 degrees and 85 degrees. Since according to an embodiment the printing device is a digital printing device, an image transferred to the transfer element 204 includes a plurality of dots. Hence a gap 260 may be formed between two adjacent dots 264, 266. This gap may be reduced by pressure, e.g. if a further coating layer 207 is applied, indicated by a further dot 264-1 in FIG. 9. It is noted that the dot 264 and the dot 264-1 form part of a layer package (indicated at 274) according to embodiments of the herein disclosed subject matter. Further, a roller may be used to compact the coating layer. Further, at least during curing the coating material at high temperature the coating material may level out and the gap 260 may fill. According to an embodiment, dots may be printed with the same or a different coating material, indicated by dots 264, 266. In such a case, a void between dots 264 of a first coating layer may be filled with a dot 266 of a second coating layer (e.g. coating material of a different color, indicated by dashed line 262 in FIG. 9). Due to the tapered edges, the width of the gap 260 is different at different heights h1, h2 of the coating layer. Hence, at h1 the width of a first dots 264 made from a first coating material 248 is smaller than the width of a second, adjacent dots 266 made from a second coating material 268 which is applied to the transfer element 204 after the first coating material 248. The vertical dashed lines 270 in FIG. 9 indicate the size 272 of a dot as printed. Since the width of the dots 264 of the coating layer 206 changes with the height through the coating layer, the resulting image changes if the thickness of coating layer is reduced, e.g. from h1 to h2 (e.g. by abrasion).

In accordance with an embodiment, the coating layer 206 and the further coating layer 207 have different spatial coverage (at a first lateral position 276 the first coating layer 206 and the second coating layer 207 overlap wherein at a second lateral position 278, the first coating layer 206 and the second coating layer 207 do not overlap). According to an embodiment, "overlap" in this sense means that the overlapping layers both have dots in an overlap position. This is also illustrated in FIG. 9, where each of the coating layer 206 and the further coating layer 207 comprises a dot 264, 264-1 at the first lateral position.

The different spatial coverage results in a thickness variation 280 in the layer package 274 wherein the layer package 274 has a first height h3 (corresponding to a first thickness 282) at the first lateral position 276 and has a second height h1 (corresponding to the second thickness 252) at the second lateral position 278. Hence, the thickness variation 280 of the layer package 274 defines (or corresponds to) a surface structure according to embodiments of the herein disclosed subject matter, i.e. a structure in a surface of the layer package.

According to an embodiment, the layer package 274 includes voids (e.g. in a third position 284, e.g. if the second coating layer and in particular the dot 266 would not be present). In such a case, and in accordance with an embodiment, the magnitude of the thickness variation corresponds to the thickness of the entire layer package 274 (indicated at 282 in FIG. 9). It is noted that in general and in accordance with an embodiment a single coating layer 206 is sufficient for generating a thickness variation if the coating layer comprises voids.

Finally it is noted that, if the coating layer shall act as a protection layer, according to an embodiment any voids and gaps (like the gap 260) in the coating layer are filled with coating material (e.g. with the same or a different coating material) or are removed by compaction or thermal treatment (e.g. initiation of viscous flow) in particular so as to provide a continuous coating layer of constant thickness on the substrate. Last gaps usually fill at least during curing, in particular if the coating layer 206 is in a liquid state or in a softened state (undercooled liquid state) above Tg.

Figure 10:
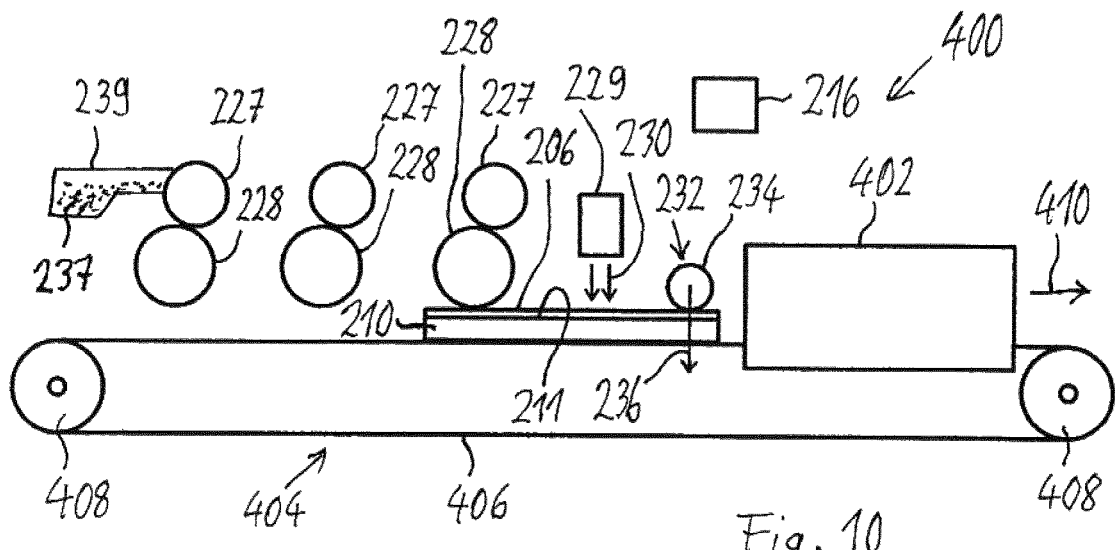
FIG. 10 shows a printing device according to embodiments of the herein disclosed subject matter.

FIG. 10 shows a further printing device 400 according to embodiments of the herein disclosed subject matter.

According to an embodiment, the printing device 400 is configured for direct printing on a substrate 210. Similar to the printing device 301 shown in FIG. 4, the printing device 400 comprises one or more printing units, e.g. three printing units 224, 225, 226 as shown in FIG. 10. The printing units 224, 225, 226 may be configured similarly or identically to the printing units described with regard to FIG. 4 except that the printing units are configured (e.g. positioned for a applying its coating material to the substrate 210 (and in particular to a surface 211 of the substrate 210) to thereby form the coating layer 206 directly on the substrate 210. In this regard the surface 211 of the substrate 210 forms a target surface according to the herein disclosed subject matter. Accordingly, corresponding elements are indicated with identical reference numbers and that the description thereof is not repeated here. Further it is noted, that any process described with regard to FIG. 4 may also be performed with regard to embodiments described with regard to FIG. 10, except that referring to the transfer element 204 reference is made to the substrate 210 (due to the direct printing process) and instead of referring to making contact of the coating layer and the substrate reference is made to the final curing. The same is applicable vice versa.

The printing device 400 further comprises a curing device 402 for finally curing the coating layer 206 on the substrate 210. Further, the printing device 400 comprises a transfer device 404 which is configured for transferring the substrate 210 to the printing units 224, 225, 226 and subsequently (in a direction 410) to the curing device 402 and, optionally to further devices (e.g. 229, 232 described below) of the printing device 400, if present. According to an embodiment, the transfer device 404 comprises a conveyor belt 406 which extends about two spaced apart pulleys 408.

Different from what is shown in FIG. 10 the curing device 402 can also be located in a separate location. Furthermore the substrate 210 could also be preheated due to the fact that it was pre-coated before with a powder coating and directly after curing the substrate is given to the printing device 400. The same could also be the case when indirect printing is done.

In a special embodiment a pre-coating (not shown in FIG. 10) was not—at least fully cured—before the coating material 237 was applied on the substrate (in this case the pre-coating can be assumed to be the substrate). This pre-coat can be applied by NIP or by conventional means like powder coating or liquid coating. In the same or another embodiment the coating layer was—at least fully cured—before a top coat (not shown) was applied on the coating layer. This top coat can be applied by NIP or by conventional means like powder coating or liquid coating.

According to an embodiment, the printing device 400 comprises an energy transfer device 229 for transferring energy 230, e.g. in the form of infrared radiation, into the coating layer 206 on the substrate 210. According to an embodiment, the energy 230 is provided at a rate sufficient to induce viscous flow in the coating layer 206 on the substrate 210. According to another embodiment, the energy 230 is provided at the rate sufficient to partially cure the coating layer 206 on the substrate 210.

According to a further embodiment, inducing viscous flow or partial curing may be performed after application of each individual coating material. To this end, for example according to an embodiment and energy transfer device 229 may be provided after each printing unit 224, 225, 226 (not shown).

Further, according to an embodiment, a compaction device 232 is provided, wherein the compaction device is configured for compacting the coating layer 206 on the substrate 210 before the final curing of the coating layer 206. The operation of a roller 234 of the compaction device 232 in FIG. 10 is similar or identical to the operation described with regard to the compaction device 232 of FIG. 4. Accordingly, the same reference numbers are used in the description thereof is not repeated here.

According to an embodiment, after each printing unit (in conveying direction 410 of the transfer element/substrate) a compaction device may be located for compacting a coating layer before a further coating layer is applied on the coating layer.

For controlling the entities and devices of the printing device 400, a control device 216 according to embodiments of the herein disclosed subject matter is provided.

FIG. 11 shows a further printing device 500 according to embodiments of the herein disclosed subject matter.

Some entities (or features) of the printing device 500 which are similar to entities (or features) of the printing device 400 of FIG. 10 are indicated with the same reference signs and the description thereof is not repeated here. Rather, some differences which are in accordance with embodiments of the herein disclosed subject matter are described with regard to FIG. 11.

The printing device 500 comprises one or more printing units 524, 525. The printing units 524, 525 do not include an intermediate transfer element as described with regard to FIG. 4. Rather, the printing units 524, 525 only comprise an OPC 227. In accordance with an embodiment, the printing units 524, 525 are configured for applying the coating material from the OPC 227 directly to the target surface, e.g. directly to the substrate 210 (direct printing).

According to an embodiment, one or more coating layers, in particular two or more coating layers 206, 207 are applied to the target surface (e.g. of the substrate 210, as shown in FIG. 11) in order to provide a thicker layer package 274 (and hence a larger thickness of the final coating). In particular, with two or more coating layers 206, 207 larger thickness variations of the layer package 274 are possible. According to an embodiment, for each coating layer a separate printing unit 524, 525 is provided. If the two or more printing units 524, 525 receive the same coating material 237, a single-color layer package with a thickness according to embodiments may be obtained. It is noted that FIG. 11 shows the printing device 500 at an instant in time where the coating 206 has already been entirely applied by a first printing unit 524 and wherein the further coating layer 207 has been partly applied by the second printing unit 525.

In accordance with an embodiment, the printing device 500 may be a standalone printing device. According to an embodiment the substrate 210 with the layer package 274 applied thereon is removable from the printing device for storage or for transport to a curing device (not shown in FIG. 11).

According to an embodiment, the surface structure of the layer package is provided by suitably controlling the at least one printing unit 524, 525 of the printing device, to provide two or more coating layers 206, 207 with different spatial coverage, as described with regard to FIG. 4. In accordance with a further embodiment, the roller 234 of the compaction device 232 may have a structured surface to therefor emboss the desired surface structure into the layer package 274.

It is noted that in accordance with embodiments of the herein disclosed subject matter, one or more entities (e.g. printing device, printing units, energy transfer device, compaction device, etc.) disclosed with regard to the drawings may be considered as be belonging to a processing device as described herein.

Figure 12:
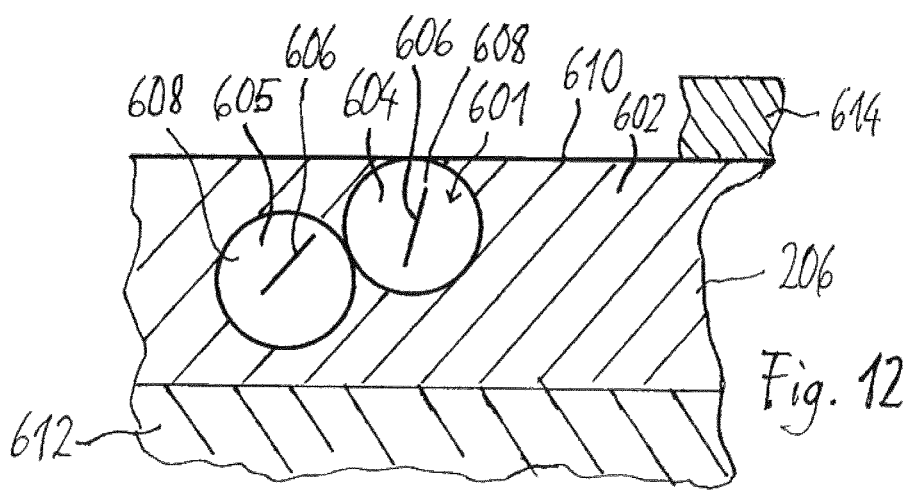
FIG. 12 shows a part of a coating layer according to embodiments of the herein disclosed subject matter.

FIG. 12 shows a part of a coating layer 206 according to embodiments of the herein disclosed subject matter.

In accordance with an embodiment, the coating material and hence the coating layer 206 generated therefrom comprises a first material portion 601 and a second material portion 602.

According to an embodiment, the first material portion 601 comprises or consists of at least one effect particle 604, 605. In accordance with an embodiment, each effect particle 604, 605 comprises at least one (at least partially covered) effect pigment 606, the effect pigment 606 being at least partially covered by a curable polymeric matrix 608. According to an embodiment the curable polymer matrix 608 may be configured and/or treated (e.g. regarding composition, heat treatment, partial curing, etc.) according to embodiments being related to the further coating layer disclosed herein.

According to a further embodiment, the second material portion 602 is a coating material configured according to embodiments of the herein disclosed subject matter which do not refer to the effect particles.

According to an embodiment, a first effect particle 604, which is located in a vicinity of a surface 610 of the coating layer, is also located in the vicinity of a second effect particle 605, thus providing a channel of low absorption of visible light from an effect pigment of the second particle 605 to the surface 610. In this regard the term "in the vicinity of"
includes "in contact with" or within a distance of less than 0.1 µm, e.g. less than 1 µm or in particular less than 10 µm.

According to an embodiment, the coating layer 206 is applied to a substrate (not shown in FIG. 12) which comprises a base coat 612. Further, the coating layer 206 may be covered with a top coat 614 according to embodiments of the herein disclosed subject matter.

EXAMPLES

In the following exemplary examples are described which further illustrate embodiments of the herein disclosed subject matter.

In the following, whenever digital powder is mentioned this refers to the coating material (for Non-impact printing/NIP) according to embodiments of the herein disclosed subject matter. Parts of a composition are parts by weight.

Examples

In order to produce the following toner examples, all components were premixed in a high-speed mixer for 1 min, followed by extrusion in a twin-screw ZSK-18 extruder. The melted compound was cooled down, granulated and finely ground to produce a powder with the desired grain size distribution. The preferred grinding and classification was done by jet-milling with a Multino M/S/N opposed jet mill from NOLL if not stated otherwise. Before printing silica (0.5% HDK H05 TD+1% HDK H30 ™ from Wacker Silicones) was bonded to the powders using a Henschel Mixer MB10.

Example 1—PES-PT910

The mixture was composed of 600 parts of Uralac® P3490 (DSM), a saturated carboxylated polyester resin, 45 parts of Araldite® PT-910 (Huntsman), 8 parts of Accelerator DT-3126 (Huntsman), 7 parts of Benzoin and 13 parts of charge control agent salicylic acid DL-N24 (Hubei DingLong Chemical Co., Ltd). This composition gave a transparent formulation. For different colours (Cyan, Magenta, Yellow, Black and White) 33 parts of Heliogen Blue K7090 (BASF) for cyan, 33 parts of Cinquasia Violet L5120 (BASF) for magenta, 106 parts of Sicopal Yellow L1100 (BASF) for yellow, 33 parts of Printex 90 BEADS (Orion Engineered Carbons) for black or 200 parts of TI Select TS6200 (DuPont) for white were added. All components were premixed in a high-speed mixer for 1 min and then extruded in a twin-screw ZSK-18 extruder. The compound obtained was then cooled down, granulated, fine ground and classified to obtain a powder having a D50 of up to 12 µm if not otherwise described.

Hardening (curing the coating layer on the substrate) was done at a temperature of 200° C. for 10 minutes.

Example 2—PES-Primid (Super Durable)

The mixture was composed of 650 parts of Uralac P3230, a saturated polyester resin, 49 parts of Primid XL 552 (EMS Chemie), 7 parts of Benzoin and 14 parts of charge control agent salicylic acid DL-N24 (Hubei DingLong Chemical Co., Ltd). This composition gave a transparent formulation. For different colours (Cyan, Magenta, Yellow, Black and White) 32 parts of Heliogen Blue K7090 (BASF) for cyan, 32 parts of Cinquasia Violet L5120 (BASF) for magenta, 100 parts of Sicopal Yellow L1100 (BASF) for yellow, 32 parts of Printex 90 BEADS (Orion Engineered Carbons) for black or 190 parts of TI Select TS6200 (DuPont) for white were added. All components were premixed in a high-speed mixer for 1 min and then extruded in a twin-screw ZSK-18 extruder. The compound obtained was then cooled down, granulated, fine ground and classified to obtain a powder having a D50 up to 12 µm if not otherwise described.

Hardening was done at a temperature of 200° C. for 5 minutes.

Example 3—PUR

The mixture was composed of 500 parts Uralac® P 1580 (DSM), a saturated OH-polyester resin, 215 parts of Vestagon® B 1530 (Evonik), and 14 parts of charge control agent salicylic acid DL-N24 (Hubei DingLong Chemical Co., Ltd). This composition gave a transparent formulation. For different colours (Cyan, Magenta, Yellow, Black and White) 36 parts of Heliogen Blue K7090 (BASF) for cyan, 36 parts of Cinquasia Violet L5120 (BASF) for magenta, 114 parts of Sicopal Yellow L1100 (BASF) for yellow, 36 parts of Printex 90 BEADS (Orion Engineered Carbons) for black or 215 parts of TI Select TS6200 (DuPont) for white were added. All components were premixed in a high-speed mixer for 1 min and then extruded in a twin-screw ZSK-18 extruder. The compound obtained was then cooled down, granulated, fine ground and classified to obtain a powder having a D50 up to 12 µm if not otherwise described.

Hardening was done at a temperature of 200° C. for 15 minutes.

Example 4—PES-TGIC

The mixture was composed of 790 parts Uralac® P 6401 (DSM), a saturated carboxylated polyester resin, 60 parts of TGIC (Huntsmann), 5 parts of Benzoin and 17 parts of charge control agent salicylic acid DL-N24 (Hubei DingLong Chemical Co., Ltd). This composition gave a transparent formulation. For different colours (Cyan, Magenta, Yellow, Black and White) 43 parts of Heliogen Blue K7090 (BASF) for cyan, 43 parts of Cinquasia Violet L5120 (BASF) for magenta, 137 parts of Sicopal Yellow L1100 (BASF) for yellow, 43 parts of Printex 90 BEADS (Orion Engineered Carbons) for black or 257 parts of TI Select TS6200 (DuPont) for white were added. All components were premixed in a high-speed mixer for 1 min and then extruded in a twin-screw ZSK-18 extruder. The compound obtained was then cooled down, granulated, fine ground and classified to obtain a powder having a D50 up to 12 µm if not otherwise described.

Hardening was done at a temperature of 200° C. for 10 minutes.

Example 5—PES-Epoxy

The mixture was composed of 350 parts of Uralac® P 3450 (DSM), a saturated carboxylated polyester resin, 150 parts of Araldite® GT 7004 (Huntsmann), 4 parts of Benzoin and 10 parts of charge control agent salicylic acid DL-N24 (Hubei DingLong Chemical Co., Ltd). This composition gave a transparent formulation. For different colours (Cyan, Magenta, Yellow, Black and White) 25 parts of Sunfast Blue 15:4 (SunChemical) for cyan, 25 parts of Quindo Magenta (SunChemical) for magenta, 25 parts of Fanchon Yellow 180 (SunChemical) for yellow, 13 parts of NiPex 60 (Orion Engineered Carbons) for black or 150 parts of TI Select TS6200 (DuPont) for white were added. All components were premixed in a high-speed mixer for 1 min and then extruded in a twin-screw ZSK-18 extruder. The compound obtained was then cooled down, granulated, fine ground and classified to obtain a powder having a D50 up to 12 µm if not otherwise described.

Hardening was done at a temperature of 160° C. for 15 minutes.

Example 6—Unsaturated PES-UV System as Example for Potential UV Curable System which can be Incorporated into the Coatings According to the Invention The mixture was composed of 350 parts of UVECOAT 2100 (Allnex), an unsaturated polyester resin, 13 parts of photo initiators, 2 parts of Benzoin and 7 parts of charge control agent salicylic acid DL-N24 (Hubei DingLong Chemical Co., Ltd). This composition gave a transparent formulation. For different colours (Cyan, Magenta, Yellow, Black and White) 18 parts of Sunfast Blue 15:4 (SunChemical) for cyan, 18 parts of Quindo Magenta (SunChemical) for magenta, 18 parts of Fanchon Yellow 180 (SunChemical) for yellow, 9 parts of NiPex 60 (Orion Engineered Carbons) for black or 110 parts of TI Select TS6200 (DuPont) for white were added. All components were premixed in a high-speed mixer for 1 min and then extruded in a twin-screw ZSK-18 extruder. The compound obtained was then cooled down, granulated, fine ground and classified to obtain a powder having a D50 up to 12 µm if not otherwise described.

Hardening was done at a temperature of 140° C. for 2 minutes under UV light with a dose of 2.5 J/cm$^2$.

Example 7—PES-Epoxy

The mixture was composed of 440 parts of Crylcoat 1501-6 (Allnex), a saturated polyester resin, 290 parts of Araldite® GT7220 (Huntsman), 25 parts of Reafree C4705-10 (Arkema), 10 parts of Eutomer B31 (Eutec Chemical), 2 parts of Tinuvin 144 (BASF) and 15 parts of charge control agent salicylic acid DL-N24 (Hubei DingLong Chemical Co., Ltd). This composition gave a transparent formulation. For different colours (Cyan, Magenta, Yellow, Black and White) 38 parts of Sunfast Blue 15:4 (SunChemical) for cyan, 38 parts of Quindo Magenta (SunChemical) for magenta, 38 parts of Fanchon Yellow 180 (SunChemical) for yellow, 19 parts of NiPex 60 (Orion Engineered Carbons) for black or 230 parts of TI Select TS6200 (DuPont) for white were added. All components were premixed in a high-speed mixer for 1 min and then extruded in a twin-screw ZSK-18 extruder. The compound obtained was then cooled down, granulated, fine ground and classified to obtain a powder having a D50 up to 12 µm if not otherwise described.

Hardening was done at a temperature of 135° C. for 5 minutes using an infrared oven.

Example 8—PES-Primid (Durable)

The mixture was composed of 600 parts of Uralac P865, a saturated polyester resin, 32 parts of b-Hydroxyalkylamide (EMS Chemie), 6 parts of Benzoin and 12 parts of charge control agent salicylic acid DL-N24 (Hubei DingLong Chemical Co., Ltd). This composition gave a transparent formulation. For different colours (Cyan, Magenta, Yellow, Black and White) 25 parts of Heliogen Blue K7090 (BASF) for cyan, 25 parts of Cinquasia Violet L5120 (BASF) for magenta, 80 parts of Sicopal Yellow L1100 (BASF) for yellow, 25 parts of Printex 90 BEADS (Orion Engineered Carbons) for black or 150 parts of TI Select TS6200 (DuPont) for white were added. All components were premixed in a high-speed mixer for 1 min and then extruded in a twin-screw ZSK-18 extruder. The compound obtained was then cooled down, granulated, fine ground and classified to obtain a powder having a D50 up to 12 µm if not otherwise described.

Hardening was done at a temperature of 170° C. for 15 minutes.

Example 9—Acrylics

The mixture was composed of 405 parts of Fine-Clad A-253 (Reichhold), a glycidyl acrylic resin, 95 parts of dodecanedioic acid (DuPont), 5 parts of Benzoin and 10 parts of charge control agent salicylic acid DL-N24 (Hubei DingLong Chemical Co., Ltd). This composition gave a transparent formulation. For different colours (Cyan, Magenta, Yellow, Black and White) 25 parts of Heliogen Blue K7090 (BASF) for cyan, 25 parts of Cinquasia Violet L5120 (BASF) for magenta, 80 parts of Sicopal Yellow L1100 (BASF) for yellow, 25 parts of Printex 90 BEADS (Orion Engineered Carbons) for black or 150 parts of TI Select TS6200 (DuPont) for white were added. All components were premixed in a high-speed mixer for 1 min and then extruded in a twin-screw ZSK-18 extruder. The compound obtained was then cooled down, granulated, fine ground and classified to obtain a powder having a D50 up to 12 µm if not otherwise described.

Hardening was done at a temperature of 150° C. for 20 minutes.

Example 10—PES-Epoxy (Crystalline Resin Added)

The mixture was composed of 259 parts of Polyester 1, a saturated carboxylated polyester resin with an acid value between 68 and 76 mg KOH/g and a viscosity between 2.0 and 3.5 Pa*s, 226 parts of D.E.R. 642U (Dow Chemicals), an epoxy resin, 160 parts of Sirales PE 5900 (SIR Industriale), a crystalline resin, 15 parts of Eutomer B31 (Eutec Chemical) and 13 parts of charge control agent salicylic acid DL-N24 (Hubei DingLong Chemical Co., Ltd). This composition gave a transparent formulation. For different colours (Cyan, Magenta, Yellow, Black and White) 32 parts of Sunfast Blue 15:4 (SunChemical) for cyan, 32 parts of Quindo Magenta (SunChemical) for magenta, 32 parts of Fanchon Yellow 180 (SunChemical) for yellow, 16 parts of NiPex 60 (Orion Engineered Carbons) for black or 190 parts of TI Select TS6200 (DuPont) for white were added. All components were premixed in a high-speed mixer for 1 min and then extruded in a twin-screw ZSK-18 extruder. The compound obtained was then cooled down, granulated, fine ground and classified to obtain a powder having a D50 up to 12 µm if not otherwise described.

Hardening (curing) was done at a temperature of 130° C. for 5 minutes using an infrared oven.

1. Tropical Test

In this segment described is the procedure used to test the adhesion of a coating or printing over different surfaces, coated or not coated.

The procedure follows the norm: EN ISO 6270-1 and EN ISO 6270-2.

Examples of different results:

Sample 1:

Example 7 Magenta after more than 1008 h at 40° C. and 100% humidity and doing the Cross Cut test (EN ISO 2409) there is no delamination of the printing from the base coat (Powder coating based on polyester in combination with b-Hydroxyalkylamide). It shows a really good adhesion to the substrate.

Sample 2:

Example 7 Magenta with a smaller PSD compared to Sample 1 (see table I below) after more than 1008 h at 40° C. and 100% humidity and doing the Cross Cut test (EN ISO 2409) there is no delamination of the printing from the base coat (Powder coating based on polyester in combination with b-Hydroxyalkylamide). It shows a really good adhesion to the substrate.

Sample 3:

Example 7 CMYK with a PSD described in the table with no pretreatment failed the test 336 h at 40° C. and 100% humidity doing the Cross Cut test (EN ISO 2409). There is delamination of the printing from the substrate of the ceramic tile. It shows no good adhesion to the substrate.

The results are summarized in the table below:

TABLE I

Summary of tropical test results

| Sample | Substrate | Base Coat | Digital Powder | PSD (µm) | printing coating thickness (µm) | TT 336 h (2nd week in) Adhesion | | | TT 1008 h + 1 day outside Adhesion | | |
|---|---|---|---|---|---|---|---|---|---|---|---|
| | | | | | | nail | cross-hatch | Visual control | nail | cross-hatch | Visual control |
| 1 | Aluminium | Powder Coating | Example 7 Magenta | d10 = 7-8; d50 = 11-12; d90 = 15-16 | 8-10 | ok | GT0 | ok | ok | GT0 | ok |
| 2 | Aluminium | Powder Coating | Example 7 Magenta | d10 = 6-7; d50 = 9-10; d90 = 13-14 | 8-10 | ok | GT0 | ok | ok | GT0 | ok |
| 3 | Ceramic Tile | — | Example 7 CMYK | d10 = 8-9; d50 = 12-13; d90 = 19-20 | 15-25 | not passed | GT5 | ok | — | — | — |

2. Pretreatment of Substrates

In this segment described is that in general any substrate can be printed if the temperature tolerance of the material can withstand the curing process (hardening temperatures) needed by the digital powder used in that case. Another topic is the adhesion of each coating or printing on the surface of the substrate. As a regular way to test this adhesion the combination of a couple of tests is used:

TABLE II

Test normatives used for testing pretreatment of substrates

| | | |
|---|---|---|
| "Tropical-Test" | EN ISO 6270-1 | Paints and varnishes-Determination of resistance to humidity-Part 1: Continuous condensation |
| "Gitterschnitt" | EN ISO 2409 | Paints and varnishes-Cross-cut test |

Powder Coated Surfaces:
In general any powder coated substrate (substrate with base coat made by conventional powder coating) can be printed with no pretreatment. Just a simple cleaning with isopropanole to remove the possible dirtiness left by handling the materials.
The better or worse adhesion of the printing over the coated surface depends on how the chemistries of printing materials and the powder coatings fit.
Sample 1: Printing of Example 7 CMYK over a Powder Coated medium density fiberboard (MDF) with a white powder coating based on the combination of a polyester with an epoxy resin. The base coat was just cleaned and adhesion was good because the coating material (printing) comprises the same resin system like the pre-coating on the substrate.
Sample 2: Printing of Example 7 CMYK over a Powder Coated Aluminium with a white powder coating based on polyester in combination with b-Hydroxyalkylamide. The base coat was just cleaned and adhesion was sufficient.
Not Powder Coated Surfaces
For substrates with no base coat made by conventional powder coating a differentiation between metal, medium density fiberboards (MDF), glass, ceramic and plastic substrates has to be made. As a common step, all surfaces are first cleaned with a gun with pressured air to remove rests of dust over the surface and/or whipping with a textile material with isopropanol to remove the possible dirtiness left by handling in the case of metal, glass, ceramics and plastics.
Glass is subjected to a special pretreatment like with pyrosil flame and an adhesion promoter. Metal does not need any pretreatment, just the right temperature to fix the printing. MDF needs to be printed with a certain temperature to fix the printing but the temperature tolerance of the MDF must not be crossed to keep its mechanical properties. The best option with this materials is to use the infrared oven, this way only the surface of the MDF is heated and the evaporation of water is kept under control. Ceramic tiles can be printed with the help of temperature but to achieve a good adhesion extra pretreatments have to be done. Otherwise, the adhesion fails after certain time.
Sample 3: Printing of Example 7 CMYK over not coated glass with no pretreatment. Printing adheres to the surface but fails after a certain time with tropical test.
Sample 4: Printing of Example 7 CMYK on a ceramic tile with no pretreatment. Adhesion failed after 336 h with tropical test.

3. UV-Stability—Charge Control Agent
In this segment the procedures used to test the UV stability of toner materials are described. Modifications of Example 8 with different commercially available charge control agents (CCAs) with different thicknesses and differ-ent pigments were tested (see Table). The QUV tests were performed according to the following tests:

TABLE III

Test normatives for QUV tests

| | | |
|---|---|---|
| "UV stability" | | QUV Tests: remaining gloss after 300 hours of UV exposure according to the GSB International AL 631 - Part VII Segment 20.1 Kurzbewitterung UV-B (313) is at least 50%. |
| | EN ISO 16474-2 | Paints and varnishes - Methods of exposure to laboratory light sources - Part 2: Xenon-arc lamps |
| | EN ISO 16474-3 | Paints and varnishes - Methods of exposure to laboratory light sources - Part 3: Fluorescent UV lamps |

TABLE IV results of QUV tests

| Sample no | Pigment Colour | charge control agent | charge control agent amount [%] | Result |
|---|---|---|---|---|
| 1 | Magenta | Copy Charge (grey) | 2 | acceptable |
| 2 | | T99 (black) | 2 | good |
| 3 | | T77 (black) | 2 | bad |
| 4 | | TRH-BD (black) | 2 | acceptable |
| 5 | | DL-N24 (white) | 2 | good |
| 6 | | — | 0 | good |
| 1 | Black | T77 (black) | 2 | bad |
| 2 | | DL-N24 (white) | 2 | good |
| 3 | | DL-N24 + Copy Charge (grey) | 1.5 + 1.5 | good |
| 4 | | — | 0 | good |

The results show really good UV stability of the material without charge control agent, with DL-N24 (Ding Long) white charge control agent and with T99 black (Hodogaya). Also combinations of different charge control agents were tested not improving the best results of no charge control agent, DL-N24 and T-99.

Example 8: The results show really good UV stability of the material without charge control agent (samples 6 magenta and 4 black in Table IV), with DL-N24 (Ding Long) white charge control agent (samples 5 magenta and 2 black in Table IV) and with T99 black (Hodogaya) (samples 2 magenta in Table IV). The negative effect of the UV light over the surface of the plates (mainly the two belonging to T77 from Hodogaya) is a severe loss of gloss (samples 3 magenta and 1 black in Table IV).

4. UV Protection
In this segment it is describe the surprising effect of retention of gloss of a powder coated material Example 7 (this material cannot withstand the QUV test) after 300 h of UV exposure in a QUV test, when a top coat of a transparent powder coating formulation based on polyester in combination with b-Hydroxyalkylamide is applied. The top coat is applied with different thicknesses and curing treatments.

Usually, the UV stability of Example 7 is very poor but it was surprisingly found that a layer of UV stable powder coat on top helps to withstand the 300 h QUV test. The procedures for the QUV test are listed in table below:

TABLE V

Test and normatives for UV stability

| | | |
|---|---|---|
| "UV stability" | | QUV Tests: remaining gloss after 300 hours of UV exposure according to the GSB International AL 631 - Part VII Segment 20.1 Kurzbewitterung UV-B (313) is at least 50%. |
| | EN ISO 16474-2 | Paints and varnishes - Methods of exposure to laboratory light sources - Part 2: Xenon-arc lamps |
| | EN ISO 16474-3 | Paints and varnishes - Methods of exposure to laboratory light sources - Part 3: Fluorescent UV lamps |

The materials were cured in a convection oven with the following curing conditions:
Example 7: T=160° C.; t=15 min
Example 8: T=200° C.; t=15 min

TABLE VI

Coating parameters for testing UV stability

| Sample | Thickness [μm] Example 7 | Curing Example 7 | Top coat thickness [μm] Example 8 | Curing top coat Example 8 |
|---|---|---|---|---|
| A | 40 | Yes | — | — |
| B | 40 | Yes | 40 | Yes |
| C | 40 | Yes | 80 | Yes |
| D | 40 | No | 40 | Yes |
| E | 40 | No | 80 | Yes |

Results:

TABLE VII results of testing UV stability

| Sample | Start gloss (measured at 60°) | Final gloss | Retention [%] | Comments |
|---|---|---|---|---|
| A | 0.8 | 0.4 | 50 | Low gloss and low retention as expected |
| B | 93.6 | 93.4 | 99.7 | Good gloss, retention and surface |
| C | 87 | 95.1 | 106 | Good gloss, retention and not perfect surface |
| D | 7.5 | 6.2 | 83 | Really bad surface |
| E | 62.5 | 53.8 | 86 | Really bad surface |

For a good surface the materials need separated curing like a primer+curing followed to top coat+curing. With those tests the combination of a transparent top coat of an UV stable formulation (polyester in combination with b-Hydroxyalkylamide) and a color base coat of a usually non-UV stable formulation (Example 7) can withstand the QUV test. This transparent film brings an UV protection for outdoor applications.

Samples: Tests of a non-UV stable powder (Example 7) with ("sample B": 40 μm thickness; "sample C": 80 μm thickness) and without any transparent UV-stable top coat to compare ("Sample A").

On Sample A, without top coat, failure was observed. An area where the UV light was hitting the coating is clearly visible with lower gloss and color.

With the other two ("sample B" and "Sample C") that effect is not seen and furthermore the top coat increases the glossy effect of the original material.

5. Mechanical Tests

Surprisingly it was found that printed films of coatings of Examples 2, 3 and 7 can withstand the mechanical tests (given in the Table of test normatives) applied over different substrates with different thicknesses. Choosing the right combinations of Digital Powder, substrate and Powder coating, this offers a great opportunity to use those materials in any kind of Industrial Indoor and/or outdoor applications as a printed finishing with high mechanical properties, comparable to the properties of the base coat made with coated Powder Coating.

In a first step, all new formulations are tested as powder coatings following the norms listed in the table of test normatives. The table shows tests of Example 2 powder coated over aluminium plates.

TABLE VIII.a

Results for mechanical tests, Outdoor

| Example 2 DIGITAL Powder coated samples over aluminium plates | | | | Mechanical testing | | Adhesion Dorn-biege-test (mandrel bending test) | Scratch resistance Gitter-schnitt (cross-cut adhesion test) | Xenon UV-stability Retention [%] | test (1000 h) Retention [%] |
|---|---|---|---|---|---|---|---|---|---|
| Base coat | Coated color | Thickness (μm) | Curing rates (Convection) | "Erichsen tiefung" (Erichsen cupping) | Kugel-schlag (ball punch) | | | | |
| no base coat | Transparent | ca. 80 | 200° C. - 10' | OK | Slight cracks/ ok | OK | OK | 94 | 98.4 |

TABLE VIII.a-continued

Results for mechanical tests, Outdoor

| Example 2 DIGITAL Powder coated samples over aluminium plates | | | | Mechanical testing | | Test results | | | |
|---|---|---|---|---|---|---|---|---|---|
| | | | | | | Adhesion Dorn-biege-test (mandrel bending test) | Scratch resistance Gitter-schnitt (cross-cut adhesion test) | | Xenon test |
| Base coat | Coated color | Thickness (μm) | Curing rates (Convection) | "Erichsen tiefung" (Erichsen cupping) | Kugel-schlag (ball punch) | | | UV-stability Retention [%] | (1000 h) Retention [%] |
| no base coat | white | 60-70 | 200° C. - 10' | OK | Slight cracks/ok | Cracks | OK | 89 | 101.4 |
| no base coat | yellow | ca. 72 | 200° C. - 10' | OK | Slight cracks/ok | Cracks | OK | 89 | 98.2 |
| no base coat | magenta | ca. 60 | 200° C. - 10' | OK | Slight cracks/ok s | Cracks | OK | 94 | 98.3 |
| no base coat | cyan | 60-65 | 200° C. - 10' | OK | Slight cracks/ok | OK | OK | 93 | 102.9 |
| no base coat | black | ca. 75 | 200° C. - 10' | OK | Slight cracks/ok | cracks | OK | 93 | 99.6 |

TABLE VIII.b

Results for mechanical tests, Indoor

| Example 7 Indoor DIGITAL Powder, powder coated samples over aluminium plates | | | | Test results | | | | |
|---|---|---|---|---|---|---|---|---|
| | | | Curing | Mechanical testing | | Adhesion | Scratch resistance | |
| Base coat | Coated color | Thickness (μm) | rates (Convection) | Impact | Erichsen cupping | Cross cut 1 mm | Erichsen 0.5 Newton | Erichsen 1 Newton |
| Polyester - Epoxy Hybrid | Transparent | 60 | 150° C. - 10' | slight cracks | OK | GT 0 | OK | Borderline/OK |
| Polyester - Epoxy Hybrid | white | 60 | 150° C. - 10' | slight cracks | OK | GT 0 | OK | Borderline/OK |

TABLE VIII.c

Particle size distribution for coating materials subjected to mechanical and chemical tests

| PSD (μm) | d(10) | d(50) | d(90) |
|---|---|---|---|
| Example 2 transparent | 13.149 | 32.829 | 59.259 |
| Example 2 white | 13.077 | 32.107 | 56.986 |
| Example 2 yellow | 12.874 | 31.318 | 56.425 |
| Example 2 magenta | 12.723 | 31.826 | 57.612 |
| Example 2 cyan | 13.335 | 32.675 | 58.299 |
| Example 2 black | 13.922 | 33.39 | 59.472 |
| Example 7 transparent | 9.93 | 25.68 | 48.64 |
| Example 7 white | 12.26 | 26.39 | 46.77 |

In a second step, formulations of Table VIII.a and bare printed over different substrates and tested again with the same norms to see if the reduction of thickness affects the performance.

TABLE IX.a

Results for mechanical tests, Outdoor

| Example 2 Outdoor DIGITAL Powder, printed over powder coated aluminium plates | | | | Test results | | | | | |
| --- | --- | --- | --- | --- | --- | --- | --- | --- | --- |
| | | | | Mechanical testing | | Adhesion Dorn-biege-test (mandrel bending test) | Scratch resistance Gitter-schnitt (cross-cut adhesion test) | UV-stability Retention [%] | Xenon test (2000 h) Retention [%] |
| Powder Coating Base coat | Printing color | Thickness (μm) | Curing rates (Convection) | "Erichsen tiefung" (Erichsen cupping) | Kugel-schlag (ball punch) | | | | |
| Polyester Primid | black | 12-15 | 200° C. - 10' | OK | Slight cracks/OK | OK | OK | — | 91.7 |

TABLE IX.b

Results for mechanical tests, Indoor

| Example 7 Indoor DIGITAL Powder, printed over powder coated aluminium plates | | | | Test results | | | | |
| --- | --- | --- | --- | --- | --- | --- | --- | --- |
| | | | | Mechanical testing | | Adhesion Cross cut 1 mm | Scratch resistance | |
| Powder Coating Base coat | Printing color | Thickness (μm) | Curing rates (Convection) | Impact | Erichsen cupping | | Erichsen 0.5 Newton | Erichsen 1 Newton |
| Polyester - Epoxy Hybrid | cyan | 5-8 | 150° C. - 10' | detaching of basecoat | 3.9 mm | GT 0 | Passed | border-line |
| Polyester - Epoxy Hybrid | magenta | 5-8 | 150° C. - 10' | detaching of basecoat | 4.0 mm | GT 0 | — | — |
| Polyester - Epoxy Hybrid | yellow | 5-8 | 150° C. - 10' | detaching of basecoat | 3.9 mm | GT 0 | — | — |
| Polyester - Epoxy Hybrid | black | 5-8 | 150° C. - 10' | detaching of basecoat | 4.0 mm | GT 0 | passed | border-line |
| Polyester - Epoxy Hybrid | black/4 layers | 20-30 | 150° C. - 10' | detaching of basecoat | 0.7 mm | GT 0 | passed | border-line |
| Polyester - Epoxy Hybrid | black/4 layers | 20-30 | 150° C. - 10' | detaching of basecoat | 0.7 mm | GT 0 | — | — |
| Polyester Primid | cyan | 5-8 | 150° C. - 10' | slight cracks | 1.1 mm | GT 0 | borderline | not passed |
| Polyester Primid | magenta | 5-8 | 150° C. - 10' | slight cracks | 3.2 mm | GT 0 | — | — |
| Polyester Primid | yellow | 5-8 | 150° C. - 10' | slight cracks | 1.6 mm | GT 0 | — | — |
| Polyester Primid | black | 5-8 | 150° C. - 10' | slight cracks | 1.9 mm | GT 0 | borderline | not passed |

TABLE IX.c

Particle size distribution for coating materials subjected to mechanical and chemical tests

| PSD (μm) | d(10) | d(50) | d(90) |
| --- | --- | --- | --- |
| Example 7 yellow | 6.11 | 9.08 | 13.39 |
| Example 7 magenta | 5.93 | 8.87 | 13.18 |
| Example 7 cyan | 6.3 | 9.04 | 12.92 |
| Example 7 black | 6.27 | 8.95 | 12.73 |
| Example 2 black | 8.04 | 11.98 | 17.72 |

All results are comparable to the formulations tested as powder coatings.

Table of Test Normatives for Mechanical Tests:

TABLE X

Test normatives used for mechanical tests

| Tests | Standard | Name |
| --- | --- | --- |
| "Scratch Resistance" 0.5 or 1 Newton" | DIN 68861-4 | Furniture surfaces - Part 4 - Behavior at scratches |
| "Bleistifthärte" (pencil hardness) | EN ISO 15184 | Paints and varnishes - Determination of film hardness by pencil test |
| | ASTM D 3363 | Standard Test Method for Film Hardness by Pencil Test |
| "Erichsentiefung" (Erichsen cupping) | EN ISO 1520 | Paints and varnishes - Cupping test |

TABLE X-continued

Test normatives used for mechanical tests

| Tests | Standard | Name |
|---|---|---|
| "Gitterschnitt" (Cross-cut adhesion test) | EN ISO 2409 | Paints and varnishes - Cross-cut test |
| "Dornbiegetest" (mandrel bending test) | EN ISO 1519 | Paints and varnishes - Bend test (cylindrical mandrel) |
| "Kugelschlag" (ball punch) | ASTM D 2794 | Standard Test Method for Resistance of Organic Coatings to the Effects of Rapid Deformation |
| | EN ISO 6272-1 | Paints and varnishes - Rapid-deformation (impact resistance) tests - Part 1: Falling-weight test, large-area indenter |
| | EN ISO 6272-2 | Paints and varnishes - Rapid-deformation (impact resistance) tests - Part 2: Falling-weight test, small-area indenter |
| "UV stability" | | QUV Tests: remaining gloss after 300 hours of UV exposure according to the GSB International AL 631 - Part VII Segment 20.1 Kurzbewitterung UV-B (313) is at least 50%. |
| | EN ISO 16474-1 | Paints and varnishes - Methods of exposure to laboratory light sources - Part 1: General guidance |
| "Xenon test" | EN ISO 16474-2 | Paints and varnishes - Methods of exposure to laboratory light sources - Part 2: Xenon-arc lamps |
| | EN ISO 16474-3 | Paints and varnishes - Methods of exposure to laboratory light sources - Part 3: Fluorescent UV lamps |

6. Chemical Tests

Surprisingly, it was found that printed films of coatings of Examples 2, 3 and 7 can withstand the chemical tests (as given in the Table XV of chemical test normatives) applied over different substrates with different thicknesses. Choosing the right combinations of Digital Powder, substrate and Powder coating, this offers a great opportunity to use those materials in any kind of Industrial Indoor and/or outdoor application as a printed finishing with high chemical properties, comparable to the properties of the base coat made with coated Powder Coating.

In a first step, all new formulations are tested as powder coatings following the norms listed in the table of chemical test normatives. The table XI below, shows tests of Example 2 powder coated over aluminium plates.

TABLE XI.a

Results of chemical tests for substrates with Example 2 Outdoor coating material

| | Example 2 DIGITAL Powder, powder coated samples over aluminum plates | | | Test results Chemical testing | | |
|---|---|---|---|---|---|---|
| Base coat | Coated color | Thickness (μm) | Curing rates (Convection) | Isopropanole | Fuel | Schüco-Cleaner |
| no base coat | transparent | ca. 80 | 200° C. - 10' | OK | OK | OK |
| no base coat | white | 60-70 | 200° C. - 10' | OK | OK | OK |
| no base coat | yellow | ca. 72 | 200° C. - 10' | OK | OK | OK |
| no base coat | magenta | ca. 60 | 200° C. - 10' | OK* | OK* | OK* |
| no base coat | cyan | 60-65 | 200° C. - 10' | OK* | OK* | OK* |
| no base coat | black | ca. 75 | 200° C. - 10' | OK* | OK* | OK* |

*can be scratched easily

TABLE XI.b

Results of chemical tests for substrates with Example 7 Indoor coating material

| | Example 7 Serie DIGITAL Powder, powder coated samples over aluminium plates | | | Test results Chemical testing | | | |
|---|---|---|---|---|---|---|---|
| | | | | | | | 24 h |
| Base coat | Coated color | Thickness (μm) | Curing rates (Convection) | 1 h 48% Ethanol | 1 h Coffee | Liquid paraffin | 24 h Water |
| No base coat | transparent | 60 | 150° C. - 10' | passed | passed | passed | passed |
| No base coat | white | 60 | 150° C. - 10' | passed | passed | passed | passed |

TABLE XII

Particle size distribution for coating materials subjected to chemical tests

| PSD (μm) | d(10) | d(50) | d(90) |
|---|---|---|---|
| Example 2 transparent | 13.149 | 32.829 | 59.259 |
| Example 2 white | 13.077 | 32.107 | 56.986 |
| Example 2 yellow | 12.874 | 31.318 | 56.425 |
| Example 2 magenta | 12.723 | 31.826 | 57.612 |
| Example 2 cyan | 13.335 | 32.675 | 58.299 |
| Example 2 black | 13.922 | 33.39 | 59.472 |
| Example 7 transparent | 9.93 | 25.68 | 48.64 |
| Example 7 white | 12.26 | 26.39 | 46.77 |

In a second step, all formulations are printed over different substrates and tested again with same normatives to see if the reduction of thickness affects the performance. The table XIII shows tests of Example 7 printed over powder coated aluminium.

TABLE XIII.a

Results for chemical tests for substrates with Example 7 Indoor coating material Example 7 DIGITAL Powder, printed samples over Powder coated aluminium plates

| Base coat | Printing color | Thickness [μm] | Curing rates (Convect-ion) | 1 h 48% Ethanole | 1 h Coffee | Liquid paraffin | 24 h Water |
|---|---|---|---|---|---|---|---|
| Polyester in combination with Epoxy white | cyan | 5-8 | 150° C. - 10' | passed | passed | passed | passed |
| See above | magenta | 5-8 | 150° C. - 10' | passed | passed | passed | passed |
| See above | yellow | 5-8 | 150° C. - 10' | passed | passed | passed | passed |
| See above | black | 5-8 | 150° C. - 10' | passed | passed | passed | passed |
| See above | black/4 layers | 20-30 | 150° C. - 10' | passed | passed | passed | passed |
| See above | black/4 layers | 20-30 | 150° C. - 10' | passed | passed | passed | passed |
| Polyester + b-Hydroxyalkylamide white | cyan | 5-8 | 150° C. - 10' | passed | passed | passed | passed |
| See above | magenta | 5-8 | 150° C. - 10' | passed | passed | passed | passed |
| See above | yellow | 5-8 | 150° C. - 10' | passed | passed | passed | passed |
| See above | black | 5-8 | 150° C. - 10' | passed | passed | passed | passed |

TABLE XIII.b

Results for chemical tests for substrates with Example 2 Outdoor coating material Example 2 DIGITAL Powder, DIGITAL Powder, printed samples over Powder coated aluminium plates

| Powder Coating Base coat | Printing color | Thickness (μm) | Curing rates (Convection) | Isopropanole | Fuel | Schuco-Cleaner |
|---|---|---|---|---|---|---|
| Polyester Primid | black | 12-15 | 200° C. - 10'10 | OK | OK | OK |

TABLE XIV

Particle size distribution for coating materials subjected to chemical tests

| PSD (μm) | d(10) | d(50) | d(90) |
|---|---|---|---|
| Example 7 yellow | 6.11 | 9.08 | 13.39 |
| Example 7 magenta | 5.93 | 8.87 | 13.18 |
| Example 7 cyan | 6.3 | 9.04 | 12.92 |
| Example 7 black | 6.27 | 8.95 | 12.73 |
| Example 2 black | 8.04 | 11.98 | 17.72 |

Table of Chemical Test Normatives:

TABLE XV

Test normatives for chemical testing

| Test | Standard | Name |
|---|---|---|
| Chemical stability "Chemikalienbeständigkeit" | EN 12720 | Furniture - Assessment of surface resistance to cold liquids |
| | EN ISO 2812-1 | Paints and varnishes - Determination of resistance to liquids - Part 1: Immersion in liquids other than water |
| | EN ISO 2812-2 | Paints and varnishes - Determination of resistance to liquids - Part 2: Water immersion method |
| | EN ISO 2812-3 | Paints and varnishes - Determination of resistance to liquids - Part 3: Method using an absorbent medium |
| | EN ISO 2812-4 | Paints and varnishes - Determination of resistance to liquids - Part 4: Spotting methods |
| | EN ISO 2812-5 | Paints and varnishes - Determination of resistance to liquids - Part 5: Temperature-gradient oven method |

7. Film Hardness by Pencil Test

In this segment testing the film hardness via "pencil test" is decribed. A standard pencil was used for testing according to the norm given in the table. Examples 2 and 8 were tested and they were able to reach rating HB.

Table of Test Pencil Test Normatives:

TABLE XVI

Test normatives for pencil test

| "Bleistifthärte" (Pencil hardness) | EN ISO 15184 | Paints and varnishes - Determination of film hardness by pencil test |
|---|---|---|
| | ASTM D 3363 | Standard Test Method for Film Hardness by Pencil Test |

8. Chemical Stability IPA-MEK

In this segment tests are described using the basis of testing method EN 12720 but with different liquids and time. 30 seconds MEK (methyl ethyl ketone) and IPA (isopropanol). The base for the testing method is given in EN 12720.

High chemical resistant materials like Example 3 can even withstand the MEK test which is really one of the most critical chemical stability tests to a coating. All tested formulations according to the present invention were able to fulfill the IPA test.

It is observed that the MEK test fails with Example 7. Example 2 also fails MEK test but with better performance than the previous material. Example 3 fullfils the MEK test with just 5 μm thickness.

9. Microscope Observations—PSD

In this segment described are the different results obtained with printings regarding PSD (Particle Size Distribution) presenting some results obtained from pictures done with a Digital Microscope Camera, dnt DigiMicro 2.0 Scale.

The different PSDs come together with the mill and classification used for grinding in each case. A summary is presented in the table together with different PSD measurements.

Tested PSDs:

TABLE XVII

Tested particle size distributions (PSDs)

| Name | PSD | Mill |
|---|---|---|
| H0: | d10 = 6-8; d50 = 14-16; d90 = 24-26 | NEA Group Neumann & Esser GmbH. Typ ICM 2.4 |
| H6600: | d10 = 8-9; d50 = 12-13; d90 = 19-20 | Multino M/S/N opposed jet mill from NOLL |
| H7500: | d10 = 7-8; d50 = 11-12; d90 = 15-16 | Multino M/S/N opposed jet mill from NOLL |
| H9000: | d10 = 6-7; d50 = 9-10; d90 = 13-14 | Multino M/S/N opposed jet mill from NOLL |

As found herein the PSD is really important to achieve good printing results. Regularly, the smaller the diameter of the particles and the narrower the PSD, the more homogeneous is the sample of powder and the easier it is to control regarding powder charging and powder flowing. That leads to a better quality of the printing and a lower need of film thickness.

It is observed that the resolution and the quality are improving from H-0 to H-9000 because PSD is getting narrower and the diameter is getting smaller.

The limit of lowest diameter used with traditional mechanically produced toner is typically the limit of breathability of the particles. It is below 5 μm, where particles could be breathed directly into the lungs.

Nevertheless, one of the advantageous possibilities offered by the herein disclosed subject matter is the haptic-2,5D (relief) effect. In order to increase this effect, it is better to not reduce too much the particle size diameter to still keep good resolution and quality together with a better haptic effect. This was for example observed with pictures printed with a PSD H0. Hence, larger PSDs may be advantageous for a relief effect.

10. No Additives—Flow Leveling

In this segment described is the surprising benefit of not using flow and/or levelling additives usually used in Powder coating technology to produce Digital Powder formulations. An advantage comes with the special way to apply the coating to any surface, "printing it by dots". This printing by dots includes the more homogeneous PSD and the smaller diameter of the powder particles and also the more rounded shape of the powder particles. Without being bound to theory it is thought that these factors (homogeneous PSD, small diameter of the powder particles and more rounded shape of the powder particles (large sphericity)) help to get a more compacted film of the particles printed on a surface.

This way of application of the material, printing, makes possible, more important, the desired resolution of the images printed on the substrate before and after curing. Then, to try to keep the position of the printed particles and to avoid as much as possible any possible bleeding effect during curing could be mandatory. This fact and maybe together with a lower thickness of the film with a single printing run applied by printing, comparing with the thickness applied for Powder coating technology by spraying (around 60 μm to 80 μm to keep mechanical, chemical and corrosion protection) makes it possible to avoid those additives from the formulation and seems to be even preferred to be left out to keep high resolution.

This situation with relatively low thickness (compared to powder coatings) and application of dots offers also the possibility to remove any degassing agent from Digital Powder formulation of almost all resin systems. One special remark needs to be done with primid systems. Here, the formation of water during curing demands the use of a certain quantity of degassing agents in most cases tested.

Some images of examples have been taken with a Digital Microscope Camera, dnt DigiMicro 2.0 Scale.

PSD H-0 with additives over transfer foil: still not transferred and already cured. In the results, clearly visible bleeding effect has been observed.

PSD H-0 with additives transferred and cured. In the results, clearly visible bleeding effect has been observed as well.

PSD H-7500: no additives printed and cured. In the results, no bleeding effect has been observed.

11. No Filler

In this segment described is the benefit of not using fillers usually used in Powder coating technology to produce digital powder formulations (i.e. a coating material according to embodiments of the herein disclosed subject matter). Without being bound to theory it is thought that the printing results are better because of the higher homogeneity of the powder particles, therefore charging and flowing of solid particles is kept in a very good level.

12. Suitable Reactivity

Three different samples with different reactivities were prepared based on the formulation of example 7 to show the influence of reactivity on the final image as well as its preparation (Examples 7A, B and C). The low reactivity sample (Example 7C) was prepared without accelerator.

Formulations: Examples 7A to C: Here only the black formulations are shown.

TABLE XVIII

Coating material tested for suitable reactivity

| Ressources | Optimum reactivity Example 7A | Very high reactivity Example 7B | Low reactivity Example 7C |
|---|---|---|---|
| | % | % | % |
| Crylcoat 1501-6 | 56.36 | 54.87 | 56.35 |
| Araldite ® GT7220 | 38.19 | 38.13 | 39.16 |
| Eutomer B31 (Accelerator) | 0.95 | 2.5 | |
| charge control agent | 2 | 2 | 2 |
| NiPex 60 (Carbon Black) | 2.5 | 2.5 | 2.5 |
| Results | | | |
| Viscosity minimum/Pa s | 6156 | 50260 | 257.3 |
| Pill-flow - Tests/mm | 30 | 14 | 106 |

Results—Viscosity

The viscosity was determined using a Rheometer, like the "AR 2000ex", TA Instruments Ltd., measured at a defined heating rate. Dynamic modulus G' and loss modulus G" are measured and the viscosity η* is calculated from these two operators. The minimum viscosity measurements were performed for all of the samples (heating rate 5° C./min and when they are compared following results can be concluded. Additionally, the pill flow length was determined as described. This test provides results for the interaction of viscosity and reactivity of the powders and is therefore a good tool to describe the effects of resolution and image quality. If the reactivity is too high (high amount of accelerator) already pre-reaction occurs and the viscosity is really high already from the beginning. The final coating obtained from such a coating material has good resolution but protective coating requirements such as chemical resistance cannot be fulfilled sufficient for some industrial application. If reactivity is at the lower end of the limits described according to the invention the flow is high which gives a worse resolution and additionally other artefacts occur.

It was found that Example 7A exhibits a good viscosity and the requirements on the final image can be fulfilled. In summary, example 7B shows a too high reactivity and example 7C a viscosity at the lower limit which is not preferred especially for a coating system based epoxy and polyester resins.

13. Sphericity

In this segment described are the different results obtained with printings regarding sphericity.

Not using any additional special treatment, heat and/or mechanical to round particles, the different sphericity comes from the grinding, depending on the mill (jet mills up to 0.93, Hammer mills below of this range). Regarding sphericity, an ideal perfectly rounded particle has a value of 1.

In this situation, depending on which kind of Jet mill, the circularity/sphericity can go from 0.93 to 0.97 based on the information found from different mill suppliers.

The sphericity/circularity, can be measured with different commercially available equipments like for example the Malvern FPIA 3000.

An important point here is it was found that the circularity/sphericity of the particles is linked with the resolution and quality. It was found that with less spherical/circular particles in certain examples more pronounced haptic effects of the final cured printing could be found.

14. Chargeability Tables+Silica

In this segment described are the different results obtained testing Digital Powders with a q/m meter from Epping GmbH. This machine provides results comparing μC/gr vs time of activation using a soft blow with different quantities of toner into a mixing of toner+carrier.

The Charging test is runned as follows:

a. Q/M-Meter, Soft blow off with 20 μm-Sieve; 10 to 300 min of activation using a rolling machine.
b. Carrier reference is a commercially available Ferrite core carrier CBO3 from Büro Compunication Wagner GmbH (Reference)
c. 25 g of mixing of Carrier+digital powder (8% to 10% digital powder and hence 92% to 90% carrier, e.g. 8% or 10% of digital powder).

In general, toner (powder) flowing (cohesiveness) and charging can be different depending on particle size, PSD, charge control agent (type and quantity) and external additives (type and quantity).

A suitable way to work in development is to fix (select) all core materials first and then, in a second step, to test various concentrations of materials and kinds of external additives.

Of course working with different Series of materials, with different resin systems the combination of all those factors will be different in each case. But, at least as a starting point one standard process can be used.

Silica Bonding:

Silica bonding can be done with different kind of surface additives, individually or in combination of one or more. Like for example silicas.

Depending on the machine used, the settings of the mixing may differ, keeping always the temperature into the mixer controlled to avoid pre-reaction of the Powdery coating material. In this situation the materials, procedure and machine used are described below.

Maschine: Henschel Mixer MB10

Materials: Silica, quantity referred to the total weight of Digital Powder, mixed with a combination of commercially available Silicas to improve powder charging and powder flow (cohesiveness) like for example, 0.5% HDK H05 TD (Silica A)+1% HDK H30 ™ (Silica B) from Wacker Silicones.

Procedure: bonding each silica in a three steps process. Each step includes bonding 10 seconds at 3700 rpm and a pause of 5 seconds in between the steps.

TABLE XIX

Coating material for testing silica bonding

| MATERIAL | Speed (rpm) | time (sek) | intervalls |
|---|---|---|---|
| Digital Powder + Silica A | ~3700 | 10 | 3 |
| Digital Powder + Silica A + Silica B | ~3700 | 10 | 3 |
| T <40° C. | | | |

Figure 13:
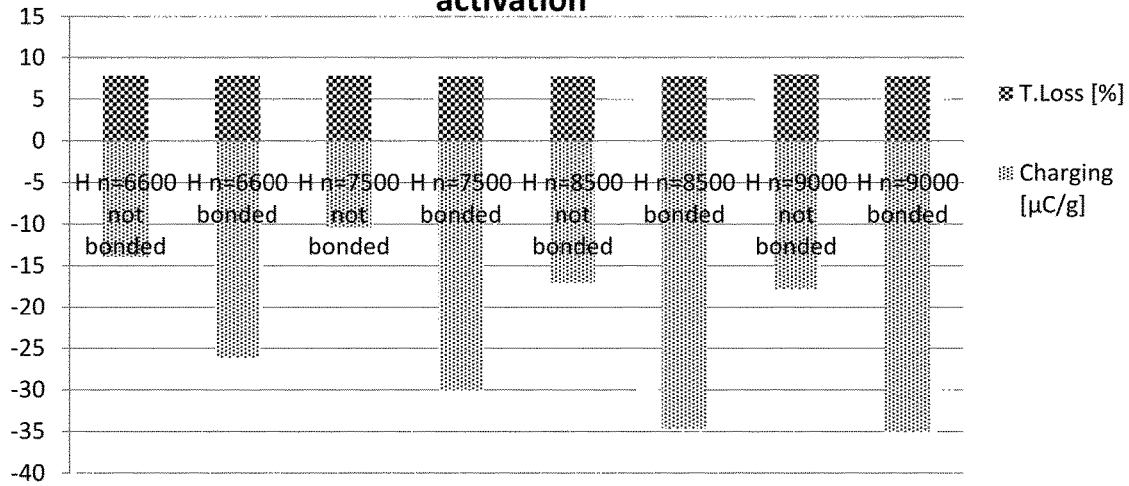
FIG. 13 shows results of adding silica in combination with different particle size distributions (PSDs) to a coating material according to embodiments of the herein disclosed subject matter.

The effect of adding silicas (referred to as "bonded" in FIG. 13) in combination with different PSDs was determined for example 7 magenta (different PSD)+silica bonding effect, used was a carrier with 8% digital powder. The results are shown in FIG. 13. The PSDs referred to in FIG. 13 are defined in table XVII above.

H8500 was in between H7500 and H9000 according to the PSD.

As a result, by reducing the PSD and using Silica bonding the charging improves.

Effect of Charge Control Agent in Combination with Silica:

Surprisingly, to add charge control agent into the formula did in particular not bring a strong effect of charging improvement, but surprisingly the color density of digital powders with a quantity lower than 2% of charge control agent drops dramatically down.

Using 2% charge control agent high color density has been observed. With 1% charge control agent only low color density has been observed.

Effect of different carriers: different kind of commercially available ferrite core carriers with different diameters and coating composition have been tested with different examples, colors and quantities of carrier-toner mixing.

An important result was that the good combination of Formulation-Silica-charge control agent and carrier, makes possible to have a very stable charging not only with short times of activation, also with a long term activation. Those good combinations have to be tested in each case.

15. Transfer

In this segment we describe the different results obtained testing Digital Powders with different transfer foils and different T (temperatures) and t (time). In order to get the best fixing of the powder over the transfer foil/paper during printing, there was performed a fast treatment around 1-2 seconds at a T above the curing temperature of each Digital Powder but with a low degree of curing avoiding the printed dot crosslinking with transfer foil surface. The curing temperature here is defined as the starting point of curing measured via differential scanning calorimetry at a heating rate of 20 K/min.

The materials used to run those tests are listed below:

Digital Powder: Example 7 magenta, Example 3 black

Final substrate: Aluminium powder coated with Polyester primed powder coating white.

TABLE XX

Transfer foil materials for testing effect of transfer foil

| Format | Foil | Producer | Thickness (μm) | Material | Surface | DSC-Measurement |
|---|---|---|---|---|---|---|
| DIN A4 | Hostaphan MT 50 | Mitsubishi Polyester | 50 | PET biaxial stretched | Matt | Melting point ~256° C. |
| DIN A4 | Hostaphan RNK 75 | Mitsubishi Polyester | 75 | PET biaxial stretched | High transparent | Melting point ~256° C. |
| DIN A4 | Hostaphan STK 75 | Mitsubishi Polyester | 75 | PET biaxial stretched | Supermatt | Melting point ~256° C. |
| DIN A4 | Hostaphan STK 50 | Mitsubishi Polyester | 50 | PET biaxial stretched | supermatt | Melting point ~256° C. |

The Transferring Step:

Above Tg but below melting point (where applicable with (semi)crystalline resins), where the material can be in its supercooled liquid state the combination of temperature T, time t and pressure P (T-t-P) makes a really big difference regarding resolution. The duration of the treatment is crucial. Too long treatments allows the powder to flow/bleed, losing the sharpness of the images.

A series of tests with different settings regarding T-t and keeping P constant were run.

First Test done with material Example 7 magenta at 150° C. for 1 min with RNK 75 foil (in this case a highly reactive coating was used were the curing normally already starts at least at 120 to 130° C.)→system showed too much pre-reaction. As a result the powder melted and crosslinked onto the plate creating a bleeding effect because of the P. The crosslinking with a small quantity of material occurred on the foil, creating a really strong adhesion of the powder to foil's surface.

Figure 14:
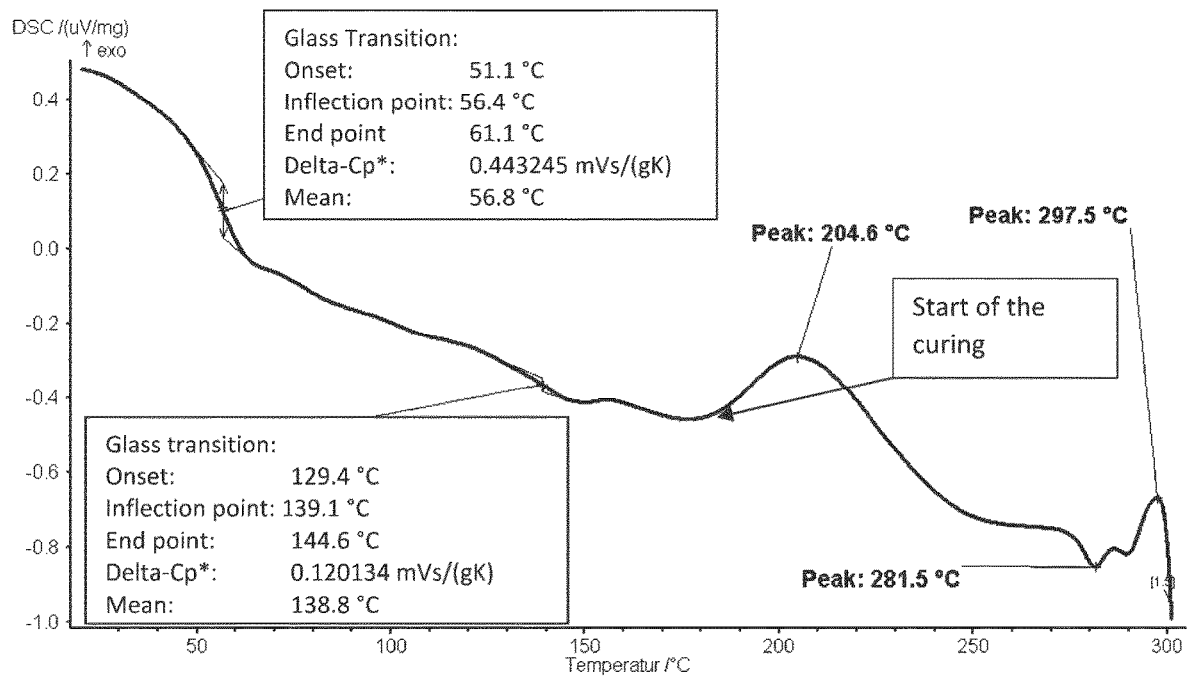
FIG. 14. shows an exemplary DSC scan of a coating material according to embodiments of the herein disclosed subject matter.

Second Test done with material Example 3 Black (Polyurethane based) at 120° C. for 30 seconds with RNK 75→system showed bad delamination from the foil and high loss of resolution due the increased flow at this high temperature. In this case no pre-reaction happened as here the reaction starts at about 170° C. according to the DSC measurement shown in FIG. 14.

(Further info obtained with this DSC measurement: An onset of glass transition is observed at 51.1° C. (inflection point at 56.4° C.; end point at 61.1° C.; Delta-Cp 0.443245 mVs/(gk); mean: 56.8° C.). Further onset of glass transition is observed at 129.4° C. (inflection point at 139.1° C.; End point at 144.6° C.; Delta-Cp 0.120134 mVs/(gk); mean: 138.8° C.). Exothermal peaks are observed at 204.6° C. and 297.5° C. An endothermal peak is observed at 281.5° C.).

Third test done with material Example 7 magenta at 150° C. for 3 min with different kind of foils (STK 50, RNK 75 and MT 50) (in this case a high reactive coating was used were the curing normally already starts at least at 120 to 130° C.)→system showed a too high degree of curing and started the printed dot crosslinking with the transfer foil surface, consequently the transfer of material to the substrate was not possible. This effect was stronger with STK 50 foil, where plenty of material remained on the foil after release. Instead, RNK 75 and MT 50 kept much less powder on their surfaces after release. In all three cases, powder was bleeding on the surfaces of the plates after transferring.

Fourth Test done with material Example 7 magenta at 80° C. for 1 min with RNK 75 foil (in this case a high reactive coating was used were the curing normally already starts at least at 120 to 130° C.)→here in the supercooled state the transfer was much better and the printing quality is kept in higher degree. The sample spots from low to high gradient of color showed a corresponding continuous increasing of printed layer thickness, which showed surprisingly that the transfer quality was improved with higher material thickness. This example showed a better combination of T-t-P. Here material flow or bleed was kept and the final sharpness of the image was higher.

Summarizing:

The pringing quality can be improved by selecting the correct transfer foil/paper.

Best results are obtained with the transfer to the substrate occuring in the supercooled state (commented in Fourth test) and aligned combination of heating rate and curing to prevent the flowing and/or bleeding of the printed dots.

In order to help to achieve the best dot printing fixation over the transfer foil and post transference of those dots from the transfer to the final surface and keep the previous commented alignment, a fast pre-curing can additionally be used which prevents the flow of the print during and before the curing happens. This can be achieved by adjusting the quantity of a high reactivity catalyst and/or crosslinker so as to allow the partial-curing to take place already at low temperatures but is not in a suitable amount to make a full curing; and a not so reactive curing catalyst/crosslinker for the final full curing. In other words, according to a special embodiment, the curing agent of the coating material comprises a first curing agent and a second curing agent, wherein at a certain (predetermined) temperature the reactivity provided by the first curing agent is higher than the reactivity provided by the curing agent. According to a further embodiment an amount of the first curing agent is different (e.g. lower), e.g. by a factor x, than an amount of the second curing agent. According to an embodiment, the factor x is chosen such that the precuring initiated by the first curing agent at the certain temperature and within a desired time window is effected to the desired amount. So for example one option could be to implement a certain concentration of unblocked Isocyanate crosslinkers which are known to react very fast but only in a concentration which leads only to a partial curing which prevents further flow. Another option would be to implement UV curing into each formulation of Digital Powder and adjust the light energy, the UV initiator concentration and or the time in a way which prevents full curing. Then the UV reaction is fast enough to stop flow of the material and allows high resolution transfer which is furthermore more stable against environmental effects which can harm the resolution before the final curing on the substrate.

FINAL REMARKS

It is noted, that depending on the composition of the coating material, the coating material may have more than one melt temperature, e.g. if different components or phases of the coating material have different melt temperatures. In such a case, the "melt temperature" referred to in embodiments of the herein disclosed subject matter is the lowest melt temperature out of the two or more different melt temperatures.

Likewise, depending on the composition of the coating material, the coating material may have more than one curing temperature, e.g. if different components or phases of the coating material cure at different temperatures. In such a case, the "curing temperature" referred to in embodiments of the disclosed subject matter is the lowest curing temperature out of the two or more different curing temperatures of a thermal curing system.

Likewise, depending on the composition of the coating material, the coating material may have more than one glass transition temperature, e.g. if different components or phases of the coating material undergo the glass transition at different temperatures. In such a case, the "glass transition temperature" referred to in embodiments of the herein disclosed subject matter is the lowest glass transition temperature out of the two or more different glass transition temperatures.

It should be noted that any entity disclosed herein (e.g. components, elements and devices) are not limited to a dedicated entity as described in some embodiments. Rather, the herein disclosed subject matter may be implemented in various ways and with various granularity on device level or software module level while still providing the specified functionality. Further, it should be noted that according to embodiments a separate entity (e.g. a software module, a hardware module or a hybrid module (combined software/hardware module)) may be provided for each of the functions disclosed herein. According to other embodiments, an entity (e.g. a software module, a hardware module or a hybrid module) is configured for providing two or more functions as disclosed herein. According to still other embodiments, two or more entities are configured for providing together a function as disclosed herein. It is noted that a control device may be a distributed control device having several parts. According to an embodiment, an exchange of information between parts of the distributed control device may be performed by communicative coupling of the parts (e.g. by a computer network) or by providing the substrate (or, in another embodiment, the transfer element in case a transfer element is used) with the information in a form that is readable by the receiving entity (e.g. coating layer application device, curing device). Such information to be exchanged may be for example a curing program. A curing program may be specified by the printing device depending on the printing parameters (e.g. the particular coating material, treatment of the coating layer (partial curing, viscous flow, etc.).

Further, it should be noted that while the exemplary coating layer application device and printing device in the drawings comprise a particular combination of several embodiments of the herein disclosed subject matter, any other combination of embodiment is also possible and is considered to be disclosed with this application and hence the scope of the herein disclosed subject matter extends to all alternative combinations of two or more of the individual features mentioned or evident from the text. All of these different combinations constitute various alternative examples of the invention.

Whenever herein it is referred to an entity for which different embodiments are disclosed (e.g. a coating material, a coating layer, a layer package, a resin, a charge control agent, a curing agent, a printing device, a coating layer application device, a transfer element, a substrate, a coating, a parameter range, etc.), it should be understood that this entity may be configured according to any one or more the embodiments disclosed for this entity.

According to an embodiment, the coating layer (according to one or more embodiments defined herein) is a coating layer that has been processed by a NIP device if not otherwise stated.

According to an embodiment, the coating material comprises one or more color pigments, in particular one or more of the following color pigments:

Cyan: Sunfast Blue 15:4/Sun Chemical (C.I.: blue 15:4, Cu-phtalocyanine); Heliogen Blue D7110F/Ciba Specialty Chemicals (C.I. blue 15:4, Cu-phtalocyanine); Heliogen Blue K7090/BASF (C.I. blue 15:3, Cu-phtalocyanine); Sunfast Blue 15:3/Sun Chemical (C.I. blue 15:3, Cu-phtalocyanine).

Magenta: Quindo Magenta 2282120/Sun Chemicals (C.I. number 73907/73900, quinacridone); Cinquasia RED L4105HD/Ciba Specialty Chemicals (C.I. Violet 19, quinacridone); Cinquasia Viloet L5120/BASF (C.I. Violet 19, quinacridone); Hostaperm rosa E/Clariant (C.I. PR 122, quinacridone); Hostaperm RED E3B/Clariant (C.I. Violet 19, quinacridone); Hostaperm RED E5B02/Clariant (C.I. Violet 19, quinacridone).

Yellow: Fanchon yellow 180/Sun Chemicals (C.I.: PY180, Benzimidazolone); Fanchon yellow 151/Sun Chemicals (C.I.: PY151, Benzimidazolone); Duropal Yellow 6218/Habich HMH (C.I.: PY184, Bismuth vanadate); Sicopal Yellow L1100/BASF (C.I.: PY184, Bismuth vanadate)

Black: Nipex 60/Orion (carbon black); Printex 90 Beads/Orion (carbon black); Spezial Schwarz/Evonik (carbon black)

White: TiSelect TS6200/DuPont (titanium dioxide)

In accordance with an embodiment, the coating material comprises one or more effect pigments, in particular one or more of the following effect pigments: Iriodin 9612 Silver Grey Fine/EMD; PCU 1000 aluminium powder/Eckart Effect Pigments According to an embodiment, the coating material comprises one or more light and heat stabilizer, in particular one or more of the following:

UVA—UV absorbers: Tinuvin 479 (HPT—hydroxiphenyl-triazines); Tinuvin 405 (HPT); Tinuvin 460 (HPT); K-Sorb 1577 (HPT); Tinuvin 928 (BTZ-benzotriazole).

HALS—hindered amine light stabilizers: Tinuvin 152 (N-OR HALS); Tinuvin 144 (N-alkyl HALS); Tinuvin 622 SF (oligomeric N-alkyl HALS); Chimassorb 944 LD (oligomeric N-H HALS); Tinuvin 111 FDL blends (N-alkyl/N-alkyl HALS); K-Sorb 111.

AO—Antioxidant: Irganox 1010 (hindered phenol, primary AO); Irganox 1076 (hindered phenol, primary AO): Irganox 245 (hindered phenol, primary AO); Irgafos 126 (phosphite, secondary AO); Irgafos 168 (phosphite, secondary AO); K.nox 126 (phosphite, secondary AO); K.nox 3114 (phenolic, primary AO); Knox 1010 (phenolic, primary AO); K.nox 445 (aminic AO).

It should be noted that the term "comprising" does not exclude other elements or steps and the "a" or "an" does not exclude a plurality. Also elements described in association with different embodiments may be combined. It should also be noted that reference signs in the claims should not be construed as limiting the scope of the claims.

In order to recapitulate some of the above described embodiments of the present invention one can state:

Described is a coating material 237, 248, 268 being processable by NIP to form at least a part of a coating layer 206 representing an image. The coating material 237, 248, 268 comprises an amorphous component and is curable, e.g. thermally curable. Further, the coating material 237, 248, 268 is configured for being applied with a thickness of at least 15 µm.

Further described is a coating material in particular configured for generating a coating layer by non-impact printing, the coating material being provided in the form of a plurality of particles and comprising: a resin, the resin comprising a curable resin component, the resin further comprising an amorphous resin portion, in particular wherein the resin component is at least partially thermally curable, in particular curable by a crosslinking agent able to react with functional groups of the resin component; and the coating material comprising a charge control agent; wherein the content of charge control agent is at least 2 weight percent based on the overall weight of coating material; and the coating material has a particle size distribution with a d10 value equal to or larger than 5 µm, in particular with the d10 value being in a range between 5 µm and 7 µm.

Further described is a coating material, in particular for generating a coating layer by non-impact printing, the coating material being provided in the form of particles and comprising: a curable resin preferably an at least partially thermal curable resin and even more in particular curable by a crosslinking agent able to react with functional groups of the resin, the resin comprising in particular an amorphous resin portion; wherein an average diameter of the particles is in a range between 1 µm and 25 µm; and wherein the particles have an average sphericity larger than 0.7, in particular larger than 0.8, in particular a sphericity larger than 0.9.

Further described is a developer comprising: a carrier (e.g. at least one carrier); and, in an amount of 10 wt-% or less, a coating material, in particular for generating a coating layer by non-impact printing, the coating material being provided in the form of particles and comprising: a curable resin preferably an at least partially thermal curable resin and even more in particular curable by a crosslinking agent able to react with functional groups of the resin, the resin comprising in particular an amorphous resin portion; wherein an average diameter of the particles is in a range between 1 μm and 25 μm; and wherein the particles have an average sphericity larger than 0.7, in particular larger than 0.8, in particular a sphericity larger than 0.9; wherein, if the coating material is heated from room temperature with a heating rate of 5 K per minute, the coating material upon heating reduces its viscosity down to a minimum viscosity and increases its viscosity upon further increase of the temperature;

wherein the minimum viscosity is in a range between 3 Pascal seconds and 20000 Pascal seconds.

Further described is a coating material configured for generating a coating layer (206) by non-impact printing, the coating material comprising: at least one effect particle, comprising at least one at least partially covered effect pigment, the effect pigment being covered, at least partially, by a thermally and/or radiation curable polymeric matrix, wherein the polymer matrix is preferably transparent.

Further described is a non-impact printing device comprising: a coating material being curable and comprising a resin; the coating material comprising an amorphous resin portion in an amount of at least 30 w-% based on the overall amount of resin and comprising with respect to the entire amount of coating material less than 0.5 w-% of flow additive; a printing unit, in particular an electrophotographic printing unit, being configured for printing the coating material so as to form a coating layer, wherein the coating layer forms at least part of a layer package comprising at least one layer; the non-impact printing device being configured for providing the layer package so as to define a surface structure with the layer package; wherein the surface structure is defined by a thickness variation of the layer package; wherein the thickness variation is in a range between 1 μm and 1000 μm, in particular in a range between 1 and 300 μm, and is in particular more than 1 μm, in particular more than 5 μm, in particular more than 10 μm and in particular more than 20 μm.

Further described is a coating layer application device for applying a coating layer, which is located on a transfer element, to a substrate, the coating layer being formed from a coating material, in particular a thermosetting coating material, the coating layer being curable and comprising an amorphous material, the coating layer application device comprising: a heating device being configured so as to (i) maintain the temperature of the coating layer within a temperature range before removal of the transfer element from the coating layer, wherein within the temperature range the uncured coating material is in its supercooled liquid state; and/or (ii) partially cure the coating layer during a contact of the coating layer and the substrate and before removal of the transfer element from the coating layer, in particular by increasing the temperature of the coating layer to a temperature at or above a curing temperature of the coating layer.

Described is a coating material, in particular for non-impact printing, the coating material comprising: a resin comprising at least one resin component, in particular at least one type of resin, the resin comprising in particular an amorphous resin portion; a curing agent comprising at least one crosslinking agent and/or at least one thermal initiator and/or at least one photoinitiator and/or at least one catalyst; and wherein the coating material comprises the curing agent in an amount such that the cured coating material is able to reach a rating of at least 2-3 in the Methylethylketone—test after 10 s according to the DIN EN 12720; and/or the cured coating material resists at least 50 IPA (Isopropyl alcohol) double rubs. The resin comprises one or more of the following: (i) a polyester resin component containing with respect to the overall amount of incorporated (used) acid monomer-groups, at least 5 w-% isophthalic acid, in particular at least 10 w-% isophthalic acid, further in particular at least 25 w-% isophthalic acid, further in particular at least 30 w-% isophthalic acid, further in particular at least 50 w-% isophthalic acid, further in particular at least 80 w-% isophthalic acid, further in particular at least 85 w-% isophthalic acid; (ii) a polyester resin component containing 1 to 100 wt-% of cycloaliphatic glycol compound with respect to the total weight of the glycol compounds of the polyester resin component, in particular TACD, further in particular TMCD; (iii) an acrylic resin; (iv) a fluorine containing polymer, in particular a hydroxyl functional fluorine polymer; (v) a polyurethane resin.

Further described is a coating material being processable by non-impact printing to form at least a part of a coating layer representing an image; the coating material comprising an amorphous resin portion and being curable; the coating material being configured for being applied with a thickness of at least 15 μm; wherein preferably the coating material is configured for being applied with a thickness of at least 20 μm, in particular with a thickness of at least 30 μm, further in particular with a thickness of at least 40 μm; the coating material comprising one or more of the following: (i) a polyester resin comprising at least one incorporated acid monomer and wherein at least 10 weight percent of the at least one incorporated acid monomer is isophtalic acid, in particular at least 20 weight percent of the at least one incorporated acid monomer is isophtalic acid, in particular at least 30 weight percent of the at least one incorporated acid monomer is isophtalic acid, in particular at least 50 weight percent of the at least one incorporated acid monomer is isophtalic acid, in particular at least 80 weight percent of the at least one incorporated acid monomer is isophtalic acid, and further in particular at least 85 weight percent of the at least one incorporated acid monomer is isophtalic acid; (ii) a polyester resin containing 1 to 100 w-% of cycloaliphatic glycol compound with respect to the total weight of the glycol compounds of the polyester resin component; (iii) an acrylic resin, in particular TACD, further in particular TMCD; (iii) an acrylic resin; (iv) a fluorine containing polymer, in particular a hydroxyl functional fluorine polymer; (v) a polyurethane resin.

Further described is a coating material for generating a coating layer by non-impact printing wherein the coating layer represents an image and wherein a resolution of the image is at least 100 DPI, the coating material comprising a curable resin; wherein the coating material exhibits a minimum viscosity when being heated from room temperature with a heating rate of 5 Kelvin per minute up to a temperature where curing of the coating material occurs, wherein the minimum viscosity is in a range between 3 Pascal seconds to 20000 Pascal seconds, in particular in a range between 50 Pascal seconds and 10000 Pascal seconds and further in particular in a range between 250 Pascal seconds and 7000 Pascal seconds; and wherein a pill flow length is below 350 mm at a potential curing temperature which may be used to cure the coating material.

The invention claimed is:

1. Coating material for generating a coating layer by non-impact printing wherein the coating layer represents an image and wherein a resolution of the image is at least 100 DPI, the coating material comprising a curable resin;

wherein the coating material exhibits a minimum viscosity when being heated from room temperature with a heating rate of 5 Kelvin per minute up to a temperature where curing of the coating material occurs, wherein the minimum viscosity is in a range between 3 Pascal seconds to 20000 Pascal seconds; and wherein a pill flow length is below 350 mm at a potential curing temperature which may be used to cure the coating material, and wherein the pill flow length is determined by the following method:
(i) pressing an amount of 0.75 grams of the coating material into a cylindrical pill with a diameter of 13 mm at a force of 20 kilo Newton for at least 5 seconds;
(ii) putting the pill of coating material on a metal sheet at room temperature;
(iii) putting the metal sheet with the pill into a furnace preheated to the potential curing temperature and tempering the pill on the metal sheet in a horizontal position for half a minute if the resin includes an acrylic resin component and for one minute if the resin does not include an acrylic resin component;
(iv) tilting the metal sheet to a flowing down angle of 65° and maintaining the metal sheet in this position for 10 minutes at the potential curing temperature;
(v) removing the metal sheet from the furnace, cooling down the metal sheet and the coating material in a horizontal position, measuring a maximum length of pill on the metal sheet and taking this maximum length as the pill flow length.

2. Coating material according to claim 1,
the coating material being provided in the form of a plurality of particles;
the coating material comprising an inorganic surface additive, wherein the inorganic surface additive comprises one or more of inorganic oxides of silicon and/or titanium.

3. Coating material according to claim 1,
the coating material being provided in the form of a plurality of particles;
the coating material comprising an inorganic surface additive, wherein the inorganic surface additive comprises one or more of inorganic oxides of silicon and is free from inorganic oxides of titanium.

4. Coating material according to claim 1, wherein the potential curing temperature is a temperature which is used to cure the coating layer;
and/or wherein
the potential curing temperature is 180° C. and the pill flow length is smaller or equal to 300 mm;
and/or wherein
the resin includes an acrylic resin component in an amount of more than 50 weight percent based on the overall resin amount; and
wherein the pill flow length is in a range between 180 millimeter and 300 millimeter.

5. Coating material according to claim 1,
wherein the resin includes an epoxy resin component in an amount of at least 50 weight percent based on the overall resin amount; and
wherein the pill flow length is in a range between 15 millimeter and 35 millimeter;
and/or wherein
the resin includes a polyester resin component in an amount of at least 50 weight percent based on the overall resin amount; and
wherein the pill flow length is in a range between 20 mm and 180 mm.

6. Coating material according to claim 1,
wherein the resin includes a mixture of a polyester resin component and an epoxy resin component in an amount of at least 80 weight percent based on the overall resin amount; and
the pill flow length is in a range between 15 mm and 150 mm, in particular in a range between 15 mm and 100 mm.

7. Coating material according to claim 1, the resin comprising an amorphous resin portion, wherein the amorphous resin portion comprising at least one amorphous resin with functional groups that can be cured, in particular via heat;
preferably further comprising a crosslinking material which is capable of reacting with the at least one amorphous resin to thereby cure the coating material;
wherein in particular the crosslinking material includes one or more materials chosen from epoxy/glycidyl-group-containing materials, including epoxy-resins and Triglycidylisocyanurate, hydroxyalkylamide hardeners, isocyanate hardener and double bond containing compounds with a thermal radical initiator system;
and/or wherein
that coating material comprises the amorphous resin portion in an amount of at least 30 weight percent based on the overall amount of resin.

8. Coating material according to claim 1 further comprising a charge control agent in an amount of at least 0.1 weight percent based on the overall coating material, in particular at least 1 weight percent and more particularly at least 2 weight percent;
and/or wherein
the coating material is a particulate coating material comprising coating material particles;
the coating material having in particular an average particle size between 1 µm and 25 µm, more particularly between 5 µm and 20 µm; and/or
the coating material comprising in particular a particle size distribution of
d10 being equal to or larger than 5 µm, in particular being between 5 µm and 7 µm, and/or
d50 being between 8 µm and 10 µm, and/or
d90 being between 12 µm and 14 µm;
wherein preferably a mean sphericity of the coating material particles is at least 0.7, in particular at least 0.9;
and/or wherein
the coating material comprising effect pigments, in particular with a d90 diameter of more than 150 µm, in particular with a d90 diameter of more than 100 µm, in particular with a d90 diameter of more than 50 µm, in particular with a d90 diameter of more than 20 µm and further in particular with a d90 diameter of more than 10 µm;
in particular wherein the effect pigments are covered, at least partially, by a thermally and/or radiation curable polymeric matrix, wherein the polymer matrix is preferably transparent, wherein preferably more than 50%, in particular more than 75% and further in particular more than 90% of the surface of the effect pigment is covered with a thermosetting material and which is at least partly transparent.

9. Coating material according to claim 1, wherein the coating material comprises a salicylic compound, in particular a zinc salicylic compound, and/or the resin comprises a polyester resin component comprising incorporated terephtalic acid and/or incorporated isophtalic acid, wherein in particular the polyester is a polyester which is transferable at least partly to a urethane material during curing; and/or an acrylic resin; and/or a fluorine containing polymer, preferably hydroxyl functional fluorine polymer; and/or wherein the coating material comprises with respect to the entire amount of coating material less than 0.5 w-% of flow additive;

and/or wherein an inorganic surface additive is added, and wherein the inorganic surface additive comprises in particular one or more of inorganic oxides of silicon and/or titanium, in particular with a particle size between 1 nm and 100 nm, further in particular between 5 nm and 70 nm, wherein the coating material in particular further comprises two or more different inorganic oxides with a ratio of the average particle diameter between 2 to 10, in particular between 5 to 7.

10. Image printed with one or more coating materials according to claim 1, characterized by a final image thickness of at least 2 µm, in particular of at least 10 µm, more particularly of at least 20 µm, more particularly of at least 40 µm;

wherein the coating material is configured for providing a coating layer by non-impact printing with a thickness of at least 5 µm, in particular of at least 10 µm, further in particular of at least 20 µm and more further in particular of at least 40 µm.

11. Reservoir, in particular a cartridge, for a non-impact printing device, the cartridge comprising a coating material according to claim 1.

12. Non-impact printing device comprising a coating material according to claim 1.

13. Transfer element comprising a coating layer, in particular an uncured or partially cured coating layer, generated from a coating material according to claim 1.

14. A coating layer application device, the coating layer application device being configured for receiving a transfer element according to claim 13, the coating layer application device being further configured for applying the coating layer to a substrate.

15. A substrate, in particular a pre-coated substrate, comprising a coating layer generated from a coating material according to claim 1.

16. A method comprising:

generating a coating layer from the coating material according to claim 1 on a target surface, in particular by means of a non-impact printing device.

17. Use of a coating material according to claim 1, in particular for applying a coating layer to a target surface, in particular by means of a non-impact printing device.

* * * * *